US012750485B2

(12) United States Patent
Koo et al.

(10) Patent No.: US 12,750,485 B2
(45) Date of Patent: Sep. 29, 2026

(54) IMAGE CODING METHOD AND APPARATUS THEREFOR

(71) Applicant: LG Electronics Inc., Seoul (KR)

(72) Inventors: Moonmo Koo, Seoul (KR); Jaehyun Lim, Seoul (KR); Seunghwan Kim, Seoul (KR); Jie Zhao, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/571,385

(22) PCT Filed: Jun. 16, 2022

(86) PCT No.: PCT/KR2022/008521

§ 371 (c)(1),
(2) Date: Dec. 18, 2023

(87) PCT Pub. No.: WO2022/265420

PCT Pub. Date: Dec. 22, 2022

(65) Prior Publication Data

US 2024/0357110 A1 Oct. 24, 2024

Related U.S. Application Data

(60) Provisional application No. 63/211,519, filed on Jun. 16, 2021.

(51) Int. Cl.
*H04N 19/122* (2014.01)
*H04N 19/14* (2014.01)
(Continued)

(52) U.S. Cl.
CPC ........... *H04N 19/122* (2014.11); *H04N 19/14* (2014.11); *H04N 19/176* (2014.11); *H04N 19/61* (2014.11)

(58) Field of Classification Search
CPC .... H04N 19/122; H04N 19/14; H04N 19/176; H04N 19/61
(Continued)

(56) References Cited

U.S. PATENT DOCUMENTS 11,425,421 B1 * 8/2022 Koo .................... H04N 19/159
2012/0140814 A1 * 6/2012 Sole Rojals ........... H04N 19/70 375/E7.126
(Continued)

FOREIGN PATENT DOCUMENTS

KR 10-2020-0057991 5/2020
KR 10-2020-0086732 7/2020
(Continued)

OTHER PUBLICATIONS

International Search Report and Written Opinion in International Appln. No. PCT/KR2022/008521, mailed on Sep. 21, 2022, 13 pages (with English translation).
(Continued)

*Primary Examiner* — Jayanti K Patel
*Assistant Examiner* — Richard B Carter
(74) *Attorney, Agent, or Firm* — Fish & Richardson P.C.

(57) ABSTRACT

An image decoding method according to this document comprises a step for deriving, for transform coefficients, modified transform coefficients on the basis of inverse secondary transformation, wherein the step for deriving the modified transform coefficients comprises a step for deriving a transform kernel to be applied to the inverse secondary transformation, the transform kernel may be derived as a 16×16 matrix on the basis of horizontal and vertical lengths of a target block being both greater than or equal to 4 and the horizontal or vertical length being 4, and the transform kernel may be derived as a 48×16 matrix on the basis of the horizontal and vertical lengths of the target block being both
(Continued)

greater than or equal to 8 and the horizontal or vertical length being 8.

6 Claims, 16 Drawing Sheets

(51) Int. Cl.
*H04N 19/176* (2014.01)
*H04N 19/61* (2014.01)

(58) Field of Classification Search
USPC .......................................... 375/240.12, 7.126
See application file for complete search history.

(56) References Cited

U.S. PATENT DOCUMENTS

| | | | | |
|---|---|---|---|---|
| 2020/0366937 | A1* | 11/2020 | Egilmez | H04N 19/61 |
| 2020/0396487 | A1* | 12/2020 | Nalci | H04N 19/186 |

FOREIGN PATENT DOCUMENTS

| | | |
|---|---|---|
| KR | 10-2020-0086735 | 7/2020 |
| KR | 10-2231975 | 3/2021 |

OTHER PUBLICATIONS

Koo et al., "AHG12: LFNST extension with large kernel," JVET-V0119-v2, Joint Video Experts Team (JVET) of ITU-T SG 16 WP 3 and ISO/IEC JTC 1/SC 29, 22nd Meeting, Teleconference, Apr. 20-28, 2021, 5 pages.

* cited by examiner (a)

FIG. 9b

| | | | | | | | | | | | | | | | |
|---|---|---|---|---|---|---|---|---|---|---|---|---|---|---|---|
| 1 | 2 | 3 | 4 | 5 | 6 | 7 | 8 | 9 | 10 | 11 | 12 | | | | |
| 13 | 14 | 15 | 16 | 17 | 18 | 19 | 20 | 21 | 22 | 23 | 24 | | | | |
| 25 | 26 | 27 | 28 | 29 | 30 | 31 | 32 | 33 | 34 | 35 | 36 | | | | |
| 37 | 38 | 39 | 40 | 41 | 42 | 43 | 44 | 45 | 46 | 47 | 48 | | | | |
| 49 | 50 | 51 | 52 | 53 | 54 | 55 | 56 | | | | | | | | |
| 57 | 58 | 59 | 60 | 61 | 62 | 63 | 64 | | | | | | | | |
| 65 | 66 | 67 | 68 | 69 | 70 | 71 | 72 | | | | | | | | |
| 73 | 74 | 75 | 76 | 77 | 78 | 79 | 80 | | | | | | | | |
| 81 | 82 | 83 | 84 | | | | | | | | | | | | |
| 85 | 86 | 87 | 88 | | | | | | | | | | | | |
| 89 | 90 | 91 | 92 | | | | | | | | | | | | |
| 93 | 94 | 95 | 96 | | | | | | | | | | | | |
| | | | | | | | | | | | | | | | |
| | | | | | | | | | | | | | | | |
| | | | | | | | | | | | | | | | |
| | | | | | | | | | | | | | | | |

FIG. 10a

| | | | | | | | | | | | | | | | |
|---|---|---|---|---|---|---|---|---|---|---|---|---|---|---|---|
| 1 | 9 | 17 | 25 | 33 | 37 | 41 | 45 | | | | | | | | |
| 2 | 10 | 18 | 26 | 34 | 38 | 42 | 46 | | | | | | | | |
| 3 | 11 | 19 | 27 | 35 | 39 | 43 | 47 | | | | | | | | |
| 4 | 12 | 20 | 28 | 36 | 40 | 44 | 48 | | | | | | | | |
| 5 | 13 | 21 | 29 | | | | | | | | | | | | |
| 6 | 14 | 22 | 30 | | | | | | | | | | | | |
| 7 | 15 | 23 | 31 | | | | | | | | | | | | |
| 8 | 16 | 24 | 32 | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |

FIG. 10b

| | | | | | | | | | | | | | | | |
|---|---|---|---|---|---|---|---|---|---|---|---|---|---|---|---|
| 1 | 13 | 25 | 37 | 49 | 57 | 68 | 73 | 81 | 85 | 89 | 93 | | | | |
| 2 | 14 | 26 | 38 | 50 | 58 | 66 | 74 | 82 | 86 | 90 | 94 | | | | |
| 3 | 15 | 27 | 39 | 51 | 59 | 67 | 75 | 83 | 87 | 91 | 95 | | | | |
| 4 | 16 | 28 | 40 | 52 | 60 | 68 | 76 | 84 | 88 | 92 | 96 | | | | |
| 5 | 17 | 29 | 41 | 53 | 61 | 69 | 77 | | | | | | | | |
| 6 | 18 | 30 | 42 | 54 | 62 | 70 | 78 | | | | | | | | |
| 7 | 19 | 31 | 43 | 55 | 63 | 71 | 79 | | | | | | | | |
| 8 | 20 | 32 | 44 | 56 | 64 | 72 | 80 | | | | | | | | |
| 9 | 21 | 33 | 45 | | | | | | | | | | | | |
| 10 | 22 | 34 | 46 | | | | | | | | | | | | |
| 11 | 23 | 35 | 47 | | | | | | | | | | | | |
| 12 | 24 | 36 | 48 | | | | | | | | | | | | |
| | | | | | | | | | | | | | | | |
| | | | | | | | | | | | | | | | |
| | | | | | | | | | | | | | | | |
| | | | | | | | | | | | | | | | |

FIG. 12

| | | | | | | | | | | | | | | | |
|---|---|---|---|---|---|---|---|---|---|---|---|---|---|---|---|
| 1 | 3 | 6 | 10 | 33 | 35 | 38 | 42 | 81 | 83 | 86 | 90 | | | | |
| 2 | 5 | 9 | 13 | 34 | 37 | 41 | 45 | 82 | 85 | 89 | 93 | | | | |
| 4 | 8 | 12 | 15 | 36 | 40 | 44 | 47 | 84 | 88 | 92 | 95 | | | | |
| 7 | 11 | 14 | 16 | 39 | 43 | 46 | 48 | 87 | 91 | 94 | 96 | | | | |
| 17 | 19 | 22 | 26 | 65 | 67 | 70 | 74 | | | | | | | | |
| 19 | 21 | 25 | 29 | 66 | 69 | 73 | 77 | | | | | | | | |
| 20 | 24 | 28 | 31 | 68 | 72 | 76 | 79 | | | | | | | | |
| 23 | 27 | 30 | 32 | 71 | 75 | 78 | 80 | | | | | | | | |
| 49 | 51 | 54 | 58 | | | | | | | | | | | | |
| 50 | 53 | 57 | 61 | | | | | | | | | | | | |
| 52 | 56 | 60 | 63 | | | | | | | | | | | | |
| 55 | 59 | 62 | 64 | | | | | | | | | | | | |
| | | | | | | | | | | | | | | | |
| | | | | | | | | | | | | | | | |
| | | | | | | | | | | | | | | | |
| | | | | | | | | | | | | | | | |

IMAGE CODING METHOD AND APPARATUS THEREFOR

CROSS-REFERENCE TO RELATED APPLICATIONS

This application is a National Stage application under 35 U.S.C. § 371 of International Application No. PCT/KR2022/008521, filed on Jun. 16, 2022, which claims the benefit of U.S. Provisional Application No. 63/211,519, filed on Jun. 16, 2021. The disclosures of the prior applications are incorporated by reference in their entirety.

FIELD OF THE DISCLOSURE

The present document relates to image coding technology, and more particularly, to an image coding method and apparatus based on a low-frequency non-separable transform in an image coding system.

RELATED ART

Recently, the demand for high resolution, high quality image/video such as 4K or 8K Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high-resolution, high-quality images/videos showing various characteristics as described above.

SUMMARY OF THE DISCLOSURE

Technical Problem

The technical problem of the present document is to provide a method and an apparatus for enhancing image coding efficiency.

Another technical problem of the present document is to provide an image coding method and apparatus to which LFNST is applied under various conditions.

Another technical problem of the present document is to provide an image coding method and apparatus that sets the LFNST kernel by considering the computational complexity of the sample.

Another technical problem of the present document is to provide an image coding method and apparatus using LFNST that can improve coding performance and minimize complexity.

Technical Solutions

According to an embodiment of the present document, an image decoding method performed by a decoding apparatus is provided. The method comprises deriving modified transform coefficients based on an inverse secondary transform on transform coefficients, wherein the deriving the modified transform coefficients comprises deriving a transform kernel to be applied for the inverse secondary transform, wherein based on both of horizontal and vertical lengths of the target block being greater than or equal to 4, and the horizontal or the vertical length being equal to 4, the transform kernel may be derived as a 16×16 matrix, and wherein based on both of the horizontal and the vertical lengths of the target block being greater than or equal to 8, and the horizontal or the vertical length being equal to 8, the transform kernel may be derived as a 48×16 matrix.

According to an embodiment of the present document, an image encoding method performed by an encoding apparatus is provided. The method comprises deriving modified transform coefficients based on a secondary transform on the transform coefficients, wherein the deriving the modified transform coefficients comprises deriving a transform kernel to be applied for the secondary transform, wherein based on both of horizontal and vertical lengths of the target block being greater than or equal to 4, and the horizontal or the vertical length being equal to 4, the transform kernel is derived as a 16×16 matrix, and wherein based on both of the horizontal and the vertical lengths of the target block being greater than or equal to 8, and the horizontal or the vertical length being equal to 8, the transform kernel is derived as a 16×48 matrix.

According to another embodiment of the present document, a digital storage medium storing image data including encoded image information and/or bitstream generated based on an image encoding method performed by an encoding apparatus, and a method for transmitting such image information and/or bitstream may be provided.

According to another embodiment of the present document, a digital storage medium storing image data including encoded image information and/or bitstream that causes the image decoding method to be performed by a decoding apparatus, and a method for transmitting such image information and/or bitstream may be provided.

Effects of the Disclosure

According to an embodiment of the present document, overall video/image compression efficiency may be improved.

According to an embodiment of the present document, LFNST may be applied based on various conditions.

According to an embodiment of the present document, the LFNST set index may be efficiently derived based on the intra prediction mode.

According to the present document, the LFNST kernel can be set by considering the computational complexity of the sample.

According to the present document, an image coding method and apparatus on which LFNST that may improve coding performance and minimize complexity is applied may be provided.

The effects that can be achieved through specific examples of the present specification are not limited to the effects listed above. For example, there may be various technical effects that a person having ordinary skill in the related art can understand or derive from the present specification. Accordingly, the specific effects of the present specification are not limited to those explicitly described in the present specification, and may include various effects that can be understood or derived from the technical features of the present specification.

BRIEF DESCRIPTION OF THE DRAWINGS

FIGS. 9*a* and 9*b* are diagrams illustrating an input sequence of input data according to an embodiment of the present document.

FIGS. 10*a* and 10*b* are diagrams illustrating an input sequence of input data according to another embodiment of the present document.

FIG. 12 is a diagram illustrating a scanning sequence of transform coefficients according to an embodiment of the present document.

DESCRIPTION OF EXEMPLARY EMBODIMENTS

Figure 1:
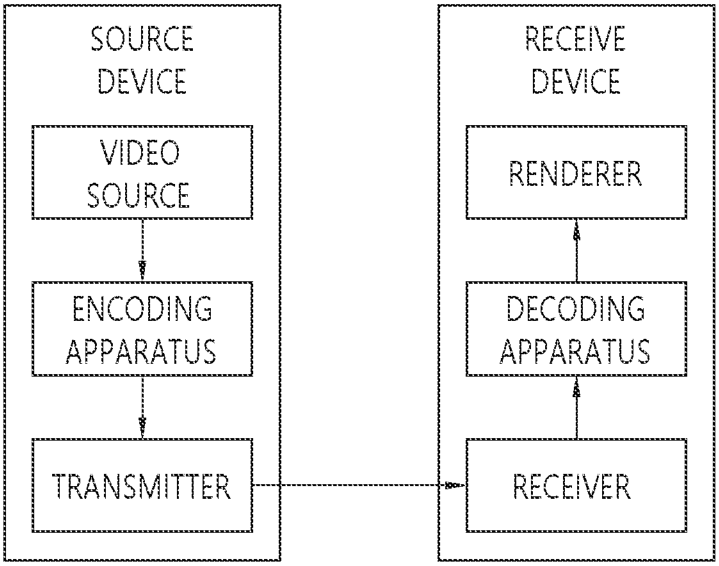
FIG. 1 schematically illustrates an example of a video/image coding system to which the present document is applicable.

This disclosure may be modified in various forms, and specific embodiments thereof will be described and shown in the drawings. However, the embodiments are not intended for limiting this disclosure. The terms used in the following description are used to merely describe specific embodiments, but are not intended to limit this disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, each of the components in the drawings described in this disclosure are shown independently for the convenience of description regarding different characteristic functions, and do not mean that the components are implemented in separate hardware or separate software. For example, two or more of each configuration may be combined to form one configuration, or one configuration may be divided into a plurality of configurations. Embodiments in which each configuration is integrated and/or separated are also included in the scope of this disclosure without departing from the spirit of this disclosure.

Hereinafter, exemplary embodiments of this disclosure will be described in detail with reference to the accompanying drawings. Hereinafter, the same reference numerals are used for the same components in the drawings, and redundant description of the same components may be omitted.

The present document relates to a video/image coding. For example, the method/embodiment disclosed in the present document may relates to the Versatile Video Coding (VVC) standard (ITU-T Rec. H.266), the next-generation video/image coding standard after VVC, or other video coding-related standards (For example, the High Efficiency Video Coding (HEVC) standard (ITU-T Rec. H.265), essential video coding (EVC) standard, AVS2 standard, etc.).

The present document presents various embodiments of video/image coding, and unless otherwise specified, the embodiments may be performed in combination with each other. In this document, video may refer to a series of images over time.

Technical features described individually in a drawing in the present specification may be implemented individually or simultaneously.

FIG. 1 schematically illustrates an example of a video/image coding system to which the present document is applicable.

Referring to FIG. 1, a video/image coding system may include a source device and a receiving device. The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
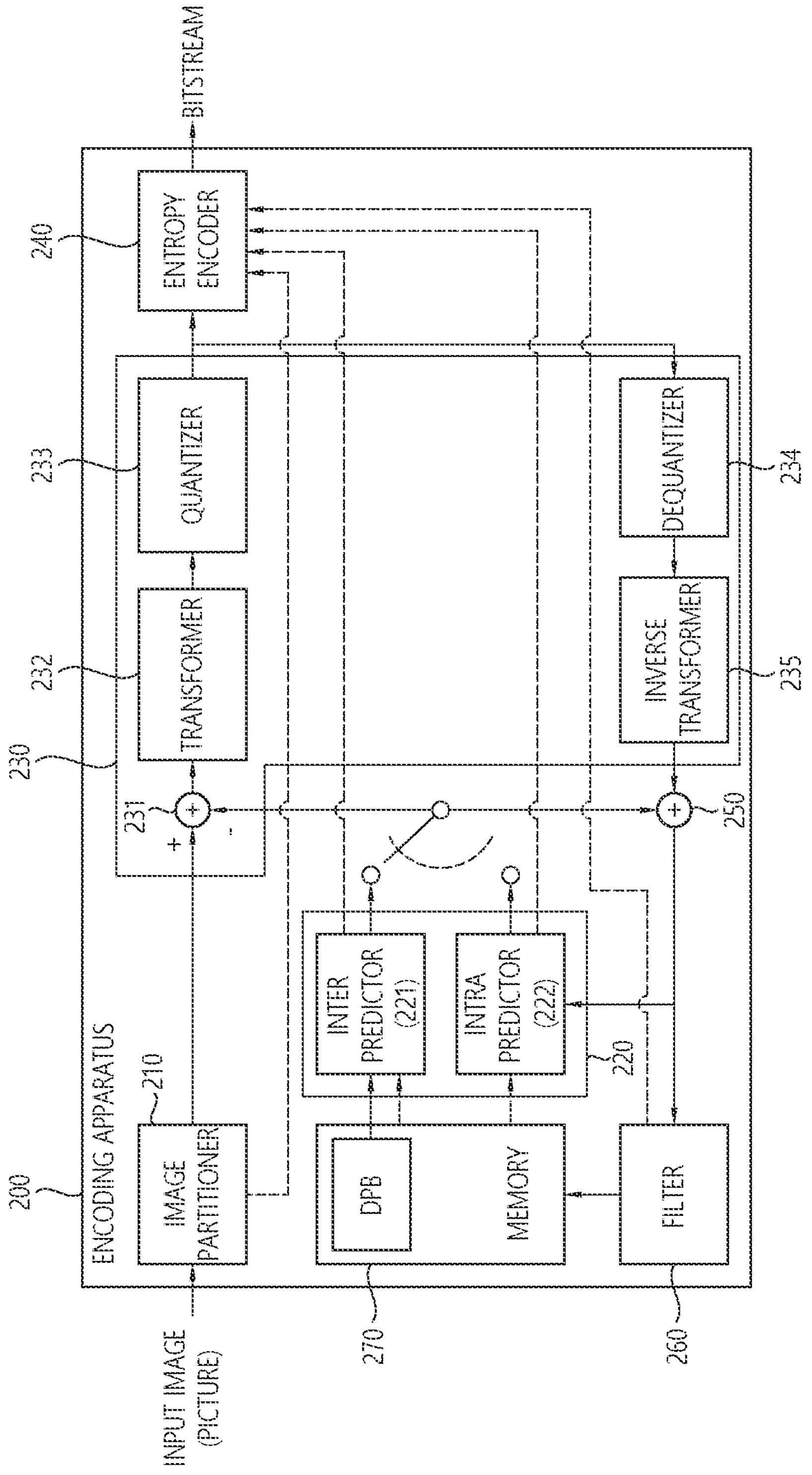
FIG. 2 is a diagram for schematically explaining a configuration of a video/image encoding apparatus to which the present document is applicable.

FIG. 2 is a diagram for schematically explaining a configuration of a video/image encoding apparatus to which the present document are applicable. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processing unit. For example, the processing unit may be called a coding unit (CU). As another example, the processing unit may further include a prediction unit (PU) or a transform unit (TU). In this case, the prediction unit and the transform unit may each be divided or partitioned from the final coding unit described above. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel.

The subtractor 231 may generate a residual signal (residual block, residual samples or residual sample array) by subtracting the prediction signal (predicted block, prediction samples, or prediction sample array) output from the predictor 220 from the input image signal (original block, original samples, or original sample array). The generated residual signal is transmitted to the transformer 232.

The predictor 220 may perform prediction on a block to be processed (hereinafter, referred to as a current block) and generate a predicted block including prediction samples for the current block. The predictor 220 may determine whether intra prediction or inter prediction is applied on a current block or CU basis. The predictor may generate various kinds of information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples (reference samples) in the current picture. In the intra prediction, prediction modes may include a plurality of non-directional modes and a plurality of directional modes. The intra predictor 222 may determine the prediction mode being applied to the current block by using a prediction mode being applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index.

The prediction signal generated through the inter predictor 221 and/or the intra predictor 222 may be used to generate a reconstructed signal or a residual signal.

The transformer 232 may generate transform coefficients by applying a transform technique to the residual signal. For example, the transform technique may include a discrete cosine transform (DC T), a discrete sine transform (DST), a graph-based transform (GBT), Karhunen Loeve Transform (KLT), or a conditionally non-linear transform (CNT), etc. The transformer 232 may perform primary transform and/or secondary transform.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form.

The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. A transmitter (not shown) that transmits the signal output from the entropy encoder 240 and/or a storage (not shown) that stores the signal output from the entropy encoder 240 may be configured as internal/external elements of the encoding apparatus 200, or the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235.

The adder 250 adds the reconstructed residual signal to the prediction signal output from the predictor 220 to generate a reconstructed signal (reconstructed picture, reconstructed block, reconstructed samples, or reconstructed sample array). If there is no residual for the block to be processed, such as a case where the skip mode is applied, the predicted block may be used as the reconstructed block. The generated reconstructed signal may be used for intra prediction of a next block to be processed in the current picture and may be used for inter prediction of a next picture through filtering as described below.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset (SAO), an adaptive loop filter, a bilateral filter, and the like.

The modified reconstructed picture transmitted to the memory 270 may be used as the reference picture in the inter predictor 280. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The memory 270 may store reconstructed samples of reconstructed blocks in the current picture and may transfer the reconstructed samples to the intra predictor 222.

Figure 3:
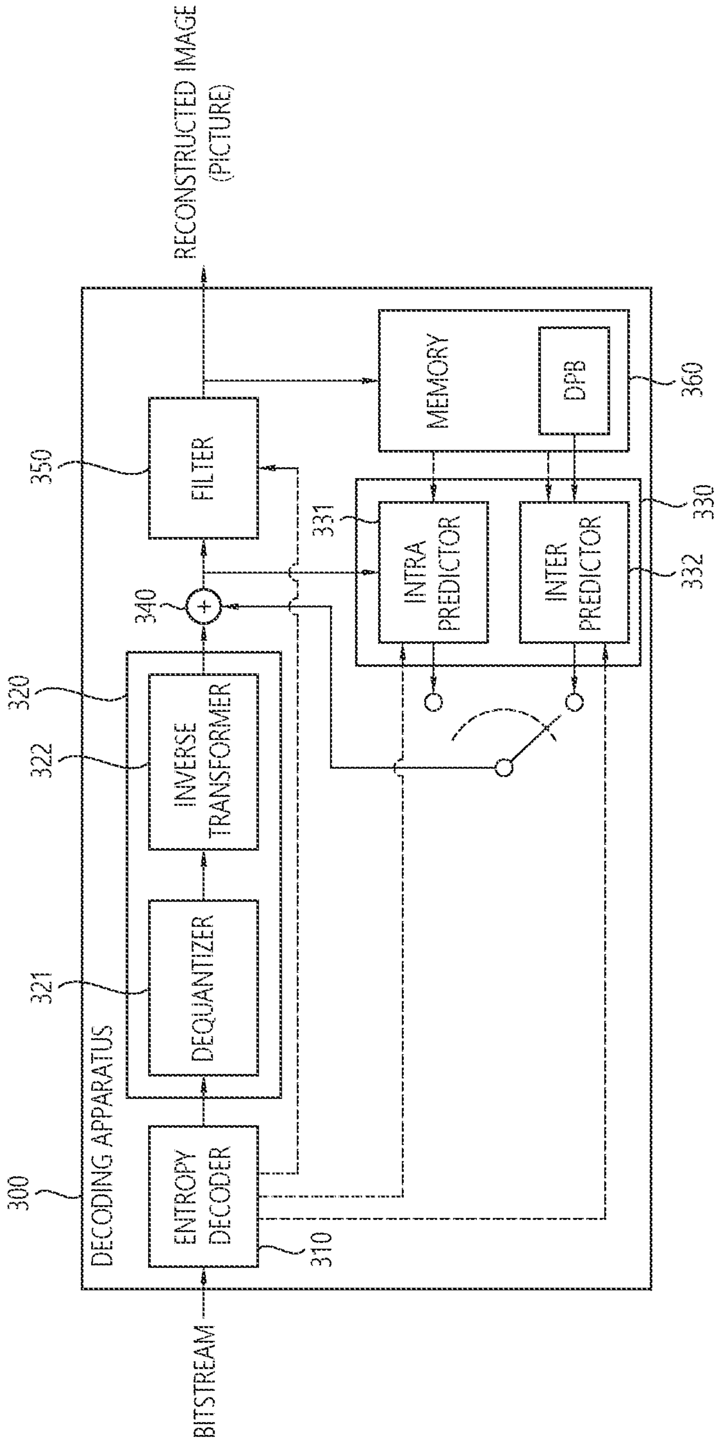
FIG. 3 is a diagram for schematically explaining a configuration of a video/image decoding apparatus to which the present document is applicable.

FIG. 3 is a diagram schematically explaining the configuration of a video/image decoding apparatus to which the present document can be applied.

Referring to FIG. 3, the decoding apparatus 300 may include an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. The processing unit of decoding may be, for example, a coding unit, a prediction unit or a transform unit. One or more transform units can be derived from a coding unit.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). Signaled/received information and/or syntax elements described later in this disclosure may be obtained from the bitstream by being decoded through a decoding procedure.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array). The inverse transformer 322 may perform inverse primary transform and/or inverse secondary transform.

The predictor 330 may perform prediction on the current block and generate a predicted block including prediction samples for the current block.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 332 may determine the prediction mode being applied to the current block by using a prediction mode being applied to a neighboring block.

The inter predictor 332 may derive a predicted block for the current block based on a reference block (reference sample array) specified by a motion vector on a reference picture. In the case of inter prediction, the neighboring block may include a spatial neighboring block present in the current picture and a temporal neighboring block present in the reference picture. For example, the inter predictor 331 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, prediction sample array) output from the predictor 330. If there is no residual for the block to be processed, such as when the skip mode is applied, the predicted block may be used as the reconstructed block. The generated reconstructed signal may be used for intra prediction of a next block to be processed in the current picture, may be output through filtering as described below, or may be used for inter prediction of a next picture.

The filter 350 may improve subjective/objective image quality by applying filtering to the reconstructed signal. For example, the filter 350 may generate a modified reconstructed picture by applying various filtering methods to the reconstructed picture. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 331. The memory 360 may store the motion information of the block from which the motion information in the current picture is derived (or decoded) and/or the motion information of the blocks in the picture that have already been reconstructed.

In the present specification, the embodiments described in the predictor 330, the inverse quantizer 321, the inverse transformer 322, the filter 350, and the like of the decoding apparatus 300 may be applied in the same or corresponding manner, respectively, in the predictor 220, the inverse quantizer 234, the inverse transformer 235, the filter 260, and the like of the encoding apparatus 200.

Figure 4:
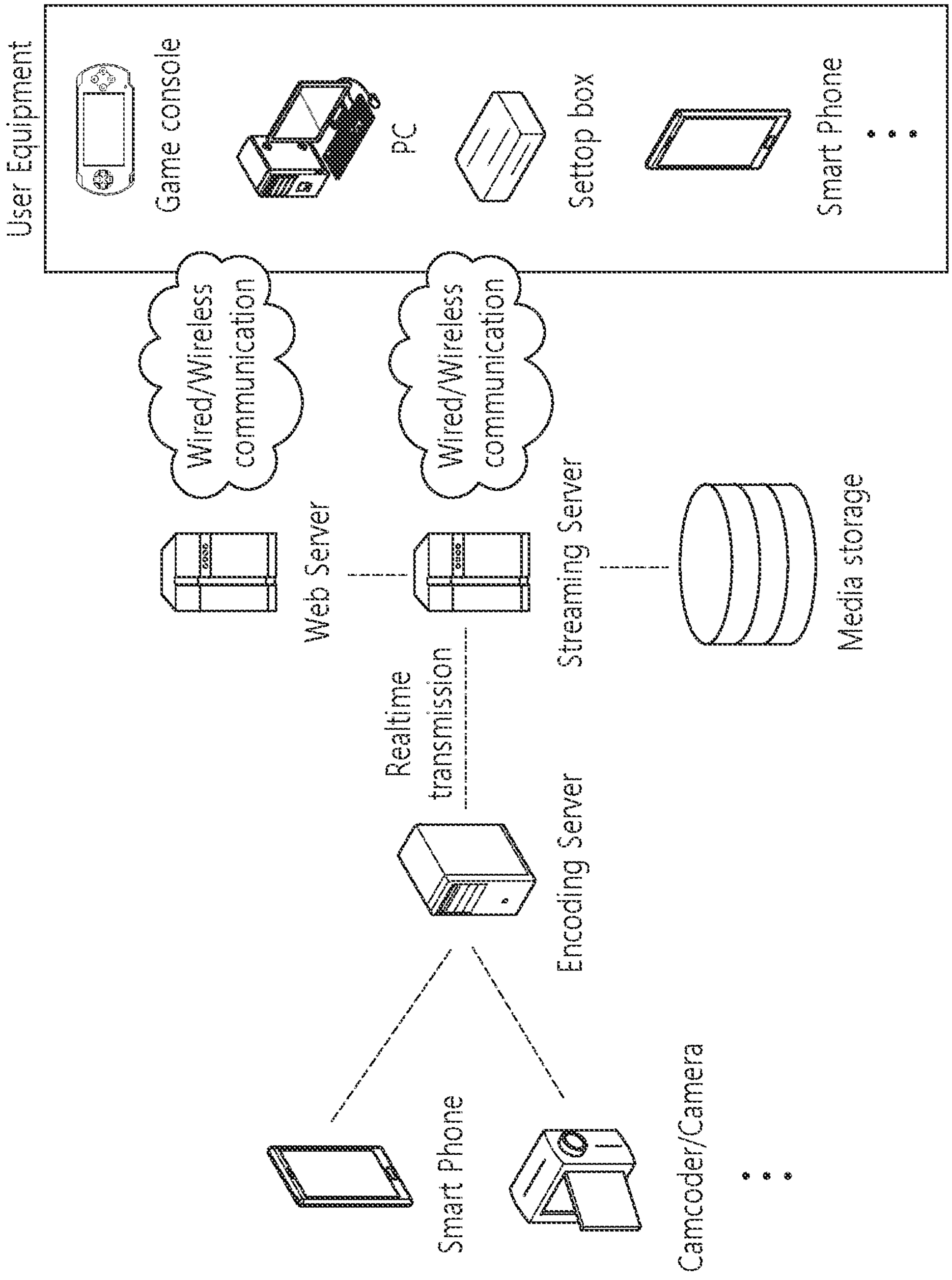
FIG. 4 exemplarily illustrates a structural diagram of a content streaming system to which the present document is applied.

FIG. 4 illustrates an exemplary structural diagram of a content streaming system to which the present is applied.

In addition, the content streaming system to which the present document are applied may include an encoding server, a streaming server, a web server, a media storage, a user device, and a multimedia input device, in a big picture.

The encoding server serves to compress the content input from the multimedia input devices such as a smartphone, a camera, and a camcorder into the digital data to generate a bitstream and transmit the bitstream to the streaming server. As another example, if the multimedia input devices such as a smartphone, a camera, and a camcorder directly generate the bitstream, the encoding server may be omitted. The bitstream to which the present document is applied may be generated by the encoding method or the bitstream generation method, and the streaming server may temporarily store the bitstream in the process of transmitting or receiving the bitstream.

The streaming server serves to transmit the multimedia data to the user device based on the user request through the web server, and the web server serves as a medium which informs the user of what services are available. When the user requests the desired service to the web server, the web server delivers the user's request to the streaming server, and the streaming server transmits the multimedia data to the user. At this time, the content streaming system may include a separate control server, and in this case, the control server serves to control commands/responses between the devices within the content streaming system.

The streaming server may receive the contents from the media storage and/or the encoding server. For example, when receiving the contents from the encoding server, the streaming server may receive the contents in real time. In this case, to provide the smooth streaming service, the streaming server may store the bitstream for a predetermined time.

As an example of the user device, there may be a portable phone, a smartphone, a laptop computer, a digital broadcast terminal, a personal digital assistants (PDA), a portable multimedia player (PMP), a navigation device, a slate PC, a tablet PC, an ultrabook, a wearable device (e.g., a smart watch, a smart glass, a head mounted display (HMD)), a digital TV, a desktop computer, a digital signage, or the like. The respective servers within the content streaming system may be operated by a distribution server, and in this case, the data received by each server may be processed separately.

Meanwhile, intra prediction modes may include non-directional (or non-angular) intra prediction modes and directional (or angular) intra prediction modes.

Figure 5:
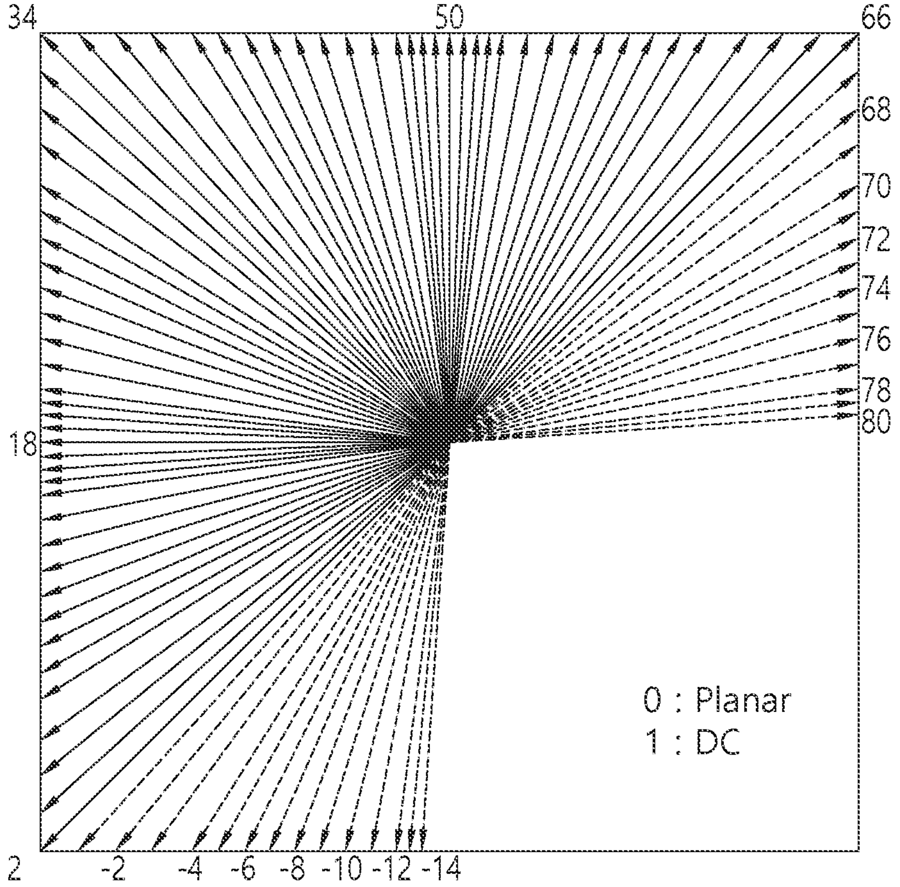
FIG. 5 exemplarily illustrates intra-directional modes of 65 prediction directions.

FIG. 5 illustrates an example of intra prediction modes to which embodiments of the present document can be applied.

Referring to FIG. 5, it is possible to distinguish between intra prediction mode having horizontal directionality and intra prediction mode having vertical directionality centering on intra prediction mode 34 having an upward-left diagonal prediction direction. That is, as shown in FIG. 5, intra prediction mode 2 to 33 have a horizontal direction, and intra prediction mode 34 to 66 have a vertical direction. The intra prediction mode 18 and the intra prediction mode 50 represent a horizontal intra prediction mode and a vertical intra prediction mode, respectively, the intra prediction mode 2 may be referred to as a downward-left diagonal intra prediction mode, the intra prediction mode 34 may be referred to as a top-left diagonal intra prediction mode, and the intra prediction mode 66 may be referred to as a top-left diagonal intra prediction mode. The non-directional prediction modes may include a planar intra prediction mode of mode number 0 and a DC intra prediction mode of mode number 1.

Figure 6:
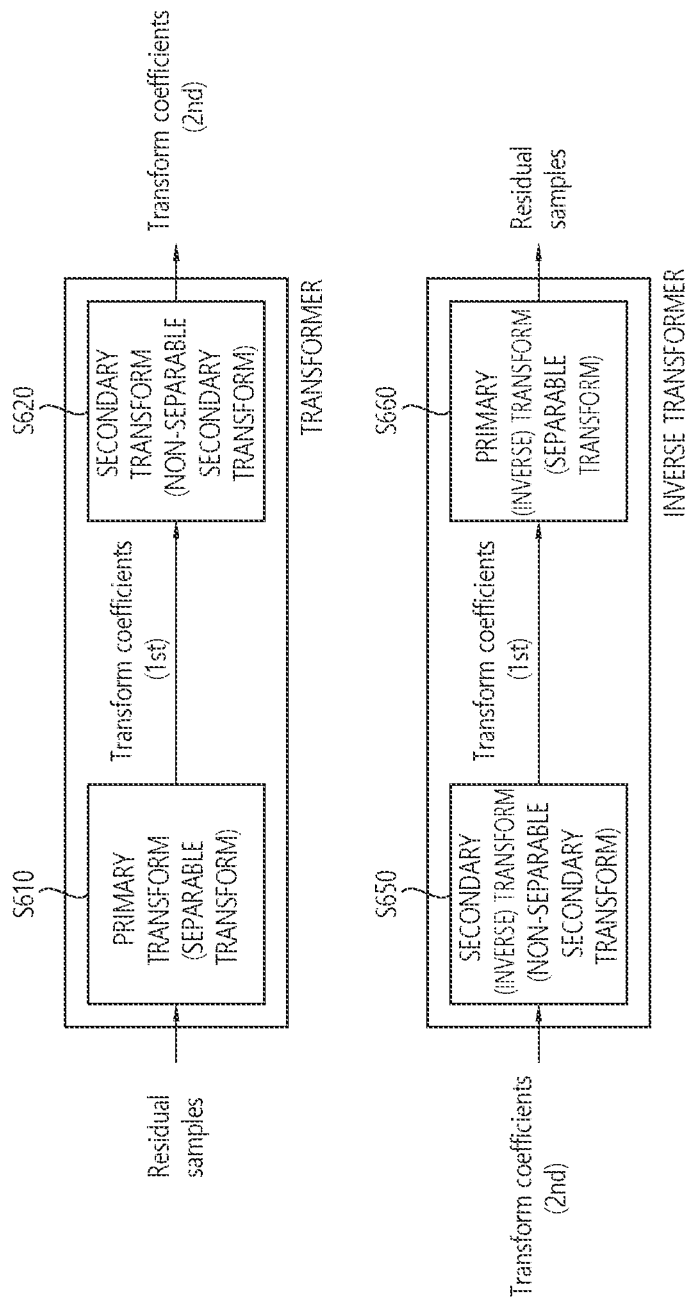
FIG. 6 schematically illustrates a transform technique according to an embodiment of the present document.

FIG. 6 schematically illustrates a transform technique according to an embodiment of the present disclosure.

Referring to FIG. 6, a transformer may correspond to the transformer in the encoding apparatus of foregoing FIG. 2, and an inverse transformer may correspond to the inverse transformer in the encoding apparatus of foregoing FIG. 2, or to the inverse transformer in the decoding apparatus of FIG. 3.

The transformer may derive (primary) transform coefficients by performing a primary transform based on residual samples (residual sample array) in a residual block (S610). This primary transform may be referred to as a core transform. Herein, the primary transform may be based on multiple transform selection (MTS), and when a multiple transform is applied as the primary transform, it may be referred to as a multiple core transform.

The multiple core transform may represent a method of transforming additionally using discrete cosine transform (DCT) type 2 and discrete sine transform (DST) type 7, DCT type 8, and/or DST type 1. That is, the multiple core transform may represent a transform method of transforming a residual signal (or residual block) of a space domain into transform coefficients (or primary transform coefficients) of a frequency domain based on a plurality of transform kernels selected from among the DCT type 2, the DST type 7, the DCT type 8 and the DST type 1. Herein, the DCT type 2, the DST type 7, the DCT type 8, and the DST type 1 may be called a transform type, transform kernel or transform core. These DCT/DST transform types can be defined based on basis functions.

When the multiple core transform is performed, a vertical transform kernel and a horizontal transform kernel for a target block may be selected from among the transform kernels, a vertical transform may be performed on the target block based on the vertical transform kernel, and a horizontal transform may be performed on the target based on the horizontal transform kernel. Here, the horizontal transform may indicate a transform on horizontal components of the target block, and the vertical transform may indicate a transform on vertical components of the target block.

According to an example, if the primary transform is performed by applying the MTS, a mapping relationship for transform kernels may be set by setting specific basis functions to predetermined values and combining basis functions to be applied in the vertical transform or the horizontal transform. For example, when the horizontal transform kernel is expressed as trTypeHor and the vertical direction transform kernel is expressed as trTypeVer, a trTypeHor or trTypeVer value of 0 may be set to DCT2, a trTypeHor or trTypeVer value of 1 may be set to DST7, and a trTypeHor or trTypeVer value of 2 may be set to DCT8.

In this case, MTS index information may be encoded and signaled to the decoding apparatus to indicate any one of a plurality of transform kernel sets. For example, an MTS index of 0 may indicate that both trTypeHor and trTypeVer values are 0, an MTS index of 1 may indicate that both trTypeHor and trTypeVer values are 1, an MTS index of 2 may indicate that the trTypeHor value is 2 and the trTypeVer value. Is 1, an MTS index of 3 may indicate that the trTypeHor value is 1 and the trTypeVer value is 2, and an MTS index of 4 may indicate that both both trTypeHor and trTypeVer values are 2.

In one example, transform kernel sets according to MTS index information are illustrated in the following table.

TABLE 1

| tu_mts_idx[ x0 ][ y0 ] | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

The transformer may derive modified (secondary) transform coefficients by performing the secondary transform based on the (primary) transform coefficients (S620). The primary transform is a transform from a spatial domain to a frequency domain, and the secondary transform refers to transforming into a more compressive expression by using a correlation existing between (primary) transform coefficients. The secondary transform may include a non-separable transform. In this case, the secondary transform may be referred to as a non-separable secondary transform (NSST), or a mode-dependent non-separable secondary transform (MDNSST).

The non-separable secondary transform may represent a transform which generates modified transform coefficients (or secondary transform coefficients) for a residual signal by secondary-transforming, based on a non-separable transform matrix, (primary) transform coefficients derived through the primary transform. At this time, the vertical transform and the horizontal transform may not be applied separately (or horizontal and vertical transforms may not be applied independently) to the (primary) transform coefficients, but the transforms may be applied at once based on the non-separable transform matrix. For example, in case of the non-separable secondary transform, two-dimensional signals (transform coefficients) are re-arranged to a one-dimensional signal through a certain determined direction (e.g., row-first direction or column-first direction), and then modified transform coefficients (or secondary transform coefficients) are derived based on the matrix operation between this one-dimensional vector and the non-separable transform matrix.

For example, according to a row-first order, M×N blocks are disposed in a line in an order of a first row, a second row, . . . , and an Nth row. According to a column-first order, M×N blocks are disposed in a line in an order of a first column, a second column, . . . , and an Nth column. That is, for the non-separable secondary transform, the transform coefficients derived through the primary transform may be arranged in a one-dimensional vector according to the row-first order direction and then, the matrix operation may be performed to the transform coefficients, or arranged in a one-dimensional vector according to the column-first order direction, and then, the matrix operation may be performed to the transform coefficients.

The non-separable secondary transform may be applied to a top-left region of a block configured with (primary) transform coefficients (hereinafter, may be referred to as a transform coefficient block or a transform block). For example, if the width (W) and the height (H) of the transform coefficient block are all equal to or greater than 8, an 8×8 non-separable secondary transform may be applied to a top-left 8×8 region of the transform coefficient block. Further, if the width (W) and the height (H) of the transform coefficient block are all equal to or greater than 4, and the width (W) or the height (H) of the transform coefficient block is less than 8, then a 4×4 non-separable secondary transform may be applied to a top-left min(8,W)×min(8,H) region of the transform coefficient block. However, the embodiment is not limited to this, and for example, even if only the condition that the width (W) or height (H) of the transform coefficient block is equal to or greater than 4 is satisfied, the 4×4 non-separable secondary transform may be applied to the top-left min(8,W)×min(8,H) region of the transform coefficient block. In summary, the non-separable secondary transform may be applied to a 4×4 or 8×8 region at the top-left of the transform block according to the size of the transform block. According to an example, the transform for the top-left 4×4 region may be named a 4×4 transform, and the transform for the top-left 8×8 region may be referred to as an 8×8 transform.

Here, to select a transform kernel, two non-separable secondary transform kernels per transform set for a non-separable secondary transform may be configured for both the 8×8 transform and the 4×4 transform, and there may be four transform sets. That is, four transform sets may be configured for the 8×8 transform, and four transform sets may be configured for the 4×4 transform. In this case, each of the four transform sets for the 8×8 transform may include two 8×8 transform kernels, and each of the four transform sets for the 4×4 transform may include two 4×4 transform kernels.

However, as the size of the transform, that is, the size of a region to which the transform is applied, may be, for example, a size other than 8×8 or 4×4, the number of sets may be n, and the number of transform kernels in each set may be k.

The transform set may be referred to as an NSST set or an LFNST set. A specific set among the transform sets may be selected, for example, based on the intra prediction mode of the current block (CU or subblock). A low-frequency non-separable transform (LFNST) may be an example of a reduced non-separable transform, which will be described later, and may represent a non-separable transform for a low frequency component.

On the other hand, when it is determined that a specific set is used for the non-separable transform, one of k transform kernels in the specific set may be selected through a non-separable secondary transform index. An encoding apparatus may derive a non-separable secondary transform index indicating a specific transform kernel based on a rate-distortion (RD) check and may signal the non-separable secondary transform index to a decoding apparatus. The decoding apparatus may select one of the k transform kernels in the specific set based on the non-separable secondary transform index. For example, lfnst index value 0 may refer to a first non-separable secondary transform kernel, lfnst index value 1 may refer to a second non-separable secondary transform kernel, and lfnst index value 2 may refer to a third non-separable secondary transform kernel. Alternatively, lfnst index value 0 may indicate that the first non-separable secondary transform is not applied to the target block, and lfnst index values 1 to 3 may indicate the three transform kernels.

The transformer may perform the non-separable secondary transform based on the selected transform kernels, and may obtain modified (secondary) transform coefficients. As described above, the modified transform coefficients may be derived as transform coefficients quantized through the quantizer, and may be encoded and signaled to the decoding apparatus and transferred to the dequantizer/inverse transformer in the encoding apparatus.

Meanwhile, as described above, if the secondary transform is omitted, (primary) transform coefficients, which are an output of the primary (separable) transform, may be derived as transform coefficients quantized through the quantizer as described above, and may be encoded and signaled to the decoding apparatus and transferred to the dequantizer/inverse transformer in the encoding apparatus.

The inverse transformer may perform a series of procedures in the inverse order to that in which they have been performed in the above-described transformer. The inverse transformer may receive (dequantized) transformer coefficients, and derive (primary) transform coefficients by performing a secondary (inverse) transform (S630), and may obtain a residual block (residual samples) by performing a primary (inverse) transform on the (primary) transform coefficients (S640). In this connection, the primary transform coefficients may be called modified transform coefficients from the viewpoint of the inverse transformer. As described above, the encoding apparatus and the decoding apparatus may generate the reconstructed block based on the residual block and the predicted block, and may generate the reconstructed picture based on the reconstructed block.

The inverse transformer may derive the modified transform coefficients by applying a transform kernel matrix to transformed (inverse quantized) transform coefficients arranged in a specific order, for example, in a diagonal scan order (specifically, a diagonal scan order starting from the top left corner of the transform block and proceeding in the bottom right direction). The modified transform coefficients may be arranged in two dimensions in the top left region of the transform block according to the direction in which the transform coefficients are scanned for the secondary transform in the transformer, that is, the row-first direction or the column-first direction. When the transformer performs the 4×4 transform, the inverse transformer may arrange the modified transform coefficients in two dimensions in the 4×4 region of the transform block, and when the transformer performs the 8×8 transform, the inverse transformer may arrange the modified transform coefficients in two dimensions in the 8×8 region of the transform block.

Meanwhile, the secondary inverse transform may be NSST, reduced secondary transform (RST) or LFNST, and whether to apply the secondary inverse transform may be determined based on a secondary transform flag parsed from a bitstream. As another example, whether to apply the secondary inverse transform may be determined based on transform coefficients of the residual block.

This secondary inverse transform (i.e. transform kernel, transform matrix or transform kernel matrix) may be determined based on the LFNST (NSST or RST) transform set specified according to the intra prediction mode. Also, as an embodiment, the secondary transform determination method may be determined depending on the primary transform determination method. Depending on the intra prediction mode, various combinations of primary transform and secondary transform may be determined. Also, for example, a region to which a secondary inverse transform is applied may be determined based on the size of the current block.

Meanwhile, as described above, if the secondary (inverse) transform is omitted, (dequantized) transform coefficients may be received, the primary (separable) inverse transform may be performed, and the residual block (residual samples) may be obtained. As described above, the encoding apparatus and the decoding apparatus may generate the reconstructed block based on the residual block and the predicted block, and may generate the reconstructed picture based on the reconstructed block.

Meanwhile, in the present disclosure, a reduced secondary transform (RST) in which the size of a transform matrix (kernel) is reduced may be applied in the concept of NSST in order to reduce the amount of computation and memory required for the non-separable secondary transform. In addition, since the RST is mainly performed in a low-frequency region including non-zero coefficients in a transform block, it may be referred to as a low-frequency non-separable transform (LFNST). The transform index may be named LFNST index.

In this disclosure, the LFNST may mean a transform performed on residual samples of a target block based on a transform matrix having a reduced size. When the reduced transform is performed, the amount of computation required for transform may be reduced due to the reduction in the size of the transform matrix. That is, the LFNST can be used to solve the computational complexity issue that occurs when transforming or non-separable transforming a large block.

Meanwhile, when the secondary inverse transform is performed based on LFNST, the inverse transformer 235 of the encoding apparatus 200 and the inverse transformer 322 of the decoding apparatus 300 may include an inverse reduced secondary transformer which derives modified transform coefficients based on the inverse RST of the transform coefficients, and an inverse primary transformer which derives residual samples for the target block based on the inverse primary transform of the modified transform coefficients. The inverse primary transform refers to the inverse transform of the primary transform applied to the residual. In the present disclosure, deriving a transform coefficient based on a transform may refer to deriving a transform coefficient by applying the transform.

Figure 7:
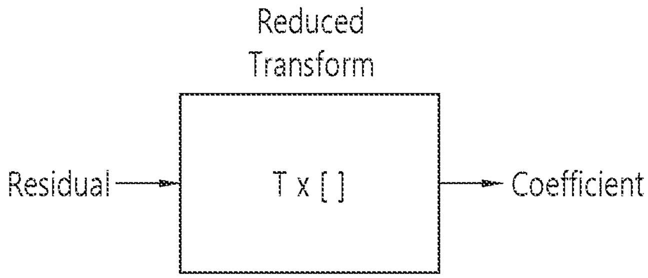
FIG. 7 is a diagram for explaining RST according to an embodiment of the present document.
Figure 7:
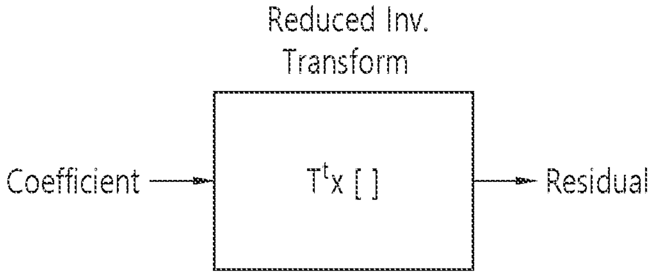

FIG. 7 is a diagram for explaining RST or LFNST to which RST is applied according to an embodiment of this document.

In the present disclosure, a "target block" may refer to a current block to be coded, a residual block, or a transform block.

In the RST according to an example, an N-dimensional vector may be mapped to an R-dimensional vector located in another space, so that the reduced transform matrix may be determined, where R is less than N. N may mean the square of the length of a side of a block to which the transform is applied, or the total number of transform coefficients corresponding to a block to which the transform is applied, and the reduced factor may mean an R/N value. The reduced factor may be referred to as a reduced factor, reduction factor, reduced factor, simple factor or other various terms. Meanwhile, R may be referred to as a reduced coefficient, but according to circumstances, the reduced factor may mean R. Further, according to circumstances, the reduced factor may mean the N/R value.

The size of the reduced transform matrix according to an example may be R×N less than N×N, the size of a conventional transform matrix, and may be defined as in Equation 1 below.

$$T_{R\times N} = \begin{bmatrix} t_{11} & t_{12} & t_{13} & \cdots & t_{1N} \\ t_{21} & t_{22} & t_{23} & & t_{2N} \\ & \vdots & & \ddots & \vdots \\ t_{R1} & t_{R2} & t_{R3} & \cdots & t_{RN} \end{bmatrix}$$ [Equation 1]

The matrix T in the Reduced Transform block shown in (a) of FIG. 7 may mean the matrix $T_{R\times N}$ of Equation 1. As shown in (a) of FIG. 7, when the reduced transform matrix $T_{R\times N}$ is multiplied to residual samples for the target block, transform coefficients for the target block may be derived.

In an example, if the size of the block to which the transform is applied is 8×8 and R=16 (i.e., R/N=16/64=1/4), then the RST according to (a) of FIG. 7 may be expressed as a matrix operation as shown in Equation 2 below. In this case, memory and multiplication calculation can be reduced to approximately ¼ by the reduced factor.

In the present disclosure, a matrix operation may be understood as an operation of multiplying a column vector by a matrix, disposed on the left of the column vector, to obtain a column vector.

$$\begin{bmatrix} t_{1,1} & t_{1,2} & t_{1,3} & \cdots & t_{1,64} \\ t_{2,1} & t_{2,2} & t_{2,3} & & t_{2,64} \\ \vdots & & & \ddots & \vdots \\ t_{16,1} & t_{16,2} & t_{16,3} & \cdots & t_{16,64} \end{bmatrix} \times \begin{bmatrix} r_1 \\ r_2 \\ \vdots \\ r_{64} \end{bmatrix} \quad \text{[Equation 2]}$$

In Equation 2, $r_1$ to $r_{64}$ may represent residual samples for the target block and may be specifically transform coefficients generated by applying a primary transform. As a result of the calculation of Equation 2 transform coefficients ci for the current block may be derived, and a process of deriving ci may be as in Equation 3.

[Equation 3]

```
for i from 1 to R:
    c_i = 0
    for j from 1 to N:
        c_i += t_{i,j} * r_j
```

As a result of the calculation of Equation 3, transform coefficients $c_1$ to $c_R$ for the target block may be derived. That is, when R=16, transform coefficients $c_1$ to $c_{16}$ for the target block may be derived. If, instead of RST, a regular transform is applied and a transform matrix of 64×64 (N×N) size is multiplied to residual samples of 64×1 (N×1) size, then only 16 (R) transform coefficients are derived for the target block because RST was applied, although 64 (N) transform coefficients are derived for the target block. Since the total number of transform coefficients for the target block is reduced from N to R, the amount of data transmitted by the encoding apparatus 200 to the decoding apparatus 300 decreases, so efficiency of transmission between the encoding apparatus 200 and the decoding apparatus 300 can be improved.

When considered from the viewpoint of the size of the transform matrix, the size of the regular transform matrix is 64×64 (N×N), but the size of the reduced transform matrix is reduced to 16×64 (R×N), so memory usage in a case of performing the LFNST can be reduced by an R/N ratio when compared with a case of performing the regular transform. In addition, when compared to the number of multiplication calculations N×N in a case of using the regular transform matrix, the use of the reduced transform matrix can reduce the number of multiplication calculations by the R/N ratio (R×N).

In an example, the transformer 232 of the encoding apparatus 200 may derive transform coefficients for the target block by performing the primary transform and the RST-based secondary transform on residual samples for the target block. These transform coefficients may be transferred to the inverse transformer of the decoding apparatus 300, and the inverse transformer 322 of the decoding apparatus 300 may derive the modified transform coefficients based on the inverse reduced secondary transform (RST) for the transform coefficients, and may derive residual samples for the target block based on the inverse primary transform for the modified transform coefficients.

The size of the inverse RST matrix $T_{N\times R}$ according to an example is N×R less than the size N×N of the regular inverse transform matrix, and is in a transpose relationship with the reduced transform matrix $T_{R\times N}$ shown in Equation 1.

The matrix $T^t$ in the Reduced Inv. Transform block shown in (b) of FIG. 7 may mean the inverse RST matrix $T_{R\times N}^T$ (the superscript T means transpose). When the inverse RST matrix $T_{R\times N}^T$ is multiplied to the transform coefficients for the target block as shown in (b) of FIG. 7, the modified transform coefficients for the target block or the residual samples for the target block may be derived. The inverse RST matrix $T_{R\times N}^T$ may be expressed as $(T_{R\times N})^T N\times R$.

More specifically, when the inverse RST is applied as the secondary inverse transform, the modified transform coefficients for the target block may be derived when the inverse RST matrix $T_{R\times N}^T$ is multiplied to the transform coefficients for the target block.

Meanwhile, according to an example, the inverse RST may be applied as the inverse primary transform, and in this case, the residual samples for the target block may be derived when the inverse RST matrix $T_{R\times N}^T$ is multiplied to the transform coefficients for the target block.

In an example, if the size of the block to which the inverse transform is applied is 8×8 and R=16 (i.e., R/N=16/64=1/4), then the RST according to (b) of FIG. 7 may be expressed as a matrix operation as shown in Equation 4 below.

$$\begin{bmatrix} t_{1,1} & t_{2,1} & & t_{16,1} \\ t_{1,2} & t_{2,2} & \cdots & t_{16,2} \\ t_{1,3} & t_{2,3} & & t_{16,3} \\ \vdots & \vdots & & \vdots \\ & \vdots & \ddots & \vdots \\ t_{1,64} & t_{2,64} & \cdots & t_{16,64} \end{bmatrix} \times \begin{bmatrix} c_1 \\ c_2 \\ \vdots \\ c_{16} \end{bmatrix} \quad \text{[Equation 4]}$$

In Equation 4, $c_1$ to $c_{16}$ may represent transform coefficients of the target block, that is, transform coefficients derived through residual coding. As a result of the operation of Equation 4, $r_1$ representing modified transform coefficients of the target block or residual samples of the target block may be derived, and the derivation process of $r_i$ may be the same as Equation 5.

[Equation 5]

```
For i from 1 to N
    r_i = 0
        for j from 1 to R
            r_i += t_{ji} × c_j
```

As a result of the operation of Equation 5, $r_1$ to $r_N$ indicating modified transform coefficients of the target block or residual samples of the target block may be derived. Since N is 64 in Equation 4, 64 modified transform coefficients can be derived through Equation 5.

Considering the size of the inverse transform matrix, the size of the normal inverse transform matrix is 64×64 (N×N), but the size of the reduced inverse transform matrix is reduced to 64×16 (N×R), and compared to performing the normal inverse transform, the memory usage can be reduced by R/N ratio when performing the inverse RST. In addition, compared to the number of multiplication operations N×N when using the normal inverse transform matrix, the number of multiplication operations can be reduced by an R/N ratio (N×R) when a reduced inverse transform matrix is used. A reduced inverse transform matrix or inverse transform matrix may also be named a reduced transform matrix or a transform matrix if it is not confusing whether it is a transform or an inverse transform.

According to an embodiment of the present disclosure, for a transform in an encoding process, only 48 pieces of data may be selected and a maximum 16×48 transform kernel matrix may be applied thereto, rather than applying a 16×64 transform kernel matrix to 64 pieces of data forming an 8×8 region. Here, "maximum" means that m has a maximum value of 16 in an m×48 transform kernel matrix for generating m coefficients.

That is, when an RST is performed by applying an m×48 transform kernel matrix (m≤16) to an 8×8 region, 48 pieces of data are input and m coefficients are generated. When m is 16, 48 pieces of data are input and 16 coefficients are generated. That is, assuming that 48 pieces of data form a 48×1 vector, a 16×48 matrix and a 48×1 vector are sequentially multiplied, thereby generating a 16×1 vector. In this embodiment, the column vectors of Equation 2 are $r_1$ to $r_4$s, the size of the transform matrix is 16×48, and 16 modified transform coefficients ($c_1$ to $c_{16}$) are derived through matrix operation.

At this time, a 48×1 vector can be configured by appropriately arranging 48 pieces of data constituting an 8×8 region. For example, a 48×1 vector may be constructed based on 48 pieces of data constituting an region excluding the 4×4 region at the bottom right of the 8×8 region. At this time, when matrix operation is performed by applying the maximum 16×48 transform kernel matrix, 16 modified transform coefficients are generated. The 16 modified transform coefficients can be arranged in the top left 4×4 region according to the scanning order, and the top right 4×4 region and the bottom left 4×4 region can be filled with zeros.

For the inverse transform of the decoding process, a transposed matrix of the transform kernel matrix described above may be used. That is, when inverse RST or inverse LFNST is performed as an inverse transform process performed by the decoding apparatus, the input coefficient data to which the inverse RST is applied is composed of a 1-dimensional vector according to a predetermined arrangement order (diagonal scanning order), and the modified coefficient vector obtained by multiplying the 1-dimensional vector by the corresponding inverse RST matrix from the left side may be arranged in a 2-dimensional block according to a predetermined arrangement order.

If RST or LFNST is performed in the 8×8 region and inverse RST or inverse LFNST is performed, the size of the transform matrix of Equation 4 is 48×16, the column vector includes $c_1$ to $c_{16}$, and 48 modified transform coefficients ($r_1$ to $r_4$s) are derived through the matrix operation.

In summary, in the transform process performed by the encoding apparatus, when RST or LFNST is applied to the 8×8 region, the matrix operation of the 48 transform coefficients of the top left, top right, and bottom left regions of the 8×8 region excluding the bottom right region of the 8×8 region among the transform coefficients of the 8×8 region and the 16×48 transform kernel matrix is performed. For the matrix operation, the 48 transform coefficients are input as a one-dimensional array. When this matrix operation is performed, 16 modified transform coefficients are derived, and the 16 modified transform coefficients may be arranged in the top left region of the 8×8 region.

Conversely, in the inverse transform process performed by the encoding apparatus or the decoding apparatus, when the inverse RST or LFNST is applied to the 8×8 region, 16 transform coefficients at the top left of the 8×8 region among the transform coefficients of the 8×8 region may be input in the form of a 1-dimensional array according to a scanning order and subjected to matrix operation with a 48×16 transform kernel matrix. That is, the matrix operation in this case can be expressed as (48×16 matrix)*(16×1 transform coefficient vector)=(48×1 modified transform coefficient vector). Here, since the n×1 vector can be interpreted in the same sense as an n×1 matrix, it can also be expressed as an n×1 column vector. Also, * means matrix multiplication operation. When this matrix operation is performed, the 48 modified transform coefficients can be derived, and the 48 modified transform coefficients can be arranged in the top left, top right, and bottom left regions of the 8×8 region except for the bottom right region.

The following figures are made to explain a specific example of the present specification. Since the names of specific devices or specific signals/messages/fields described in the figures are provided as examples, the technical features of this specification are not limited to the specific names used in the figures below.

In following, various embodiments that extend the LFNST described above are discussed.

Embodiment 1: Method of Configuring ROI (Region of Interest) Representing the Input Data Region Based on Forward LFNST The forward LFNST receives as input transform coefficients to which the primary transform is applied. In this case, instead of receiving all transform coefficients as inputs, transform coefficients belonging to a specific region predefined in the transform block may be received as inputs.

Figure 8:
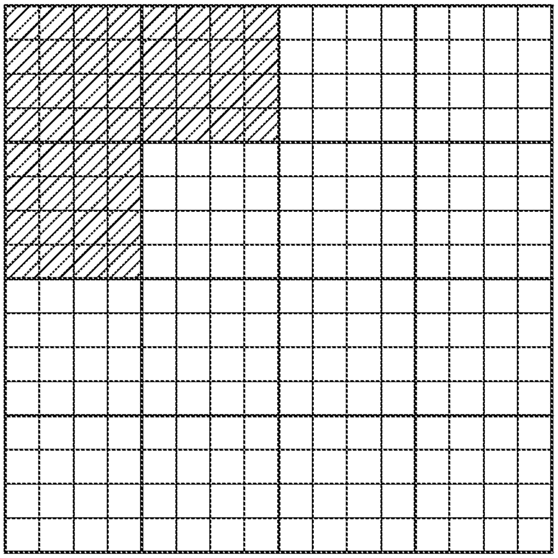
FIG. 8 is a diagram illustrating a forward LFNST input region according to an embodiment of the present document.
Figure 8:
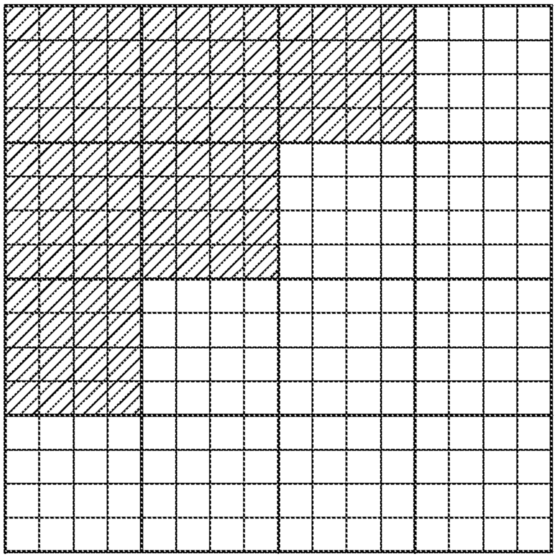

FIG. 8 (*a*) shows an example of a forward LFNST input area in the VVC standard, and up to the third position in the scan sequence for a 4×4 subblock is set as the corresponding input area. Hereinafter, this input region, that is, the region of input transform coefficients input for the forward LFNST is referred to as Region of Interest or ROI.

FIG. 8 (*b*) shows that 4th to 6th subblocks are added to the ROI in the scan order of the 4×4 subblock shown in FIG. 8 (*a*) to the ROI. That is, since the ROI is composed of six 4×4 sub-blocks, the RON in (b) of FIG. 8 is composed of a total of 96 samples based on the samples (here, the transformation coefficient to which the first transformation is applied). Compared to the ROI of FIG. 8 (*a*) used for VVC, in case of FIG. 8 (*b*), more primary transform coefficients can be considered in the LFNST. An extended LFNST (LFNST) based on such an extended ROI can provide higher encoding performance for a larger block (i.e., larger than or equal to 16×16) than the existing VVC LFNST.

When a non-separable transform matrix is derived based on N samples belonging to the ROI, an N×N transform matrix is derived when the corresponding transform matrix is a square matrix. Here, when the R described with reference to FIG. 7 is applied for the reduced transform, the R value may be equal to or smaller than N, the R value can be interpreted as the number of output transform coefficients derived by applying the LFNST from the perspective of the forward LFNST. Therefore, the dimension of the LFNST transform kernel corresponding to (b) of FIG. 8 is not only 96×96, but also 16×96, 32×96, 48×96, 64×96, 80×96, etc. (In this example, it can be seen as a 16 m×96 matrix (m≥1)). At this time, only cases in which the number of output transform coefficients is a multiple of 16 are allowed, and the R value may be any positive integer equal to or smaller than N (i.e., 96). When generating an R×96 matrix from a 96×96 square matrix, it can be generated by sampling R rows from the 96×96 matrix based on the forward LFNST. If the rows constituting the 96×96 matrix are arranged in order of importance from the top, the R×96 matrix can be constructed by sequentially sampling R rows from the top.

The ROIs in (a) and (b) of FIG. 8 are composed of 48 and 96 input samples (input transform coefficients or input data), respectively. The order of reading input samples in the ROI can be set in advance, but the order can be arbitrarily set basically. More specifically, when the forward LFNST matrix applied to an arbitrary ROI is an R×N matrix (i.e., the ROI consists of N input samples), even if it changes the order in which input samples are read, if it rearranges the N column vectors according to the changed order, compared to before the change, the output value does not change regardless of the order of the input samples (the output value consists of R transform coefficients).

Figure 9A:
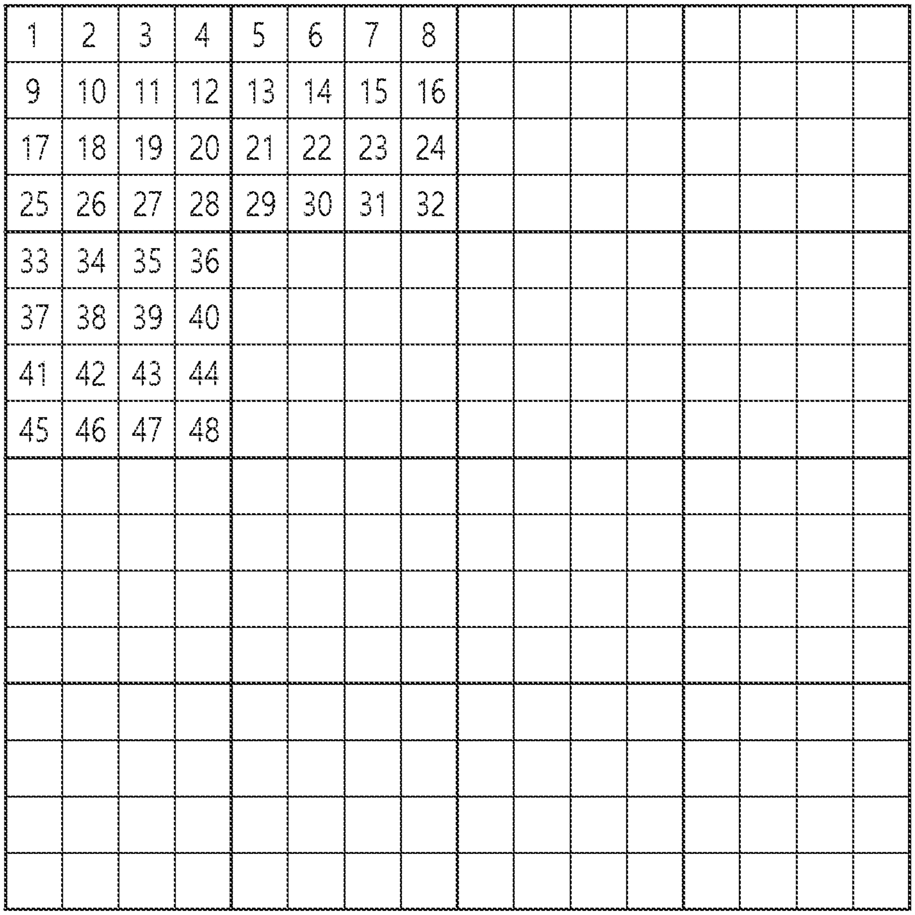

Meanwhile, for a specific forward LFNST transform matrix (that is, assuming that the position of column vectors is fixed), the input samples constituting the ROI may be read in the order shown in FIG. 9 or FIG. 10 and configured as an input vector. FIGS. 9*a* to 10*b* show the order of reading input data from ROI according to the intra prediction mode.

FIG. 9*a* and FIG. 10*a* correspond to (a) of FIG. 8, and FIG. 9*b* and FIG. 10*b* correspond to (b) of FIG. 8. If, like VVC LFNST, when applying symmetry centered on mode 34 for intra prediction modes, for modes −14 to −1 and 2 to 33 in FIG. 5, the row priority order is applied as shown in FIG. 9*a* and FIG. 9*b*, for modes 35 to 80, the column priority order is applied as shown in FIG. 10*a* and FIG. 10*b*. For modes 0, 1, and 34 indicating the planar mode and the DC mode, the same order as FIG. 9*a* and FIG. 9*b* may be applied as it is, and FIG. 9*a* and FIG. 9*b* or FIG. 10*a* and FIG. 10*b* may be applied for each mode.

As another example of the ROI, the top left quadrangular region of the transform block may be set as the ROI. That is, in the M×N transform block, the top left m×n (m≤M, n≤N) region can be set as the ROI, from the forward LFNST point of view, the number of input samples (transform coefficients after the first transform) is m×n. In a more specific embodiment, both m and n may be 8, and the dimension of the forward LFNST matrix may be R×64 (R is equal to or less than 64, examples of R values are 16, 32, 48, 64, etc.). A method of selecting R rows from an mn×mn square matrix (e.g., a 64×64 matrix) may be the same as the method of generating an R×96 matrix from a 96×96 described above.

Meanwhile, the ROT may not be composed of only 4×4 sub-blocks as shown in FIG. 8. In the VVC standard, a 4×4 subblock may correspond to a transform group (Coefficient Group, CG) for transform blocks to which LFNST may be applied, these CGs are not necessarily 4×4 sub-blocks. According to an example, the CG may be any predefined p×q sub block other than a 4×4 sub block. Even if a sub-block (CG) of a size other than the 4×4 sub-block is applied, regardless of the sub-block configuration, the order of reading the ROI input samples of the forward LFNST may follow a specific order determined as shown in FIG. 9*a* and FIG. 9*b* or FIG. 10*a* and FIG. 10*b*, transform coefficients output by the forward LFNST may be arranged according to the scan order of the corresponding CG and transform coefficients.

Figure 11:
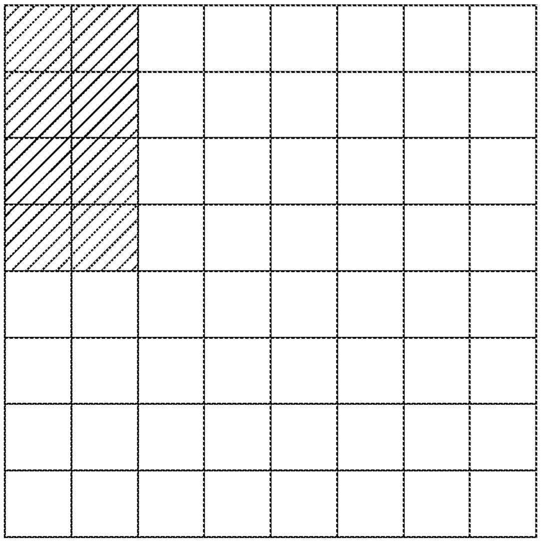
FIG. 11 is a diagram illustrating a non-square ROI according to an embodiment of the present document.
Figure 11:
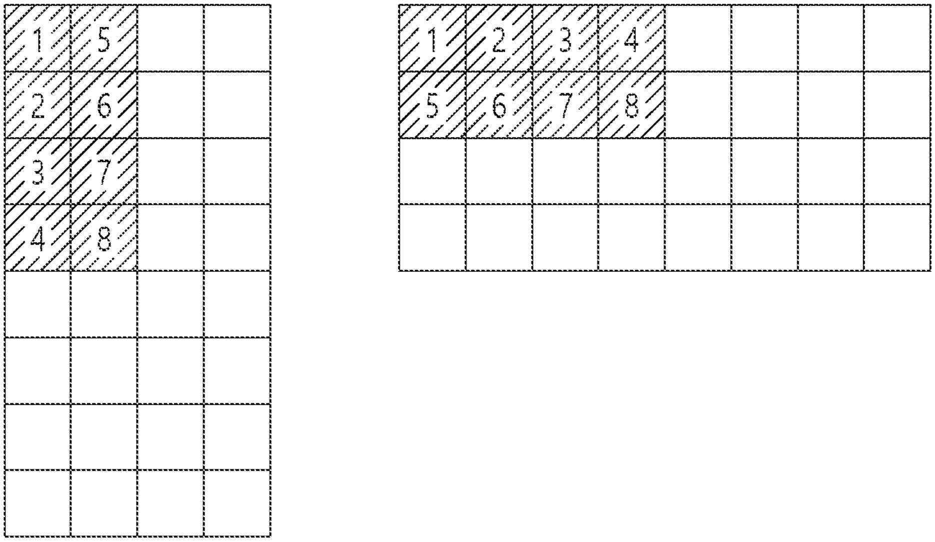

If the ROI is non-square rather than square (i.e., m≠n for the top left region m×n), symmetry between intra prediction modes that are symmetric for one M×N transform block (For example, modes 24 and 44, as two symmetrical mode around mode 34) cannot be used. FIG. 11 is a diagram illustrating a non-square ROI according to an embodiment of this document. For a case where ROT is non-square as illustrated in (a) of FIG. 11, when comparing reading the input samples in row-first direction and reading column-first direction, the symmetry cannot be used because the phases of the transform coefficients for the two cases are not aligned. In this case, two symmetric modes with one M×N block cannot share the LFNST kernel by using the symmetry of the prediction direction. However, between the M×N transform block and the N×M transform block, the symmetry of the intra prediction mode, which is symmetrical around mode 34, can be utilized.

For example, as shown in (b) of FIG. 11, if the ROIs in the M×N block and N×M block are the upper left m×n region and the upper left n×m region, respectively, for mode 2 and mode 66, the input samples can be read according to the order shown in (b) of FIG. 11. That is, for mode 2, input samples can be read according to the order of the left side of FIG. 11 (*b*), and for mode 66, input samples can be read according to the order of the right side of FIG. 11 (*b*). If the input samples are read using the symmetry of the two prediction modes, the same LFNST kernel can be applied to the two ROIs in (b) of FIG. 11.

As another example, ROIs with somewhat irregular shapes can also be applied to LFNST. According to one example, the ROI may be composed of lines with different lengths each other, or the ROI may be composed of segments of non-contiguous samples.

Meanwhile, in the VVC standard, different LFNST kernels are configured to be applied according to the transform block size. That is, for a 4×4 transform block or a 4×N/N×4 (N≥8) transform block (a transform block whose horizontal and vertical lengths are both greater than or equal to 4 and the horizontal or vertical length is 4), an LFNST kernel having a 16×16 matrix form applicable to the top left 4×4 region is applied (which can be named LFNST_4×4). Also, for transform blocks whose horizontal and vertical lengths are both equal to or greater than 8, the ROI consists of the top left 4×4 subblock, the 4×4 subblock adjacent to the right of the top left 4×4 subblock, and the 4×4 subblock adjacent to the bottom of the top left 4×4 subblock, and an LFNST kernel with a 16×48 matrix form based on forward LFNST is applied to ROI (can be named LFNST_8×8).

LFNST_4×4 and LFNST_8×8 each consist of 4 sets, each set consists of 2 transform kernels, which set of kernels to apply is determined by the intra prediction mode. For the determined set, which of the two kernels to apply and whether to apply LFNST may be specified through signaling of the LFNST index. If the LFNST index value is 0, LFNST is not applied, if it is 1, the first kernel may be applied, and if it is 2, the second kernel may be applied.

As described above, the LFNST structure in the VVC standard has been simplified and described, but there may be also some exceptions. For example, for a 4×4 transform block and an 8×8 transform block, an 8×16 matrix and an 8×48 matrix sampled from the corresponding matrix are applied as forward LFNST, rather than a 16×16 matrix and a 16×48 matrix, respectively, when the MIP prediction mode is applied, the intra prediction mode may be regarded as a planner mode and the LFNST set may be determined.

Since the LFNST_4×4 and LFNST_8×8 are each composed of 4 LFNST sets, a bundle of LFNST sets named LFNST_4×4 or LFNST_8×8 may be represented by an LFNST set list for convenience of description below.

Meanwhile, in this disclosure, LFNST_8×8 may indicate an LFNST set list applied to a transform block having a horizontal length or a vertical length of 8 with both horizontal and vertical lengths greater than or equal to 8, additionally, an LFNST set list applied to a transform block having both a horizontal length and a vertical length greater than or equal to 16 may be named LFNST_16×16.

Additional embodiments of matrix dimensions and ROIs that LFNST_4×4, LFNST_8×8, and LFNST_16×16 may have are as follows. In the following embodiment, the transform matrix is based on when forward transform is applied.

1. LFNST_4×4 can have a 16×16 matrix, and the ROI can be the top left 4×4 area.
2. LFNST_8×8 can have an R×48 matrix or an S×64 matrix, and 16, 32, and 48 are possible as R values and 16, 32, 48, and 64 are possible as S values. The ROI for the R×48 matrix may be (a) of FIG. 8, and the ROI for the S×64 matrix may be an 8×8 area in the top left corner.
3. LFNST_16×16 can have R×96 matrix or S×64 matrix or T×48 matrix, 16, 32, 48, 64, 80, 96 are possible as R values, 16, 32, 48, 64 are available as S values, T values of 16, 32, and 48 are possible. The ROI for the R×96 matrix may be (b) in FIG. 8 and the ROI for the S×64 matrix may be an 8×8 area in the top left corner, and the ROI for the T×48 matrix may be (a) in FIG. 8.

As an architecture for LFNST_4×4, LFNST_8×8, and LFNST_16×16, any combination of matrix dimensions and ROI suggested in Nos. 1, 2, and 3 above is possible. For example, in the case of LFNST_4×4, the ROI of the top left 4×4 area is applied to a 16×16 matrix, in the case of LFNST_8×8, the ROT of the top left 8×8 area is applied to a 32×64 matrix, in the case of LFNST_16×16, the ROI shown in (b) of FIG. 8 may be applied to a 32×96 matrix.

In addition, if anyone pair of LFNST_4×4, LFNST_8×8, and LFNST_16×16 has the same matrix dimension, it can share the LFNST set and LFNST kernel for that pair. For example, if the matrix dimension of LFNST_8×8 is 32×64 and the matrix dimension of LFNST_16×16 is 32×64, the same LFNST set list can be assigned to LFNST_8×8 and LFNST_16×16, and the same ROI can be set (for example, the ROI can be set to the top left 8×8 area).

As another example, when the matrix dimension of LFNST_8×8 is 32×48 and the matrix dimension of LFNST_16×16 is 32×48, the same LFNST set list can be allocated to LFNST_8×8 and LFNST_16×16, and the same ROI can be set (for example, the ROI can be set as shown in (a) of FIG. 8).

On the other hand, when inverse LFNST is applied, when an input vector is constructed with R transform coefficients as input and the left side of the input vector is multiplied by an N×R matrix, N output samples (output transform coefficients) are generated. Here, the N×R matrix becomes a transposed matrix of the R×N matrix in the forward LFNST, and N output samples may be arranged in ROIs of FIGS. 8 to 14. When arranged in the ROI, the order shown in FIG. 9 or FIG. 10 may be followed according to the intra prediction mode value. For example, when utilizing symmetry between intra prediction modes, the row priority order of FIG. 9 may be applied to intra prediction modes −14 to −1 and 2 to 33, the column priority order of FIG. 10 may be applied to modes 35 to 80. Regarding modes 0, 1, and 34, which indicate planar mode and DC mode, the order of FIG. 9*a* and FIG. 9*b* may be applied to all, or the order of FIG. 9*a* and FIG. 9*b* or the order of FIG. 10*a* and FIG. 10*b* may be applied for each mode.

Embodiment 2: Method of Configuring Output Data Based on Forward LFNST

In the VVC standard, the scan order for transform coefficients is hierarchically configured. There is a scan order for CGs and there is an internal scan order for each CG. FIG. 12 is a diagram showing the order of scanning these transform coefficients. As shown in FIG. 12, the scanning sequence proceeds in a diagonal direction from bottom left to top right. In FIG. 12, a small square may represent one transform coefficient and a number inside the small square indicates a scan order.

If scanning from the bottom left to the top right once in CG units is one scan line, the first scan line consists of 1 CG and the second and third scan lines consist of two and three CGs, respectively, according to the same method, the Nth scan line is also composed of a plurality of CGs.

The ROIs shown in (a) of FIG. 8 and (b) of FIG. 8 are both composed of these CG-unit scan lines. (a) of FIG. 8 and (b) of FIG. 8 show an ROI composed of the first two and three scan lines, respectively, naturally, the ROI may consist of more scan lines.

As described above, when the number of output transform coefficients in the forward LFNST criterion is R and the number of input samples is N, R may be set less than or equal to N. In particular, as shown in FIG. 8, R may be set to a multiple of 16 (i.e., R=16k, k≥1). This is set so that the number of output transform coefficients of the forward LFNST is a multiple of the number of samples present in one CG, considering the case where the CG for the transform block to which the LFNST is applied is a 4×4 subblock. Therefore, if R is set to a multiple of 16, transform coefficients obtained by applying forward LFNST can be designed to be arranged only in specific 4×4 subblocks. Through this design, the residual coding part and the LFNST index signaling design can be further simplified.

For example, if a transform coefficient is parsed in a region other than a region in which the LFNST transform coefficient may exist, signaling of the LFNST index may be omitted and it may be inferred that the LFNST is not applied. Here, if an area where LFNST transform coefficients can exist is configured in units of 4×4 subblocks and residual coding is performed in units of corresponding 4×4 subblocks, it can be performed more simply to check whether a transform coefficient exists in an area other than the area where the LFNST transform coefficient can exist.

According to another embodiment, the CG may have a shape other than a 4×4 sub-block, and in this case (e.g. m×n block, m≠n), the R value may be set to a multiple of m×n. In addition, CGs in which forward LFNST output transform coefficients may exist may be composed of the first k CGs arranged according to the scanning order of the CGs.

Basically, the output coefficients of the forward LFNST can be arranged according to the transform coefficient scanning order. Since row vectors of the forward LFNST kernel are usually arranged from top to bottom in order of importance, assuming that the transform coefficients constituting the output vector are arranged in order from top to bottom (here, the output vector is assumed to be a column vector), coefficients can be arranged sequentially, starting with more significant coefficients. It is usually assumed that the order of scanning the transform coefficients is to scan from the most important coefficients, as the distance from the DC position is increased by scanning from the DC position indicated by the top left position, transform coefficients of less importance are arranged and mainly have a value of 0 or close to 0. Therefore, it may be advantageous in terms of coding performance to sequentially arrange the output transform coefficients of the forward LFNST according to the scan order starting from the DC position. Also, in many cases, the residual coding part is designed to increase coding efficiency when transform coefficients having 0 or values close to 0 frequently appear as the distance from the DC position increases.

Meanwhile, the output transform coefficients of the forward LFNST do not necessarily have to be arranged according to one fixed scan order. That is, according to another embodiment, the output transform coefficients of the LFNST may be sorted according to an order other than the scan order.

If it is statistically determined that a scan order other than the scan order in the VVC standard is suitable for the corresponding LFNST output coefficient, in the case where it is known in advance whether or not to apply the LFNST before performing the residual coding, a scan order specific to the LFNST may be applied instead of a previously determined scan order. In addition, when the optimal scan order varies depending on the coding context such as the intra prediction mode, according to an example, a different scan order may be applied to forward LFNST output transform coefficients for each intra prediction mode (or group of intra prediction modes).

Embodiment 3: Method of Applying Various LFNST Set Lists/LFNST Sets/LFNST Kernels Based on the Size of Transform Block According to one example, unlike the LFNST set list, LFNST set, and LFNST kernel configuration per set in VVC (here, the LFNST kernel configuration per set indicates by how many candidate kernels a specific LFNST set is configured, and etc.), the LFNST set list can be applied more subdivided based on the size of the transform block.

For example, different LFNST set lists maybe applied for every possible transform block shape (i.e., every possible M×N block), the corresponding set list may be expressed as, for example, LFNST_M×N. Alternatively, the corresponding LFNST set list may be applied to each group by grouping transform block shapes. In the case of the VVC standard, it can be seen that two types of LFNST set lists, namely LFNST_4×4 and LFNST_8×8, are applied by dividing into two groups according to the shape of the transform block. Examples of other groupings are as follows.

1. A separate group is set for cases where both the horizontal and vertical lengths of the transform block are equal to or greater than 16, and the LFNST set list applied to the group can be allocated. Here, the LFNST set list may be named LFNST_16×16. When combined with the grouping of the VVC standard, it can be divided into three groups as (Group 1) 4×4, 4×N/N×4 (N≥8) transform block, (Group 2) 8×8, 8×N/N×8 (N≥16) transform block, (Group 3) transform block with both width and height greater than or equal to 16, each group and/or the LFNST set list applied to the group may be named LFNST_4×4, LFNST_8×8, or LFNST_16×16.
2. In the grouping in item 1 above, Group 1 can be further divided into 4×4 transform blocks and 4×N/N×4 (N≥8), it can be divided into Group 1A and Group 1B. Group 2 can also be divided into 8×8 transform blocks and 8×N/N×8 (N≥16) transform blocks, it can be classified as Group 2A and Group 2B. Also, Group 3 can be divided into Group 3A and Group 3B through a specific criterion. For example, 16×16 and 16×N/N×16 (N≥16) transform blocks may be set as Group 3A, and the remaining cases may be classified as Group 3B.

In addition, Group 1, Group 2, and Group 3 mayor may not be divided into detailed groups as described above. For example, if only Group 1 and Group 3 are divided into detailed groups, all groups may be configured as Group 1A, Group 1B, Group 2, Group 3A, and Group 3B. Naturally, if Group 1, Group 2, and Group 3 are all divided, the groups can be classified as Group 1A, Group 1B, Group 2A, Group 2B, Group 3A, and Group 3B.

In addition to the above two embodiments, grouping can be applied according to various criteria based on the size of the transform block, a corresponding LFNST set list may be assigned to each group. This LFNST set list may be configured differently for each group.

For example, the number of kernels per LFNST set constituting the LFNST set list can be set differently (e.g. For Group 1, the number of LFNST kernels per set is 3, and for Group 2, the number of LFNST kernels per set is 2, that is, for Group 1, the number of LFNST kernels constituting the set is set as 3, for Group 2, the number of LFNST kernels constituting the set is set as 2), in more detail, the number of kernels constituting the set may be set differently for each LFNST set constituting one LFNST set list.

Alternatively, the number of LFNST sets included in each LFNST set list may be set differently, for example, Group 1 can consist of 18 LFNST sets and Group 2 can consist of 10 LFNST sets. Naturally, the dimension of the kernel matrix may be set differently according to the LFNST set list. Taking the VVC standard as an example, LFNST_4×4 consists of a 16×16 matrix and LFNST_8×8 consists of a 16×48 matrix.

More diversely, the dimension of the kernel matrix may beset differently for each LFNST set constituting the LFNST set list. A specific example of the detailed configuration of the LFNST set list is as follows.

1. Group 1 (LFNST_4×4) consists of 18 LFNST sets, and each LFNST set consists of 3 kernels, and the dimension of the corresponding kernel matrix may be 16×16. Group 2 (LFNST_8×8) consists of 18 LFNST sets, and each LFNST set consists of 3 kernels, and the dimension of the corresponding kernel matrix may be 16×48. Group 3 (LFNST_16×16) consists of 18 LFNST sets, and each LFNST set consists of 3 kernels, and the dimension of the corresponding kernel matrix may be 32×96.
2. In the configuration of item 1 above, all LFNST sets can be configured with 2 kernels instead of 3 kernels.
3. In the configuration of item 1 above, all LFNST set lists can be configured with a different number of sets instead of 18 sets. For example, the LFNST set list may be configured with 16, 15, 10, 6, or 4 transform sets.
4. In the configuration of item 1 above, the dimensions of the kernel matrices constituting LFNST_8×8 may be set to 32×48 to 48×48.
5. In the configuration of item 1 above, the dimensions of the kernel matrices constituting LFNST_16×16 may be set to one of 16×96, 48×96, 64×96, 80×96, and 96×96. Here, 96 may represent the number of input samples (input transform coefficients) constituting the ROI in terms of the forward LFNST, and the ROI may be configured as shown in (b) of FIG. 8. If the ROI corresponding to LFNST_16×16 is configured as in (a)

of FIG. 8 rather than (b) of FIG. 8, the dimensions of the kernel matrices constituting LFNST_16×16 may be set to one of 16×48, 32×48, and 48×48.

6. With the item 1 being the base, item 2, item 3, item 4, and item 5 above can be freely combined. For example, by applying the item 3, the number of LFNST sets is set to 15, and by applying the item 4, the dimensions of the kernel matrices constituting LFNST_8×8 may be set to 32×48.

According to one embodiment, the LFNST set list, LFNST set, and LFNST kernel may be applied based on the coding tool and the mode to be set.

For example, different LFNST set lists, LFNST sets, and LFNST kernels may be applied according to the range of quantization parameter (QP) values.

For example, the LFNST set list applied to the low QP range and the LFNST set list applied to the high QP range may be used separately. Here, the low QP range may indicate a case that is equal to or less than a predefined threshold QP value, and the high QP range may indicate a case that exceeds the predefined QP value. For threshold QP values, 27, 28, 29, 30, 31, etc. can be used.

As another example, all possible QP values can be divided into N sets. Here, the N sets may not include overlapping values. That is, when two different sets are selected among N sets, the intersection between the two sets may be an empty set. At this time, when the union of N sets is a set consisting of all possible QP values, a different LFNST set list, LFNST set, and LFNST kernel can be applied to each of the N sets.

Additionally, when there are M available LFNST set lists, a mapping relationship can be formed between the N sets and the M LFNST set lists. That is, the LFNST set list mapped to each of the N sets may be one of the M LFNST set lists. Naturally, the LFNST set lists mapped to N sets may overlap each other.

For example, if LFNST_4×4 and LFNST_8×8 are present as LFNST set lists, or if LFNST_4×4, LFNST_8×8, and LFNST_16×16 are present, and when M LFNST set lists are present as described above, M LFNST set lists for each of LFNST_4×4, LFNST_8×8, and LFNST_16×16 may be present. More specifically, for LFNST_4×4, a LFNST set list called LFNST_4×4_i (i=1, 2, . . . , M) may be present, and for LFNST 8×8, a LFNST set list called LFNST_8×8_i (i=1, 2, . . . , M) may be present, for LFNST_16×16, a LFNST set list called LFNST_16×16_i (i=1, 2, . . . , M) may be present.

If the value of M is 2 and No. 1 LFNST set list is mapped for the low QP range and No. 2 LFNST set list is mapped for the high QP range, then for the low QP range, LFNST_4×4_1, LFNST_8×8_1, or LFNST_16×16_1 may be mapped depending on the transform block size, and for the high QP range, LFNST_4×4_2, LFNST_8×8_2, or LFNST_16×16_2 can be mapped depending on the transform block size.

When a tuple of LFNST_4×4, LFNST_8×8, and LFNST_16×16 is represented as (LFNST_4×4, LFNST_8×8, LFNST_16×16), or a pair of LFNST_4×4, LFNST_8×8 is represented as (LFNST_4×4, LFNST_8×8), the tuple or pair in the i-th LFNST set list may be represented as (LFNST_4×4_i, LFNST_8×8_i, LFNST_16×16i) or (LFNST_4×4_i, LFNST_8×8_i). Regarding to this, when LFNST_4×4, LFNST_8×8, and LFNST_16×16 are present, or when LFNST_4×4 and LFNST_8×8 are present, 'being mapped to the i-th LFNST set list' may mean 'being mapped to (LFNST_4×4_i, LFNST_8×8_i, LFNST_16×16_i) or (LFNST_4×4_i, LFNST_8×8_i)'.

Therefore, mapping to one of M LFNST set lists according to the QP value may mean that an LFNST set list mapped to each QP value are present and the corresponding LFNST set list is applied. For example, if the corresponding LFNST set list is the j-th LFNST set list, (LFNST_4×4_j, LFNST_8×8_j, LFNST_16×16_j) may be applied.

In addition, for example, when M applicable LFNST set lists are present as described above, rather than applying the LFNST set list for the corresponding condition based on whether or not a specific condition (range of QP values) is satisfied, it can be configured to specify the LFNST set list through a high-level syntax element (hereinafter also referred to as HLS element).

The corresponding HLS element may be located in Sequence Parameter Set (SPS), Picture Parameter Set (PPS), and Picture Header (PH), and/or Slice Header (SH), etc, which are syntax tables in which high-level syntax elements are collected. Regarding to this, the corresponding HLS element may have a value from 0 to M-1 to indicate one of M available LFNST set lists.

For example, the corresponding HLS element may be related to LFNST set list index information. As an example, LFNST set list index information may be located in SPS, PPS, PH, SH, etc. Relatedly, the LFNST set list index information may have a value from 0 to M-1 to specify one of M available LFNST set lists.

For example, if LFNST_4×4, LFNST_8×8, and LFNST_16×16 or LFNST_4×4 and LFNST_8×8 are present, and the i-th LFNST set list is specified by LFNST set list index information, (LFNST_4×4_i, LFNST_8×8_i, LFNST_16×16_i) or (LFNST 4×4_i, LFNST_8×8_i) may be applied. Additionally, as an example, if signaling for LFNST set list index information is omitted, the value of LFNST set list index information may be inferred as a specific value, and the LFNST set list specified by the inferred value may become the default LFNST set list. As an example, if the default LFNST set list is the k-th LFNST set list, the default LFNST set list may be (LFNST_4×4_k, LFNST_8×8_k, LFNST_16×16_k) or (LFNST_4×4_k, LFNST_8×8_k).

According to an embodiment, different LFNST set lists may be applied for each transform block size. As a more specific example, instead of applying only LFNST_4×4 and LFNST_8×8 as in the VVC standard, different LFNST set lists may be applied to each of cases of 4×4, 4×N/N×4 (N 28), 8×8, 8×N/N×8 (N≥16), 16×16, 16×N/N×16 (N≥32), 32×32 or more (both horizontal and vertical lengths are 32 or more). Here, the LFNST set list for each block size set may be expressed as LFNST_4×4, LFNST_4×N_N×4, LFNST_8×8, LFNST_8×N_N×8, LFNST_16×16, LFNST_16×N_N×16, LFNST_32×32.

For example, when the ith LFNST set list among the M LFNST set lists for block size sets is applied according to the index value specified by the coding mode, condition or the LFNST set list index information, the ith LFNST set list may be expressed as a tuple (LFNST_4×4_i, LFNST_4×N_N×4_i, LFNST_8×8_i, LFNST_8×N_N×8_i, LFNST_16×16_i, LFNST_16×N_N×16_i, LFNST_32×32_i).

According to the VVC standard, LFNST_4×4 and LFNST_8×8, each indicating an LFNST set list, may each consist of four LFNST sets, and the four LFNST sets may be distinguished by index values of 0, 1, 2, and 3. That is, the LFNST sets may be classified as the 0th LFNST set, the 1st LFNST set, the 2nd LFNST set, and the 3rd LFNST set, and the LFNST set index for each LFNST set may have a value of 0, 1, 2 or 3.

In addition, the VVC standard may support a Wide Angle Intra Prediction (WAIP) mode, where the WAIP mode may correspond to modes −14 to −1 and modes 67 to 80 among intra prediction modes. In the VVC standard, an existing first LFNST set may be mapped and used for WAIP mode without allocating a separate LFNST set for WAIP mode. That is, as shown in Table 2 below, the first LFNST set is mapped to intra-prediction mode values from −14 to 80, respectively.

TABLE 2

| | | | | | | | | | | | | | | | | |
|---|---|---|---|---|---|---|---|---|---|---|---|---|---|---|---|---|
| Intra pred. mode | −14 | −13 | −12 | −11 | −10 | −9 | −8 | −7 | −6 | −5 | −4 | −3 | −2 | −1 | 0 | 1 |
| LFNST set index | 1 | 1 | 1 | 1 | 1 | 1 | 1 | 1 | 1 | 1 | 1 | 1 | 1 | 1 | 0 | 0 |
| Intra pred. mode | 2 | 3 | 4 | 5 | 6 | 7 | 8 | 9 | 10 | 11 | 12 | 13 | 14 | 15 | 16 | 17 |
| LFNST set index | 1 | 1 | 1 | 1 | 1 | 1 | 1 | 1 | 1 | 1 | 1 | 2 | 2 | 2 | 2 | 2 |
| Intra pred. mode | 18 | 19 | 20 | 21 | 22 | 23 | 24 | 25 | 26 | 27 | 28 | 29 | 30 | 31 | 32 | 33 |
| LFNST set index | 2 | 2 | 2 | 2 | 2 | 2 | 3 | 3 | 3 | 3 | 3 | 3 | 3 | 3 | 3 | 3 |
| Intra pred. mode | 34 | 35 | 36 | 37 | 38 | 39 | 40 | 41 | 42 | 43 | 44 | 45 | 46 | 47 | 48 | 49 |
| LFNST set index | 3 | 3 | 3 | 3 | 3 | 3 | 3 | 3 | 3 | 3 | 3 | 2 | 2 | 2 | 2 | 2 |
| Intra pred. mode | 50 | 51 | 52 | 53 | 54 | 55 | 56 | 57 | 58 | 59 | 60 | 61 | 62 | 63 | 64 | 65 |
| LFNST set index | 2 | 2 | 2 | 2 | 2 | 2 | 1 | 1 | 1 | 1 | 1 | 1 | 1 | 1 | 1 | 1 |
| Intra pred. mode | 66 | 67 | 68 | 69 | 70 | 71 | 72 | 73 | 74 | 75 | 76 | 77 | 78 | 79 | 80 | |
| LFNST set index | 1 | 1 | 1 | 1 | 1 | 1 | 1 | 1 | 1 | 1 | 1 | 1 | 1 | 1 | 1 | |

In Table 2, Intra pred. mode may represent the intra prediction mode for the current block, and the case of that the value of the Intra pred. mode is one of −14 to −1 and 67 to 80 may represent the intra prediction mode for the current block being the WAIP mode.

In this regard, according to an embodiment proposed in this disclosure, unlike the VVC standard, a larger number of LFNST sets may be introduced, and separate LFNST sets may be allocated for WAIP mode. If separate LFNST sets are not allocated to the WAIP mode, the first LFNST set may be allocated as shown in Table 2 above.

According to one embodiment, when modes other than the WAIP mode are named Normal Angle Intra Prediction (NAIP) mode (ie, modes from 0 to 66), if the number of LFNST sets allocated to the NAIP mode is N, and the number of LFNST sets separately allocated only to the WAIP mode is M, the composition of the LFNST set may be represented by (N, M). Examples for (N, M) may be as follows.

1. (35, 0)
2. (35, 1)
3. (35, 3)
4. (15, 0)
5. (15, 1)
6. (15, 3)

Here, LFNST set index values may be assumed to be allocated from 0 to N-1 for N LFNST sets of NAIP mode, and LFNST set index values may be assumed to be allocated from N to N+M-1 for M LFNST sets of WAIP mode. In this case, examples of a mapping table between the intra prediction mode and the LFNST set for the first to sixth embodiments above may be shown in Tables 3 to 8, respectively.

TABLE 3

| | | | | | | | | | | | | | | | | |
|---|---|---|---|---|---|---|---|---|---|---|---|---|---|---|---|---|
| Intra pred. mode | −14 | −13 | −12 | −11 | −10 | −9 | −8 | −7 | −6 | −5 | −4 | −3 | −2 | −1 | 0 | 1 |
| LFNST set index | 2 | 2 | 2 | 2 | 2 | 2 | 2 | 2 | 2 | 2 | 2 | 2 | 2 | 2 | 0 | 1 |
| Intra pred. mode | 2 | 3 | 4 | 5 | 6 | 7 | 8 | 9 | 10 | 11 | 12 | 13 | 14 | 15 | 16 | 17 |
| LFNST set index | 2 | 3 | 4 | 5 | 6 | 7 | 8 | 9 | 10 | 11 | 12 | 13 | 14 | 15 | 16 | 17 |
| Intra pred. mode | 18 | 19 | 20 | 21 | 22 | 23 | 24 | 25 | 26 | 27 | 28 | 29 | 30 | 31 | 32 | 33 |
| LFNST set index | 18 | 19 | 20 | 21 | 22 | 23 | 24 | 25 | 26 | 27 | 28 | 29 | 30 | 31 | 32 | 33 |
| Intra pred. mode | 34 | 35 | 36 | 37 | 38 | 39 | 40 | 41 | 42 | 43 | 44 | 45 | 46 | 47 | 48 | 49 |
| LFNST set index | 34 | 33 | 32 | 31 | 30 | 29 | 28 | 27 | 26 | 25 | 24 | 23 | 22 | 21 | 20 | 19 |
| Intra pred. mode | 50 | 51 | 52 | 53 | 54 | 55 | 56 | 57 | 58 | 59 | 60 | 61 | 62 | 63 | 64 | 65 |
| LFNST set index | 18 | 17 | 16 | 15 | 14 | 13 | 12 | 11 | 10 | 9 | 8 | 7 | 6 | 5 | 4 | 3 |
| Intra pred. mode | 66 | 67 | 68 | 69 | 70 | 71 | 72 | 73 | 74 | 75 | 76 | 77 | 78 | 79 | 80 | |
| LFNST set index | 2 | 2 | 2 | 2 | 2 | 2 | 2 | 2 | 2 | 2 | 2 | 2 | 2 | 2 | 2 | |

TABLE 4

| | | | | | | | | | | | | | | | | |
|---|---|---|---|---|---|---|---|---|---|---|---|---|---|---|---|---|
| Intra pred. mode | −14 | −13 | −12 | −11 | −10 | −9 | −8 | −7 | −6 | −5 | −4 | −3 | −2 | −1 | 0 | 1 |
| LFNST set index | 35 | 35 | 35 | 35 | 35 | 35 | 35 | 35 | 35 | 35 | 35 | 35 | 35 | 35 | 0 | 1 |
| Intra pred. mode | 2 | 3 | 4 | 5 | 6 | 7 | 8 | 9 | 10 | 11 | 12 | 13 | 14 | 15 | 16 | 17 |
| LFNST set index | 2 | 3 | 4 | 5 | 6 | 7 | 8 | 9 | 10 | 11 | 12 | 13 | 14 | 15 | 16 | 17 |
| Intra pred. mode | 18 | 19 | 20 | 21 | 22 | 23 | 24 | 25 | 26 | 27 | 28 | 29 | 30 | 31 | 32 | 33 |
| LFNST set index | 18 | 19 | 20 | 21 | 22 | 23 | 24 | 25 | 26 | 27 | 28 | 29 | 30 | 31 | 32 | 33 |
| Intra pred. mode | 34 | 35 | 36 | 37 | 38 | 39 | 40 | 41 | 42 | 43 | 44 | 45 | 46 | 47 | 48 | 49 |
| LFNST set index | 34 | 33 | 32 | 31 | 30 | 29 | 28 | 27 | 26 | 25 | 24 | 23 | 22 | 21 | 20 | 19 |
| Intra pred. mode | 50 | 51 | 52 | 53 | 54 | 55 | 56 | 57 | 58 | 59 | 60 | 61 | 62 | 63 | 64 | 65 |
| LFNST set index | 18 | 17 | 16 | 15 | 14 | 13 | 12 | 11 | 10 | 9 | 8 | 7 | 6 | 5 | 4 | 3 |
| Intra pred. mode | 66 | 67 | 68 | 69 | 70 | 71 | 72 | 73 | 74 | 75 | 76 | 77 | 78 | 79 | 80 | |
| LFNST set index | 2 | 35 | 35 | 35 | 35 | 35 | 35 | 35 | 35 | 35 | 35 | 35 | 35 | 35 | 35 | |

TABLE 5

| | | | | | | | | | | | | | | | | |
|---|---|---|---|---|---|---|---|---|---|---|---|---|---|---|---|---|
| Intra pred. mode | −14 | −13 | −12 | −11 | −10 | −9 | −8 | −7 | −6 | −5 | −4 | −3 | −2 | −1 | 0 | 1 |
| LFNST set index | 35 | 35 | 35 | 35 | 35 | 36 | 36 | 36 | 36 | 37 | 37 | 37 | 37 | 37 | 0 | 1 |
| Intra pred. mode | 2 | 3 | 4 | 5 | 6 | 7 | 8 | 9 | 10 | 11 | 12 | 13 | 14 | 15 | 16 | 17 |

TABLE 5-continued

| | | | | | | | | | | | | | | | | |
|---|---|---|---|---|---|---|---|---|---|---|---|---|---|---|---|---|
| LFNST set index | 2 | 3 | 4 | 5 | 6 | 7 | 8 | 9 | 10 | 11 | 12 | 13 | 14 | 15 | 16 | 17 |
| Intra pred. mode | 18 | 19 | 20 | 21 | 22 | 23 | 24 | 25 | 26 | 27 | 28 | 29 | 30 | 31 | 32 | 33 |
| LFNST set index | 18 | 19 | 20 | 21 | 22 | 23 | 24 | 25 | 26 | 27 | 28 | 29 | 30 | 31 | 32 | 33 |
| Intra pred. mode | 34 | 35 | 36 | 37 | 38 | 39 | 40 | 41 | 42 | 43 | 44 | 45 | 46 | 47 | 48 | 49 |
| LFNST set index | 34 | 33 | 32 | 31 | 30 | 29 | 28 | 27 | 26 | 25 | 24 | 23 | 22 | 21 | 20 | 19 |
| Intra pred. mode | 50 | 51 | 52 | 53 | 54 | 55 | 56 | 57 | 58 | 59 | 60 | 61 | 62 | 63 | 64 | 65 |
| LFNST set index | 18 | 17 | 16 | 15 | 14 | 13 | 12 | 11 | 10 | 9 | 8 | 7 | 6 | 5 | 4 | 3 |
| Intra pred. mode | 66 | 67 | 68 | 69 | 70 | 71 | 72 | 73 | 74 | 75 | 76 | 77 | 78 | 79 | 80 | |
| LFNST set index | 2 | 37 | 37 | 37 | 37 | 37 | 36 | 36 | 36 | 36 | 35 | 35 | 35 | 35 | 35 | |

TABLE 6

| | | | | | | | | | | | | | | | | |
|---|---|---|---|---|---|---|---|---|---|---|---|---|---|---|---|---|
| Intra pred. mode | −14 | −13 | −12 | −11 | −10 | −9 | −8 | −7 | −6 | −5 | −4 | −3 | −2 | −1 | 0 | 1 |
| LFNST set index | 1 | 1 | 1 | 1 | 1 | 1 | 1 | 1 | 1 | 1 | 1 | 1 | 1 | 1 | 0 | 0 |
| Intra pred. mode | 2 | 3 | 4 | 5 | 6 | 7 | 8 | 9 | 10 | 11 | 12 | 13 | 14 | 15 | 16 | 17 |
| LFNST set index | 1 | 1 | 1 | 2 | 2 | 2 | 3 | 3 | 3 | 4 | 4 | 4 | 5 | 5 | 5 | 6 |
| Intra pred. mode | 18 | 19 | 20 | 21 | 22 | 23 | 24 | 25 | 26 | 27 | 28 | 29 | 30 | 31 | 32 | 33 |
| LFNST set index | 7 | 8 | 9 | 9 | 9 | 10 | 10 | 10 | 11 | 11 | 11 | 12 | 12 | 12 | 13 | 13 |
| Intra pred. mode | 34 | 35 | 36 | 37 | 38 | 39 | 40 | 41 | 42 | 43 | 44 | 45 | 46 | 47 | 48 | 49 |
| LFNST set index | 14 | 13 | 13 | 12 | 12 | 12 | 11 | 11 | 11 | 10 | 10 | 10 | 9 | 9 | 9 | 8 |
| Intra pred. mode | 50 | 51 | 52 | 53 | 54 | 55 | 56 | 57 | 58 | 59 | 60 | 61 | 62 | 63 | 64 | 65 |
| LFNST set index | 7 | 6 | 5 | 5 | 5 | 4 | 4 | 4 | 3 | 3 | 3 | 2 | 2 | 2 | 1 | 1 |
| Intra pred. mode | 66 | 67 | 68 | 69 | 70 | 71 | 72 | 73 | 74 | 75 | 76 | 77 | 78 | 79 | 80 | |
| LFNST set index | 1 | 1 | 1 | 1 | 1 | 1 | 1 | 1 | 1 | 1 | 1 | 1 | 1 | 1 | 1 | |

TABLE 7

| | | | | | | | | | | | | | | | | |
|---|---|---|---|---|---|---|---|---|---|---|---|---|---|---|---|---|
| Intra pred. mode | −14 | −13 | −12 | −11 | −10 | −9 | −8 | −7 | −6 | −5 | −4 | −3 | −2 | −1 | 0 | 1 |
| LFNST set index | 15 | 15 | 15 | 15 | 15 | 15 | 15 | 15 | 15 | 15 | 15 | 15 | 15 | 15 | 0 | 0 |
| Intra pred. mode | 2 | 3 | 4 | 5 | 6 | 7 | 8 | 9 | 10 | 11 | 12 | 13 | 14 | 15 | 16 | 17 |
| LFNST set index | 1 | 1 | 1 | 2 | 2 | 2 | 3 | 3 | 3 | 4 | 4 | 4 | 5 | 5 | 5 | 6 |
| Intra pred. mode | 18 | 19 | 20 | 21 | 22 | 23 | 24 | 25 | 26 | 27 | 28 | 29 | 30 | 31 | 32 | 33 |
| LFNST set index | 7 | 8 | 9 | 9 | 9 | 10 | 10 | 10 | 11 | 11 | 11 | 12 | 12 | 12 | 13 | 13 |
| Intra pred. mode | 34 | 35 | 36 | 37 | 38 | 39 | 40 | 41 | 42 | 43 | 44 | 45 | 46 | 47 | 48 | 49 |
| LFNST set index | 14 | 13 | 13 | 12 | 12 | 12 | 11 | 11 | 11 | 10 | 10 | 10 | 9 | 9 | 9 | 8 |
| Intra pred. mode | 50 | 51 | 52 | 53 | 54 | 55 | 56 | 57 | 58 | 59 | 60 | 61 | 62 | 63 | 64 | 65 |
| LFNST set index | 7 | 6 | 5 | 5 | 5 | 4 | 4 | 4 | 3 | 3 | 3 | 2 | 2 | 2 | 1 | 1 |
| Intra pred. mode | 66 | 67 | 68 | 69 | 70 | 71 | 72 | 73 | 74 | 75 | 76 | 77 | 78 | 79 | 80 | |
| LFNST set index | 1 | 15 | 15 | 15 | 15 | 15 | 15 | 15 | 15 | 15 | 15 | 15 | 15 | 15 | 15 | |

TABLE 8

| | | | | | | | | | | | | | | | | |
|---|---|---|---|---|---|---|---|---|---|---|---|---|---|---|---|---|
| Intra pred. mode | −14 | −13 | −12 | −11 | −10 | −9 | −8 | −7 | −6 | −5 | −4 | −3 | −2 | −1 | 0 | 1 |
| LFNST set index | 15 | 15 | 15 | 15 | 15 | 16 | 16 | 16 | 16 | 17 | 17 | 17 | 17 | 17 | 0 | 0 |
| Intra pred. mode | 2 | 3 | 4 | 5 | 6 | 7 | 8 | 9 | 10 | 11 | 12 | 13 | 14 | 15 | 16 | 17 |
| LFNST set index | 1 | 1 | 1 | 2 | 2 | 2 | 3 | 3 | 3 | 4 | 4 | 4 | 5 | 5 | 5 | 6 |
| Intra pred. mode | 18 | 19 | 20 | 21 | 22 | 23 | 24 | 25 | 26 | 27 | 28 | 29 | 30 | 31 | 32 | 33 |
| LFNST set index | 7 | 8 | 9 | 9 | 9 | 10 | 10 | 10 | 11 | 11 | 11 | 12 | 12 | 12 | 13 | 13 |
| Intra pred. mode | 34 | 35 | 36 | 37 | 38 | 39 | 40 | 41 | 42 | 43 | 44 | 45 | 46 | 47 | 48 | 49 |
| LFNST set index | 14 | 13 | 13 | 12 | 12 | 12 | 11 | 11 | 11 | 10 | 10 | 10 | 9 | 9 | 9 | 8 |
| Intra pred. mode | 50 | 51 | 52 | 53 | 54 | 55 | 56 | 57 | 58 | 59 | 60 | 61 | 62 | 63 | 64 | 65 |
| LFNST set index | 7 | 6 | 5 | 5 | 5 | 4 | 4 | 4 | 3 | 3 | 3 | 2 | 2 | 2 | 1 | 1 |
| Intra pred. mode | 66 | 67 | 68 | 69 | 70 | 71 | 72 | 73 | 74 | 75 | 76 | 77 | 78 | 79 | 80 | |
| LFNST set index | 1 | 17 | 17 | 17 | 17 | 17 | 16 | 16 | 16 | 16 | 15 | 15 | 15 | 15 | 15 | |

In Tables 3 to 8 above, Intra pred. mode may represent the intra prediction mode for the current block, and the case of that the value of the Intra pred. mode is one of −14 to −1 and 67 to 80 may represent the intra prediction mode for the current block being the WAIP mode.

Hereinafter, the specific LFNST kernel applied to LFNST_4×4, LFNST_8×8, that is, the LFNST matrix, is described. According to one example, the LFNST matrix below can be applied when the ROI for LFNST_8×8 is 4×4 subblocks at from the top left to third location, in scan order, of target transform block ((a) of FIG. 8).

Tables 9 to 18 below show an example of kernel coefficient data for LFNST_4×4 that can be applied to 4×N or N×4 blocks (N≥4). In g_lfnst4x4[36][3][16][16] array of Tables 9 to 18, [36] represents that the number of LFNST sets is 36, [3] represents that the number of LNFST kernel candidates per LFNST set is 3, [16][16] represents that it is a 16×16 matrix based on forward LFNST (the corresponding array definitions in Tables 9 to 18 are described according to C/C++ grammar). For example, 16 may represent the horizontal (x-axis) length of the matrix, and 48 may represent the vertical (y-axis) length of the matrix. If Tables 9 to 18 are used for LFNST where the number of LFNST sets is 35, the array can be represented as g_lfnst4×4[35][3][16][16].

The ROI to which the LFNST kernel of Tables 9 to 18 can be applied may be the top left 4×4 region. One LFNST kernel consists of 16 transform basis vectors (row vectors), and one vector has a length of 16 ([16][16]). In the case of forward secondary transform performed in the encoding apparatus, the row basis vector of the LFNST kernel (16×16 dimensional matrix) in Tables 9 to 18 and transform coefficient may be multiplied during matrix operation. For the inverse secondary transform performed in the decoding apparatus, the row basis vector of a transposed kernel (16×16 dimensional matrix) of the LFNST kernel below and the transform coefficient may be multiplied.

Tables 9 to 18 may represent a portion of the 36 LFNST sets. As described above, LFNST set can be selected according to the intra prediction mode and mapped according to Table 3 or Table 4. According to Table 3, 35 LFNST sets are used, and according to Table 4, 36 LFNST sets are used. Tables 9 to 18 may be kernels corresponding to specific set numbers among 35 or 36 sets.

Tables 9 and 10 may illustrate the three LFNST kernels applied when the LFNST set index in Table 3 or Table 4 is 0 (when the intra prediction mode is planner mode), and Tables 11 and 12 may illustrate the three LFNST kernels applied when the LFNST set index in Table 3 or Table 4 is 1 (when the intra prediction mode is DC mode), and Tables 13 and 14 may illustrate the three LFNST kernels applied when the LFNST set index of Table 3 or Table 4 is 2 (when the intra prediction mode represents bottom left direction), Table 15 and Table 16 may illustrate the three LFNST kernels applied when the LFNST set index of Table 3 or Table 4 is 18 (when the intra prediction mode represents horizontal direction or vertical direction), and Table 17 and Table 18 may illustrate the three LFNST kernels applied when the LFNST set index of Table 3 or Table 4 is 34 (when the intra prediction mode represents top left direction).

TABLE 9

```
const int8_t g_lfnst4x4[ 36 ][ 3 ][ 16 ][ 16 ] = {
 { //0
  {
   { 105, −38, −16, 0, −55, 20, 8, 0, −11, 4, 2, 0, 2, −1, −1, 0 },
   { −47, −75, 45, 4, −45, 43, −1, −2, 47, 6, −18, −1, −1, −3, 1, 0 },
   { 15, −69, 15, 6, 84, 15, −29, −3, −47, 25, 8, −2, −8, −1, 3, 1 },
   { −20, −36, −20, 16, −21, −76, 47, 5, −17, 68, −3, −15, 18, 2, −14, 1 },
   { 34, 15, 88, −32, 2, −57, −25, 20, 16, 13, −33, 4, −16, 11, 8, −3 },
   { −21, 12, 47, −12, −37, 16, −4, 1, −87, −13, 14, 6, 60, −4, −16, −1 },
   { −12, −17, −25, 1, −30, −32, −87, 34, 10, −4, 62, −9, 5, 16, 12, −11 },
   { 3, 39, −2, −10, −7, 38, −34, 0, 9, 86, −4, −19, 10, −62, 11, 12 },
   { 11, 18, 27, 110, −6, −9, −23, −35, −1, −7, −11, −31, 3, 2, 6, 6 },
   { 21, −5, −7, −1, 35, −3, −10, 3, 52, −7, −14, 1, 103, 7, −32, −3 },
   { 12, 14, 41, 4, 13, 17, 36, 12, 24, 13, 83, −31, −18, 10, −58, 0 },
   { 1, −4, 6, −22, −7, −22, −16, −102, 12, 11, 34, 49, 0, −1, −7, 26 },
   { −4, 21, −8, −7, −5, 35, −9, −16, −6, 48, −17, −5, 1, 105, 3, −25 },
   { −5, −8, −15, −38, −6, −7, −23, −26, −10, −22, −29, −86, −11, 8, −39, 51 },
   { 4, −3, 14, −20, 9, −2, 33, −16, 10, −8, 34, −49, 31, 9, 97, 11 },
   { 0, 4, 2, 18, 1, 9, 3, 40, 1, 9, 5, 36, 4, 29, 10, 109 },
  },
  {
   { 113, −44, −15, −1, −30, 7, 5, 2, −17, 7, 4, 0, −2, 2, 0, 0 },
   { −39, −64, 41, 3, −80, 18, 25, −3, 31, 20, −14, −4, 8, −1, −5, 1 },
   { −11, −87, 17, 14, 77, −37, −11, 3, −6, 24, −4, −3, −8, 7, 1, −1 },
   { 19, 0, 36, −12, 42, 91, −23, −20, 40, −6, −36, 3, −15, −19, 3, 6 },
   { 8, 20, 88, −29, 7, −3, 34, −14, −76, 2, −1, 6, 8, 2, −9, 2 },
   { 33, 25, 41, −17, 6, −68, 22, 7, 76, −20, −35, 6, −7, 9, −5, 0 },
   { −7, −26, 21, −12, −23, −12, −66, 11, −16, −86, 3, 35, −8, 5, 29, 0 },
   { 5, 20, 14, −19, −21, −19, −85, 8, −8, 73, −36, −3, 23, 8, 6, −2 },
   { 12, 19, 36, 106, −2, 7, −9, 46, −7, −10, −12, −25, 7, 2, 1, −12 },
   { 3, −11, −10, −2, 15, 6, 0, −3, 5, −27, −13, 9, 114, −2, −43, 1 },
   { −8, −5, −33, 17, −8, −18, 15, −22, −36, −14, −94, 6, −17, −48, −5, 28 },
   { 6, 1, 17, 0, 0, −18, −8, 12, 13, 12, 46, 4, 13, −110, 15, 25 },
   { 6, 4, 11, 30, −8, −20, −23, −102, 8, −13, 21, −52, 7, 8, 9, 19 },
   { 3, 6, −2, 27, 6, 3, 26, −22, 6, 23, −4, 66, 32, 18, 89, 13 },
   { 2, 6, 6, 35, −5, −3, −16, −23, 6, 16, 22, 80, −26, 9, −72, 34 },
   { 1, 1, −1, 11, −3, −7, −2, −36, 0, 4, −4, 28, −5, −31, −9, −114 },
  },
```

TABLE 10

```
{
   {   116, −25, −29, 1, −13, 28, −3, −3, −20, 1, 10, −1, −2, −1, 1, 1 },
   {   −12, −104, 35, 15, 34, 0, −40, 6, −4, 32, −5, −9, −3, 1, 4, −1 },
   {   11, 44, −19, −6, 110, 1, −25, −5, −22, 21, 10, −3, −12, −6, 7, 2 },
   {   31, 0, 6, −2, 5, −107, 17, 30, −14, 9, −45, 4, 0, 17, 1, −12 },
   {   −27, −24, −108, 31, −10, −30, −13, −17, 14, 14, 19, −13, 0, 6, 7, 1 },
   {   22, 11, 0, −5, 11, 14, −10, 0, 111, 24, −41, −8, −10, 22, 11, −6 },
   {   −1, 33, 13, −4, −43, 3, −22, 8, −24, 91, 5, −41, 3, −13, 43, 0 },
   {   −1, −15, 3, 32, 22, 12, 106, −18, 4, 52, 6, 8, 0, −7, −11, 4 },
   {   7, 24, 15, 110, 2, 12, −11, 42, −1, −22, −7, −28, −2, 0, −3, −10 },
   {   2, 6, −1, −1, 9, 7, −8, −2, −3, 14, 2, −8, 112, 44, −35, −13 },
   {   19, 4, 33, 6, 2, −47, −4, −9, 41, −6, 91, −18, 8, −8, −3, 45 },
   {   −8, −8, −21, −27, 4, 15, 12, 108, 13, 14, 40, 26, −1, −2, −5, −19 },
   {   −4, 0, 11, 1, 0, 6, 12, −11, −15, −8, 33, −1, −32, 105, 41, −29 },
```

TABLE 10-continued

```
    { -3, -16, -8, -34, 16, 6, 34, 17, -1, -35, -8, -108, 3, -7, 9, -6 },
    { 1, -9, -1, 8, 12, 0, 15, 3, 7, -28, -4, 27, 50, -25, 105, 4 },
    { 6, 1, 11, 1, 0, -14, -4, -28, 14, -1, 30, -1, 1, -40, -4, -112 },
  }
},
```

TABLE 11

```
const int8_t g_lfnst4x4[ 36 ][ 3 ][ 16 ][ 16 ] = {
  { //1
    { -124, 13, 14, 4, 16, -7, -1, 0, 17, -2, -2, 0, 3, 0, 0, 0 },
      { 11, -3, -5, 0, 122, 0, -18, -4, -27, 8, 3, 0, -14, 0, 2, 1 },
      { -8, -120, 16, 10, 0, -7, -7, 2, 20, 33, -5, -3, -2, 5, 1, -1 },
      { 18, 17, 15, -3, 11, -106, 2, 12, 51, 0, -28, 0, -9, 25, 1, -2 },
      { -15, -16, -8, 5, -18, -61, 8, 8, -103, -7, 20, 4, 22, 10, -4, -2 },
      { -11, -3, -115, -11, -4, -16, -19, -4, 23, 28, 31, -1, 0, 3, 7, 0 },
      { -2, -30, -23, 3, 4, 0, -36, -3, 10, -114, -16, 11, 6, 4, -4, 0 },
      { 1, 16, 22, 12, -21, -3, -112, -9, -13, 23, -7, -21, -3, 0, 34, 2 },
      { 7, 5, -2, 2, 15, 10, -10, 0, 13, 14, -20, -4, 118, 22, -26, -7 },
      { 1, -6, 30, -98, 0, -7, -18, -14, 10, -2, 52, 48, 12, -1, 0, 8 },
      { 10, 5, 23, 65, 6, -15, -1, -8, 28, -14, 97, -4, 16, -16, -6, 11 },
      { 1, -2, -5, -6, 1, -24, -8, -3, 1, 5, -23, 1, 13, -117, -29, 21 },
      { 0, 2, 0, 1, 2, 11, -16, 120, 4, 2, 12, 23, 0, -11, -1, -28 },
      { -1, 7, -1, 21, -8, 4, -29, -15, -4, 17, -5, 48, -31, 22, -102, -14 },
      { 1, 3, -6, 40, 0, 1, 5, -11, -1, 12, -22, 102, 12, -3, 52, 26 },
      { -1, 0, -2, -4, -1, 6, -4, 32, -2, 1, -3, -14, -3, 25, -21, 118 },
    },
    {
      { 116, -33, -10, -3, -39, -5, 7, 2, -11, 8, 2, -1, -3, 2, -1, 0 },
      { 39, 57, -20, -3, 77, -46, -25, 4, -33, -31, 18, 6, -6, 8, 7, -2 },
      { 21, 85, 7, -14, -38, 63, -30, -10, 17, -23, -28, 10, 6, -17, 4, 6 },
      { 19, -53, 9, 6, 72, 63, -11, -13, 22, -30, -37, 2, -18, -19, 12, 10 },
      { -1, 8, 55, -3, 8, 34, 35, -26, -96, 13, -8, -11, 1, 20, -12, 3 },
      { -17, -37, 23, 2, -38, -11, -54, 2, -33, -73, 12, 36, 4, 21, 38, -3 },
      { -16, -10, -99, 2, -5, 54, -4, 22, -48, 6, 23, 4, -1, 2, 3, -5 },
      { -1, 10, -10, -2, -10, 0, 93, 11, 12, -82, 12, -15, -3, -9, 6, -3 },
      { -10, -4, -36, 11, -13, -44, 6, -24, -30, -6, -87, 4, 15, -36, 7, 45 },
      { -8, -11, -15, -109, 0, -8, 5, -51, 5, 3, 11, 17, -28, 2, 2, 11 },
      { -6, 11, 8, 24, -17, -7, -2, 6, -12, 11, 11, -8, -112, -38, 27, 8 },
      { 1, 8, -27, 43, -7, 2, -1, -83, 22, -5, 3, -30, -15, 70, 17, 3 },
      { 2, -5, 4, 21, 1, 3, -8, -58, -6, -1, 66, -9, 39, -78, 6, 18 },
      { 6, 12, 5, 8, 12, 7, 39, 5, 9, 38, 8, 66, 18, 13, 86, 22 },
      { 1, 1, -5, 31, 0, 0, 14, -22, 6, -8, 7, 92, -21, 3, -75, 6 },
      { 1, 0, 7, -3, 0, 8, -8, 30, 7, -6, 27, -17, -2, 27, -19, 114 },
    },
```

TABLE 12

```
{
    { -118, 46, 12, 1, 9, -4, 0, 0, 8, -2, -1, 0, 3, -1, 0, 0 },
    { -37, -108, 53, 14, 1, 11, -5, -2, 3, 9, -4, -2, 1, 3, -2, -1 },
```

TABLE 12-continued

```
    { 3, -13, -30, 12, 109, -26, -42, 5, 26, 0, -6, -2, 0, 1, 2, -1 },
    { -24, -29, -95, 67, -27, 13, 12, -6, -5, 5, 11, -7, 0, 1, 3, -2 },
    { -1, -13, 4, 12, -9, -109, 48, 25, 0, -30, 12, 5, 1, 0, -2, -1 },
    { 5, -4, -5, 0, -22, 15, 3, -1, 97, -53, -31, 15, 41, -19, -12, 5 },
    { 16, 22, 37, 60, 42, 27, 80, -34, 12, 9, 7, -16, 2, 2, -5, -1 },
    { 15, 28, 41, 84, -27, -18, -64, 24, 0, 6, -25, -13, 0, 3, -1, -4 },
    { 1, 1, -8, -19, -18, -27, 9, -1, 55, 98, -16, -35, 9, 26, -4, -7 },
    { -3, -1, -11, 3, 11, 11, 29, 39, -24, 16, -89, 55, -12, 21, -36, 2 },
    { -1, 0, 1, 0, -9, 3, 1, -13, 36, -26, -10, 5, -94, 52, 44, -22 },
    { 2, 3, 6, 6, 8, 32, 15, 102, 24, 14, 54, 19, -2, 1, 20, -9 },
    { 1, 2, 1, -2, 2, 4, -4, -4, -15, -22, 8, 2, 67, 99, 10, -34 },
    { -3, -5, -7, -15, 6, 14, 16, 40, -17, -31, -44, -98, 0, -13, 9, -30 },
    { -1, 1, -1, -3, -1, 7, -9, 11, 10, -18, 32, -31, -31, 39, -100, 35 },
    { 0, 0, 0, -1, -1, -2, -6, -12, 3, 4, 15, 18, -11, -27, -49, -111 },
  }
},
```

TABLE 13

```
const int8_t g_lfnst4x4[ 36 ][ 3 ][ 16 ][ 16 ] = {
  { //2
    { 110, -42, -6, -4, -44, -7, 11, 2, -7, 12, 5, -2, -4, 2, -2, -2 },
      { 45, 49, -23, -2, 72, -56, -23, 3, -33, -28, 21, 6, -8, 7, 9, -2 },
      { -34, -32, 2, 5, -10, -83, 45, 12, -11, 40, 48, -13, 8, 22, -12, -15 },
      { -2, 89, -23, -7, -81, -13, -13, 8, -8, 16, 12, 8, 17, 3, -8, -3 },
      { 17, 36, -6, -6, 38, 24, 49, -14, -13, 67, -32, -40, -6, -9, -51, 8 },
      { -15, -13, 16, -1, -12, 32, -7, -8, -114, 3, 5, 7, -12, 32, 7, 5 },
      { 14, 28, 109, -13, -8, -24, 17, -39, 5, -24, -8, -9, 4, 2, 0, -4 },
      { -11, -12, -20, 6, -17, -56, 11, -16, -22, -9, -81, 13, 5, -30, 14, 59 },
      { -2, 14, -30, -1, -11, 19, 89, -2, -8, -69, 20, -26, -14, -16, 22, -2 },
      { -5, 10, 0, 1, -14, -11, -3, 4, 22, 9, -16, -4, -115, 42, 13, 4 },
      { -12, -20, -16, -26, -17, -18, -38, -16, -14, -43, -12, -51, -18, -25, -72, -40 },
      { -4, 1, 18, -1, -2, 0, -9, 5, -17, 28, 42, 12, -43, -104, 15, 7 },
      { -6, -8, -30, -72, 1, 1, -9, -86, 11, 20, 24, -9, 4, 9, 36, 12 },
      { 3, 4, -8, 94, -7, -1, -23, -53, 1, 8, 11, -56, 5, -1, 26, -2 },
      { 1, -3, 13, -13, -3, 6, -20, 30, 7, -13, 40, -50, 4, 13, -19, 99 },
      { 0, -2, -10, 34, 0, 5, 14, -52, 9, -17, 31, 70, -13, 7, -69, 30 },
    },
    {
      { 87, -63, 9, -3, -60, 30, 9, -3, 6, 9, -11, 1, -3, -2, 1, 1 },
      { -55, -19, 34, -2, -18, 82, -39, -2, 34, -39, -13, 15, -1, -2, 15, -4 },
      { 51, 24, 4, -11, 12, -15, -60, 23, 11, -60, 61, 5, -12, 18, 7, -23 },
      { -2, 63, -66, 13, -70, 10, 17, 12, 44, -11, 0, -6, 5, -16, 4, 2 },
      { 44, 39, -20, 10, 38, 23, -24, -26, -27, -13, -64, 42, 10, -27, 37, 15 },
      { -6, 34, 26, -32, -42, 5, -57, 35, -43, 63, 2, 14, 26, -14, -18, -4 },
      { -20, -24, 2, 26, -26, -39, 6, -18, -5, 6, 20, 56, 26, -19, 58, -65 },
      { -7, -20, -57, 53, 8, 52, -13, -3, -64, 4, 43, -17, 17, 13, -11, -9 },
```

TABLE 13-continued

```
        {   −25, −31, −21, −3, −38, −43, −20, 21, −36, −39, −14, 23, −8, 28, 22, 73 },
        {   −2, −47, −49, 14, 36, −16, −47, 45, 58, 32, −16, 16, 10, −23, −19, 3 },
        {   −2, 12, −13, 14, −8, 4, −9, −15, 5, 28, −22, 49, −65, 77, −26, −29 },
        {   −5, −8, −25, −49, 15, 22, 28, 70, −23, 2, −18, −19, −34, 8, 56, −37 },
        {   14, 19, 27, 29, 20, 27, 36, 41, 24, 32, 41, 42, 23, 31, 35, 50 },
        {   1, 8, 24, 58, −9, −14, −37, −5, 8, 33, −4, −58, −53, −11, 55, 12 },
        {   5, 9, 37, 67, −7, −11, 18, 64, −17, −38, −42, 1, 9, −6, −38, −27 },
        {   −5, −2, 2, 1, 1, 10, 17, 8, −17, −3, 36, 45, −75, −76, −25, 17 },
    },
```

TABLE 14

```
{       −126, 14, 11, 3, 7, 5, 6, 0, 11, 0, 1, −1, 7, −1, 0, 0 },
    {   12, 23, −9, 0, 112, 9, −19, −3, 46, −8, −16, −2, 8, −8, −7, 0 },
    {   −8, −82, 6, 4, 17, −84, 8, 6, 18, −39, 8, 6, 8, −7, 4, 3 },
    {   14, 5, 75, −7, 22, 12, 86, −11, 6, 8, 44, −13, −3, 4, 11, −9 },
    {   4, −42, −6, −3, −26, 27, 4, 0, 79, 56, −6, −4, 54, 23, −14, −5 },
    {   10, 42, 25, −5, −42, −3, 7, −8, 46, −68, −28, −4, 33, −54, −21, 2 },
    {   −6, −14, −1, −65, 0, −9, −12, −84, −11, 2, −18, −57, −10, 5, −16, −24 },
    {   3, 52, −41, −27, −9, −42, −4, −18, 21, −1, 67, 7, 34, 22, 49, 5 },
    {   −5, −46, −36, −19, 0, 67, 2, −10, 13, −29, 42, 7, −24, −56, 38, 9 },
    {   2, −15, 52, −12, 2, 27, −35, −23, −11, −29, −27, 26, 28, 46, 56, 48 },
    {   −1, −12, −18, −7, 22, 13, 19, −5, −66, 1, 9, 8, 93, −27, −29, 8 },
    {   −2, 6, −6, −59, 0, −14, 25, −11, 9, 25, −10, 71, −28, −10, −40, 60 },
    {   2, 4, 49, 4, 0, −26, −51, −7, −4, 63, 13, 1, 5, −75, 26, 6 },
    {   0, 6, −38, 23, 1, −16, 58, −16, −2, 25, −65, −24, 2, −23, 60, 32 },
    {   1, 0, −6, 79, −3, 1, −6, −73, 7, −2, 32, −3, −9, 5, −36, 48 },
    {   0, 1, 3, −22, 0, 0, −10, 49, 1, −2, 20, −80, −2, 4, −17, 79 },
  }
},
```

TABLE 15

```
const int8_t g_lfnst4x4[ 36 ][ 3 ][ 16 ][ 16 ] = {
  {   //18
      {
        {   97, −18, −9, −3, 75, −14, −8, −2, −5, 1, 0, 0, −24, 5, 2, 1 },
        {   12, 86, −35, −3, 12, 77, −30, −3, 1, −1, 1, −1, −1, −24, 9, 1 },
        {   −31, 2, 2, 1, 58, −9, −6, −1, 100, −12, −12, −2, 40, −4, −5, −1 },
        {   71, −12, −7, −2, −68, 8, −1, 2, 33, −2, −4, −1, 72, −8, −6, −2 },
        {   16, 29, 82, −23, 10, 29, 78, −21, 3, 3, 7, −1, 1, −8, −20, 6 },
        {   4, 17, −4, 0, −4, −36, 12, 4, −8, −101, 30, 9, −4, −54, 15, 6 },
        {   17, −1, 0, 0, −47, 6, 2, 2, 70, −6, −5, −1, −94, 8, 6, 2 },
        {   7, 10, 18, 88, 6, 10, 19, 85, 1, 3, 4, 12, 1, 0, −4, −18 },
        {   −2, −6, −21, 4, 3, 5, 28, −8, 15, 25, 98, −25, 8, 17, 58, −14 },
        {   −9, −71, 15, 5, 8, 54, −12, −1, 0, 14, −1, −1, −7, −84, 20, 7 },
        {   2, 2, 6, 27, −1, −3, −4, −26, −7, −15, −21, −103, −4, −9, −13, −58 },
        {   −6, −15, −70, 17, 4, 10, 52, −14, 2, 5, 19, −4, −7, −15, −83, 21 },
```

TABLE 15-continued

```
        {   −5, −42, 6, 2, 7, 68, −11, −5, −6, −68, 11, 7, 5, 68, −12, −8 },
        {   −2, −6, −43, 11, 4, 9, 68, −17, −4, −9, −67, 16, 5, 8, 65, −16 },
        {   −4, −7, −17, −73, 3, 5, 13, 57, 1, 2, 3, 13, −4, −11, −18, −82 },
        {   2, 4, 10, 40, −3, −8, −15, −65, 3, 9, 15, 67, −3, −11, −15, −70 },
      },
      {
        {   88, −43, 2, −4, −74, 32, 1, 2, 14, −2, −3, 0, 0, −2, 1, 0 },
        {   53, 53, −46, 4, −5, −65, 39, −3, −38, 32, −3, −2, 17, −5, −5, 2 },
        {   −30, 47, −24, 4, −54, −18, 23, 0, 87, −17, −8, −3, −31, 6, 2, 1 },
        {   −60, −3, 2, 5, −70, 13, 13, −3, −31, 29, −9, 2, 70, −25, −3, 0 },
        {   8, 55, −6, −10, −21, 17, −38, 17, −28, −71, 56, −6, 26, 27, −15, −4 },
        {   7, 21, 66, −43, −18, −46, −55, 41, 13, 45, 7, −12, −6, −14, 4, −1 },
        {   26, 3−2, −1, 44, 2, −7, 1, 69, −5, −4, −1, 92, −20, −7, −1 },
        {   −14, −60, 1, 6, −7, −53, 19, 6, 13, 4, 46, −24, 14, 60, −51, 5 },
        {   4, 3, 48, −19, −7, −29, 20, −15, −10, −41, −64, 43, 22, 57, 18, −18 },
        {   9, 13, 32, 72, −11, −19, −40, −77, 7, 14, 24, 31, −3, −4, −6, −1 },
        {   10, 44, 46, −19, 10, 55, 43, −25, 3, 36, 0, −18, −5, 27, −59, 18 },
        {   2, −10, 47, −19, 0, −27, 57, −23, −5, −51, 36, −12, −6, −69, 9, 14 },
        {   −5, −7, −22, −53, 2, 4, 6, −9, 8, 17, 37, 91, −8, −15, −30, −42 },
        {   2, 8, 15, 7, 5, 18, 34, 0, 8, 30, 52, −15, 10, 33, 80, −55 },
        {   6, 8, 30, 72, 5, 6, 29, 81, −1, −5, 0, 34, −6, −16, −27, −23 },
        {   0, 1, 2, 1, 2, 6, 11, 20, 5, 12, 28, 51, 7, 22, 40, 101 },
      },
```

TABLE 16

```
{
    {   −90, 74, −19, 5, −31, 25, −3, −1, 19, −18, 7, −2, 7, −6, 1, 0 },
    {   −56, −25, 66, −26, 31, −55, 46, −15, 27, −16, −6, 7, 0, 6, −9, 4 },
    {   −12, −27, 53, −27, −81, 44, 16, −12, −39, 38, −12, 3, 5, −2, −1, 1 },
    {   −42, 11, −11, 13, 47, −16, −6, 2, −83, 60, −6, −4, −27, 20, 1, −4 },
    {   −29, −33, 18, 5, 26, 30, −71, 35, 40, 25, −59, 21, 12, −6, 0, −4 },
    {   31, 56, 25, −63, 53, 49, 3, −44, 9, 14, −13, 3, −2, −3, −2, 6 },
    {   −5, −2, 0, 2, 21, −7, 2, −2, −36, −3, 8, 2, 102, −63, 8, 2 },
    {   25, 43, −18, −2, −29, −49, 22, 10, 3, 24, −70, 42, 25, 19, −37, 11 },
    {   5, 15, 23, −28, −5, −12, −32, 33, −53, −70, −8, 53, −35, −25, 13, 9 },
    {   18, 30, 48, 57, 21, 36, 49, 64, 7, 14, 20, 26, −1, 0, 3, 0 },
    {   −13, −30, −16, 16, 18, 44, 7, −18, −21, −37, 6, 22, 16, 36, −79, 44 },
    {   9, 22, 33, −28, −6, −17, −42, 37, −9, −7, 36, −30, 44, 72, −19, −27 },
    {   −12, −20, −39, −49, 0, 0, 8, 20, 20, 37, 56, 74, 10, 15, 23, 15 },
    {   −5, −16, −18, 7, 10, 27, 32, −19, −14, −35, −35, 26, 23, 49, 49, −70 },
    {   −9, −16, −37, −56, 10, 19, 44, 69, −5, −8, −22, −45, −10, −21, −28, −20 },
    {   −1, −1, −4, −5, 2, 5, 12, 18, −6, −13, −27, −33, 17, 37, 66, 89 },
  }
},
```

TABLE 17

```
const int8_t g_lfnst4x4[ 36 ][ 3 ][ 16 ][ 16 ] = {
  {   //34
    {
      {     113, -42, -9, -2, 3, 32, -14, 0, -18, 12, 10, -3, -1, -2,
3, 3 },
      {     2, 59, -27, 1, -64, 69, 13, -13, -4, -28, 43, -5, 5, -14,
1, 12 },
      {     40, 13, 1, -3, -21, -46, 71, -1, 20, -58, -22, 36, -5,
17, -34, -1 },
      {     -22, -69, 37, 6, -90, -4, -8, 18, -26, -10, -13, -2, 8,
-10, -7, -8 },
      {     -14, -41, 41, -3, 29, 3, 13, -16, 26, -28, 75, 0, 3, -10,
-17, 63 },
      {     0, 23, 51, -27, 5, 6, 59, -5, -68, 53, 6, 27, -15, -13, 16,
12 },
      {     28, 36, 20, -18, -38, -52, -12, 27, 32, 26, 2, -47, 7, 8,
42, 52 },
      {     5, -11, 10, -29, 8, -19, 29, -39, 5, -27, 20, -48, 28,
-40, 49, -65 },
      {     -6, -12, -72, 39, -5, -59, 9, -13, -60, 4, 35, -13, -4,
-14, 0, 23 },
      {     -11, -37, -32, 13, -25, 14, 42, -50, 55, 55, -5, 19,
-17, 26, 34, 5 },
      {     -18, -27, -29, -20, 23, 36, 41, 40, -24, -34, -34, -31,
28, 38, 39, 38 },
      {     2, -2, -14, 18, 6, 0, 3, 29, 21, 6, -15, 60, 59, -77, 29,
19 },
      {     3, 2, 18, 68, 7, 4, 24, 67, 11, -3, 43, 3, -31, 17, 38, -40 },
      {     -4, -8, -11, -37, -3, -7, -32, -4, -6, -43, -5, 40, -79,
-18, 58, 13 },
      {     -6, -8, -29, -69, -9, -17, -12, 35, 2, 17, 56, 42, 33,
41, -3, -31 },
      {     -7, -15, -31, -37, 1, 9, 32, 49, 26, 25, -1, -37, -48,
-57, -46, -5 },
    },
    {
      {     106, 19, -22, -5, -55, 18, 24, 1, 1, -17, 1, 4, -3, 2, -2,
1 },
      {     -22, 56, 5, -10, -43, -79, 20, 19, 31, 4, -48, -8, -1,
13, 13, -10 },
      {     13, 88, 8, -16, 61, -6, 12, 9, -57, -12, 18, 10, 7, -13,
-9, 5 },
      {     41, 4, 29, -8, 8, -29, -63, 12, 10, 68, 26, -37, -6, -15,
28, 31 },
      {     32, -44, 38, 0, 17, -25, -27, 28, -55, -24, -60, -7, 20,
20, -3, -38 },
      {     -21, 23, 74, 11, -57, 18, -36, 6, -4, -50, 35, -6, 17,
-2, -26, 16 },
      {     14, 18, 64, 27, 33, 50, 26, 9, 48, 5, -47, -2, -44, -9, 16,
-3 },
      {     15, -4, 15, 22, 0, -39, -13, -24, 11, 22, 16, 56, -36,
-38, -63, -49 },
      {     -10, -25, 9, -65, -10, 10, 34, 84, 0, 15, 12, 2, -11,
-39, -29, 4 },
      {     -20, 29, -19, -12, -32, 47, -30, -5, -20, 23, -14, -25,
2, -42, 28, -78 },
      {     5, 10, -22, -56, 23, 3, -57, 8, 39, -49, 9, 7, -52, 41, 2,
-21 },
      {     4, 8, 27, -19, 2, 19, 9, 11, 22, 44, 25, 54, 57, 62, 15,
-37 },
      {     -14, 21, -32, 35, -21, 31, -41, 43, -26, 35, -39, 37,
-22, 30, -31, 38 },
      {     -8, -13, 20, -24, -23, -8, 0, -18, -36, -8, -4, 72, -34,
-22, 74, 24 },
      {     -7, -6, 5, 43, -11, -12, 30, 32, -34, 6, 54, -26, -60,
45, 23, -33 },
      {     -7, 0, 27, -56, -18, 13, 20, -62, -33, 37, -18, -28,
-33, 39, -39, 11 },
    },
```

TABLE 18

```
{
    {   112, −31, −13, −3, −32, 34, −1, −1, −19, −1, 8, 1, 0, −2, 0,
1 },
    {   18, −26, 5, −1, 98, −10, −28, −1, −36, 56, 1, −5, −16, −4,
15, 2 },
    {   35, 87, −52, −2, 20, −46, 43, −5, −20, −1, −6, 8, −6, 5, 0,
−2 },
    {   −26, 27, −11, 3, 9, 59, −4, −10, −67, −21, 53, 1, 31, −47,
−11, 10 },
    {   −4, 0, 31, −14, −48, −39, 6, 24, −55, 49, −40, −4, 45, −35,
19, −14 },
    {   2, 48, −14, −4, −26, 25, −44, 2, 42, 54, 23, −43, −13, −17,
53, 15 },
    {   22, 51, 77, −52, 20, 22, −18, 36, 5, −31, −15, 23, −19, −1,
3, −5 },
    {   8, −7, 45, −10, −4, −21, 58, −20, 22, 35, 53, 18, −7, −22,
−15, 66 },
    {   15, 1, 12, 3, −5, −66, −53, 28, −11, −33, 52, −49, 20, 16,
−28, 19 },
    {   19, 9, −2, −1, 37, 15, 4, 1, 55, 8, −15, −3, 103, −4, −18, −1 },
    {   9, −25, −8, −4, 19, −31, 12, 3, 27, −51, 5, −6, −7, −86, 54,
−19 },
    {   −8, −14, 2, −25, 10, 12, 38, 6, −24, −29, −2, −36, 25, 57,
76, 40 },
    {   17, 25, 55, 84, 1, −6, −13, −62, −9, −18, −19, −4, 6, 5, 25, 4
        },
    {   2, 3, 4, 72, 9, 21, 32, 93, 3, 4, −10, −16, −14, −9, −7, 18 },
    {   {−3, −2, −30, 9, −7, −12, −50, 15, −2, −12, −22, 77, 11, −5,
21, 73 },
    {   0, 1, −8, −20, 5, 11, −3, −23, −5, −14, −67, −61, −20, −33,
−42, 58 },
  }
}
```

Tables 19 to 33 below show an example of kernel coefficient data for LFNST_8×8 that can be applied to 8×N or N×8 blocks (N≥8). In the g_lfnst8×8[36][3][16][48] array of Tables 19 to 33, [36] indicates that the number of LFNST sets is 36, [3] indicates that the number of LNFST kernel candidates per LFNST set is 3, [16][48] indicates that it is a 16×48 matrix based on forward LFNST (the corresponding array definitions in Tables 19 to 33 are described according to C/C++ grammar). If Tables 19 to 33 are used for LFNST where the number of LFNST sets is 35, the array can be represented as g_lfnst8×8[35][3][16][48].

The ROI to which the LFNST kernel in Tables 19 to 33 can be applied may be an region excluding the bottom right 4×4 region from the top left 8×8 region. One LFNST kernel consists of 16 transform basis vectors (row vectors), and one vector has a length of 48 ([16][48]). In the case of forward secondary transform performed in the encoding apparatus, the row basis vector of the LFNST kernel (16×48 dimension matrix) in Tables 19 to 33 and transform coefficient may be multiplied during matrix operation. For the inverse secondary transform performed in the decoding apparatus, the row basis vector of the transposed kernel (48×16 dimension matrix) of the LFNST kernel below and the transformation coefficient may be multiplied.

Tables 19 to 33 may represent a portion of the 36 LFNST sets. As described above, the LFNST set can be selected based on the intra prediction mode and mapped according to Table 3 or Table 4. According to Table 3, 35 LFNST sets are used, and according to Table 4, 36 LFNST sets are used. Tables 19 to 33 may be kernels corresponding to specific set numbers among 35 or 36 sets.

Tables 19 to 21 illustrate three LFNST kernels applied when the LFNST set index in Table 3 or Table 4 is 0 (when the intra prediction mode is planner mode), Tables 22 to 24 show three LFNST kernels applied when the LFNST set index in Table 3 or Table 4 is 1 (when the intra prediction mode is DC mode), Tables 25 to 27 show three LFNST kernels applied when the LFNST set index in Table 3 or Table 4 is 2 (when the intra prediction mode indicates the bottom left direction), Tables 28 to 30 show three LFNST kernels applied when the LFNST set index in Table 3 or Table 4 is 18 (when the intra prediction mode indicates the horizontal or vertical direction), and Tables 31 to 33 may represent three LFNST kernels applied when the LFNST set index of Table 3 or Table 4 is 34 (when the intra prediction mode indicates the upper left direction). One LFNST kernel is represented by one table. For example, Table 19 is the first LFNST kernel applied when LFNST set index is 0, Table 20 may be the second LFNST kernel applied when the LFNST set index is 0, and Table 21 may be the third LFNST kernel applied when the LFNST set index is 0.

TABLE 19

```
const int8_t g_lfnst8x8[ 36 ][ 3 ][ 16 ][ 48 ] = {
  {  //0
    {
      {111, −23, −25, −1, −4, 0, −2, 0, −38, 24, 4, −2, 1, 0, 0, 0, −28,
−1, 11, 0, 1, 0, 1, 0, 3, −3, −1, 1, 0, 0, 0, 0, −3, 1, 1, 0, 0, 0, 0, 0, −1, 0,
0, 0, 0, 0, 0, 0 },
      {−16, 44, −4, −8, −2, −2, 0, −1, −95, 1, 35, 1, 4, 0, 2, 0, 39, −39,
−7, 8, −1, 1, 0, 1, 22, 7, −12, −1, −1, 0, 0, 0, 2, 1, 1, −1, 3, 0, −1, 0, 1,
−1, 0, 0, 1, 0, −1, 0 },
      {−18, −98, 37, 18, 5, 3, 2, 1, −42, 17, −10, 4, 2, 0, 0, 0, 37, 26,
−15, −10, −2, −1, −1, 0, 6, 2, 1, −2, −1, 0, 0, 0, 0, 3, 0, −1, 0, 0, 0, 0, 1,
1, −1, 0, 0, 0, 0, 0 },
      {−44, −10, −3, 8, 4, 1, 1, 0, −14, 62, −1, −17, −1, −3, 0, −1, −66,
−16, 47, 1, 0, 1, 1, 0, 35, −36, −14, 12, −1, 2, 0, 1, 14, 7, −11, −2, 2, −2,
1, 0, 1, 1, 0, 0, 1, −1, 0, 0 },
      {11, 20, 14, −16, −2, −2, 0, −1, 22, 87, −21, −19, −5, −4, −1, −1,
59, −23, −1, 5, −3, 0, −1, 0, −41, −18, 11, 9, 3, 1, 1, 0, −10, −6, 1, 2, −1,
−4, 0, 1, 1, −1, −1, 0, −1, −1, 0, 0 },
      {18, 10, 102, −35, −10, −5, −1, −2, 1, −1, −3, 21, −5, 1, −1, 0,
−38, −26, −31, 18, 10, 2, 2, 1, 8, −1, −6, −6, 2, 0, 0, 0, 5, 5, −4, −1, 0, 1,
0, −1, 0, 0, −2, 0, 0, 0, 0, 0 },
      {3, −41, −18, 8, 6, 3, 1, 1, 39, −2, 23, −8, −7, −1, −1, 0, 12, −75,
−3, 36, −1, 3, −1, 1, 14, 32, −48, −7, 7, −1, 0, 0, −11, 29, 13, −16, −4,
−4, 4, 3, −2, 2, 1, 0, −1, 0, 0, 0 },
      {−10, −11, −15, −13, 9, 1, 2, 0, −26, −20, −83, 20, 14, 3, 2, 1,
−12, −54, 23, −1, 1, 3, 0, 1, −34, 24, 32, −7, −5, −1, 0, −1, 24, 7, −4, 1, 3,
3, 4, −1, 2, 1, 0, 0, 1, 1, 1, 0 },
      {11, 23, 0, 14, −7, −1, −2, 0, 12, 12, −60, 5, 12, −1, 1, 0, 17, 3,
−14, −27, 4, 1, 1, 0, 88, 14, −1, −8, −13, −1, −2, 0, −35, 15, 17, 1, −8,
−10, 7, 3, −5, −2, 1, 1, −1, −1, 1, 0 },
      {5, 15, 17, 102, −26, −6, −8, −2, 1, 5, 8, 1, 19, −6, 0, −1, −13,
−30, −24, −36, 14, 8, 3, 2, −28, −5, 2, −3, −5, 3, 1, 0, 12, 1, 0, −3, 4, 3,
−2, −1, 1, 1, 0, −2, 0, 0, 0, 0 },
      {22, 9, 36, 14, −5, −5, −3, −1, 12, −22, −1, 4, 3, 1, 0, 0, 38, 3, 75,
−15, −24, 1, −3, −1, 12, 8, −28, 27, 1, −3, 0, 0, 29, 7, −50, −7, −17, 5, 12,
−7, −5, −3, 1, 1, −2, 0, 0, 0 },
      {5, −8, −5, −2, −5, 3, 0, 0, −4, −41, −19, −6, 8, 3, 2, 1, 12, −18,
−12, 10, 2, 0, 0, 0, 3, −92, 6, 39, 3, 4, 0, 2, −39, 30, −9, −11, 14, 16, 6,
−8, 3, 4, 1, 0, 1, 3, 1, −1 },
      {4, 3, −28, −7, 4, 2, 2, 1, 9, 14, −6, 29, −5, −5, −1, −1, 14, 9, −45,
5, 18, −3, 0, 0, 15, −30, −11, −20, 3, 6, 0, 1, 81, 29, −24, −12, −32, 14,
21, −5, −8, −7, 7, 4, −2, −1, 1, 0 },
      {4, −2, 7, −8, −12, 5, 1, 0, −2, −14, −6, −99, 10, 13, 5, 2, −6, −3,
−30, 1, −19, 3, 2, 1, 11, 17, 23, 36, −8, −11, −2, −1, 39, 12, 3, 4, −12, 2,
1, 5, −4, −3, 1, 1, −1, 0, 0, 2 },
      {7, 7, 7, 9, 103, −30, −6, −4, 3, 2, 6, 3, 1, 16, −4, 0, −6, −10, −19,
−26, −50, 18, 8, 2, 0, −10, −2, 0, −3, −7, 2, 1, 1, 1, 2, 8, 0, 3, 0, −1, 1, 1,
0, 0, 0, 0, 0, 0 },
      {−2, 22, 7, 20, 6, −8, −2, −1, −22, 4, −35, −14, 0, 7, 3, 1, −11, 40,
−1, 32, −16, −10, 1, −1, −27, 11, −44, −6, 43, −6, 1, 0, −3, 17, 25, −58,
5, −14, 27, 14, 3, −6, −5, 5, 2, −1, 1, 0 },
},
```

TABLE 20

```
{
    {94, −55, −6, 0, −1, 0, 0, 0, −61, 17, 15, 0, 1, 0, 1, 0, −6, 15, −2,
−3, 0, 0, 0, 0, 2, 0, −3, 1, 0, 0, 0, 0, 0, 1, 0, 0, 0, 0, 0, 0, 0, 1, 0, 0, 0, 0,
0, 0 },
    {61, 40, 43, −4, −5, −1, −2, 0, 49, −48, −8, 10, 0, 1, 0, 1, −55, −8,
30, 1, 1, 1, 1, 0, −5, 14, 1, −6, 0, −1, 0, 0, −3, 1, −1, 0, −1, 1, 0, 0, −2,
0, 1, 0, 0, 1, 0, 0 },
```

TABLE 20-continued

```
{9, −74, 38, 11, 2, 2, 1, 0, 79, 21, −22, −14, −5, −2, −1, −1, −22,
0, −9, 2, 3, 0, 1, 0, −31, 6, 11, 2, 1, 0, 1, 0, −1, 7, −3, −2, −2, 0, 0, 1, 0,
1, −1, 0, −1, 0, 0, 0 },
{39, 46, −1, −21, −2, −4, −1, −1, 7, 60, −40, −8, 2, −2, −1, −1, 32,
−55, −22, 24, 1, 2, 0, 1, −24, −20, 26, 6, −3, 1, 0, 0, −2, 4, 5, −5, −4,
−2, 1, 0, 0, −1, 0, 0, −1, −1, 1, 0 },
{8, −17, −60, 30, 2, 4, 0, 2, 25, −24, 19, 14, −7, 0, −1, 0, 80, 11,
−4, −20, −7, −1, −2, −1, 45, −15, 7, 2, 6, 1, 1, 0, −15, 10, 11, −2, −2, 3,
−2, −2, 0, 1, 1, 0, −1, 0, 0, 0 },
{−25, −39, −21, 10, 9, 2, 2, 1, −33, −14, −38, 29, 4, 2, 1, 1, 1, −55,
51, 22, −11, 2, −1, 1, −10, 34, 32, −26, −5, −1, 0, −1, 13, 15, −16, −9,
0, −1, 0, 2, 2, 1, 0, 0, 0, 1, 0, −1 },
{23, 8, 73, −37, −11, −3, −1, −1, −6, −71, −4, 11, 12, 5, 1, 1, 41,
−4, −15, 11, −1, −2, −1, 0, −21, 26, 3, −8, −2, −1, 1, 0, −15, 9, −4, 0, 1,
4, −3, 0, 0, 0, −2, 1, 0, 1, 0, 0 },
{−3, 15, 14, 25, −14, 1, −3, 0, −12, 2, 75, −27, −17, 2, −1, 0, −21,
−50, −8, −18, 17, 5, 2, 1, −46, 20, 6, 6, 9, −4, 1, 0, 28, 27, −17, −6, 2,
−8, −9, 5, 3, 0, 0, 0, 0, 0, −1, 0 },
{−8, −18, −17, 23, −6, 2, −1, 1, −11, 43, −4, −20, 9, 5, 2, 1, −21,
−18, −53, 34, 21, −2, 1, 0, 28, −29, 41, 32, −21, −2, −2, 0, −14, 21, 32,
−27, 2, 10, −9, −5, −1, 2, −1, 0, 1, 1, 0, 0 },
{−20, 1, −19, −52, 18, 2, 4, 1, −21, −4, −11, 1, 21, −4, 1, 0, −31,
46, −6, 11, −4, −7, 1, −1, −74, −21, 19, 16, −2, 4, 2, 1, 36, 14, 3, −2,
13, −6, −7, 0, 3, −2, 2, 2, 2, −1, 0, 0 },
{−7, −28, −27, −77, 33, 10, 6, 2, 23, 4, 53, −5, 4, −9, −3, −2, 8,
−35, 1, 31, −9, −2, 0, 0, 25, 2, −26, 3, −2, 2, 0, 0, −16, 12, 3, 2, −7, 2,
−2, 1, −1, 2, 1, 2, −1, 0, −1, 0 },
{0, 0, −33, −1, −5, 4, 0, 1, 2, −1, −14, −62, 21, 8, 2, 1, 22, 21, −20,
22, 29, −12, −1, −2, 3, 68, −1, 5, −17, −11, 0, −2, 14, −26, −33, 5, −9,
−19, 14, 15, 0, 1, 6, −3, −1, −1, 1, 1 },
{9, 17, 12, 13, 1, −2, −1, 0, 18, 21, 39, 14, 6, −10, −2, −2, 10, 42,
12, 35, −26, −10, −1, −2, 19, 1, 45, −36, −36, 9, 0, 1, 5, 19, −27, −47,
−2, −13, −20, 11, −3, −3, 1, 3, 0, −1, −1, 0 },
{6, −1, −7, 5, 24, −6, 1, −1, 10, −7, −4, 60, −11, −13, −1, −1, −1,
−7, −68, −7, −14, 10, 5, 1, 18, 22, −7, −2, 6, 5, −2, 0, 65, −3, −3, 2,
−26, −21, 12, −1, −6, 4, 8, −3, −2, 1, 0, −2 },
{8, −10, 8, −5, −35, 10, 0, 2, 10, −20, −4, −19, 6, 13, 0, 1, 22, −6,
37, 12, 6, −7, −5, −1, 19, −59, −16, 17, −1, 0, 1, 2, 69, 9, −27, −1, −33,
0, 13, 2, −13, 8, 5, −3, −1, 3, −1, −1 },
{11, 10, 15, 22, 89, −35, −11, −3, −3, −18, −8, −46, 4, −10, 9, 3,
7, −4, 16, −13, −38, 15, 7, −1, 6, −9, 5, 26, 0, 5, −5, −2, 6, 6, −15, 0,
−5, 4, 0, 3, −3, 1, 0, −1, 0, 1, 0, 0 },
},
```

TABLE 21

```
{
{104, −58, −24, 11, 0, 0, −1, 0, −26, 18, 2, −2, 0, 0, 0, 0, −18,
8, 8, −3, 0, 0, 0, 0, −3, 1, 0, 0, 0, 0, 0, 0, −3, 1, 1, 0, −1, 0, 0, 0, −1, 1,
0, 0, 0, 0, 0, 0 },
{38, 82, −72, −19, 5, −3, −1, −1, 31, −21, −2, 3, 0, 0, 0, 0,
−22, −13, 20, 5, −2, 1, 0, 0, −4, −1, 3, 0, 0, 0, 0, 0, −3, −3, 3, 1, −1,
−1, 1, 0, −1, −1, 1, 0, 0, 0, 0, 0 },
{7, 44, 8, −33, −2, −1, 1, −1, −94, 30, 43, −10, −2, 0, 2, 0, 19,
−22, −7, 12, 0, 0, −1, 1, 16, −6, −10, 3, 1, 0, 0, 0, 5, −3, −3, 2, 3, −1,
−2, 1, 1−1, −1, 1, 1, 0, −1, 0 },
{46, 21, 75, −65, −25, 6, 1, −2, 36, 6, −27, 3, 2, −1, −1, 0, −2,
−8, −24, 18, 8, −3, 0, 1, −11, 0, 5, 1, 0, 0, 0, 0, −5, −1, −2, 3, −3, 0, 1,
0, −1, 0, −1, 1, −1, 0, 0, 0 },
{12, −2, 26, 4, −17, 1, −1, 0, −11, −92, 60, 34, −14, 3, 0, 1,
−26, 15, −5, −3, 6, −1, 0, 0, 8, 17, −15, −8, 4, 0, 0, 0, 1, 4, −4, −2, 2,
4, −3, −2, 0, 1, −1, 0, 1, 1, −1, −1 },
{17, 5, −23, 9, 7, −2, 0, 0, −8, −35, −23, 34, 7, −2, 0, 1, 93,
−26, −45, 11, 1, 0, −2, 1, −16, 14, 10, −11, −1, 1, 0, 0, −9, 4, 7, −3,
−4, 3, 3, −2, −1, 1, 2, −1, 2, 1, 1, −1 },
{17, 13, 1, 39, −34, −2, 0, 0, 47, 25, 63, −49, −31, 8, 1, −1, 36,
1, −28, −8, 12, 0, −2, 0, −6, −7, −16, 12, 9, −3, 0, 0, −8, −1, 1, 0, −5,
−1, −2, 2, −2, 0, 0, 0, −1, 0, −1, 1 },
{−13, −44, −24, −71, 57, 16, −1, 2, 25, −10, 39, −26, −20, 8, 0,
0, 15, −3, 5, 31, −19;−6, 1, 0, −6, 5, −10, 7, 4, −3, 0, 0, −3, 4, 0, 3, −2,
2, −2, 1, 0, 1, 0, 1, −1, 0, −1, 0 },
{1, 12, −17, −28, 8, 8, 0, 0, −12, −9, −10, −20, 17, 4, 0, 1, 12,
96, −44, −45, 12, −3, 1, −2, 8, −9, 6, 6, −6, −1, 1, 0, 0, −12, 6, 9, 0,
−3, 2, 3, −1, −2, 1, 2, 0;−1, 1, 1 },
```

TABLE 21-continued

```
{19, 24, 39, 19, 74, −59, −14, 0, 10, 14, 19, 18, −5, −9, −3, 0,
10, 15, 9, −25, −34, 20, 5, −1, −20, 4, 8, −9, −2, 4, 1, 0, −1, −4, −6, 1,
0, −2, −3, 0, 1, −1, −2, 0, 0, 0, −1, 0 },
{12, 1, 9, 16, 31, −20, −8, 1, 9, −21, −19, −29, 36, 7, −4, 1,
−7, −23, −28, 12, 1, 6, 2, 1, 79, −14, −51, 24, −3, −4, 0, 0, 3, 5, −2,
−2, −8, 4, 7, −1, −6, 2, 4, −1, −1, 1, 2, 0 },
{3, 1, 14, 6, −3, −3, −2, 0, −18, −43, −3, −76, 47, 22, −4, 2, 2,
−23, 19, −15, −9, 10, 0, 1, −45, 14, 33, 18, −19, −5, 3, −1, −1, 4, −2,
4, 5, 3, −4, 4, 3, 1, −3, 1, 1, 1, −1, 1 },
{9, −1, 9, −17, −29, 14, 7, 0, 4, −11, −15, 3, −17, 9, 4, 0, 51,
7, 70, −47, −43, 15, 0, −1, 36, −4, −23, 9, 3, −4, −2, 1, −2, 0, −14, 9,
−7, 1, 2, 1, −4, 0, 0, 1, −2, 0, 0, 0 },
{−3, 2, −3, −6, 8, −21, 8, 1, −17, −8, −40, −26, −65, 40, 20,
−2, −18, −16, −22, −25, 13, 18, 0, 0, −6, 45, −18, −20, 39, −12, −8,
1, 8, 3, 1, 2, 1, −3, 6, 5, 1, −2, 2, 20, 0, 1, 1 },
{−2, −3, −5, −15, −2, 10, 0, 1, 15, 22, 20, −3, 49, −25, −14,
2, 3, −11, 5, −32, 23, 9, −6, 1, 8, 69, −31, −59, −6, 14, 5, −2, 0, 11,
−2, −3, −1, −9, 1, 8, −1, −4, 1, 4, 0, −1, 0, 2 },
{9, 23, 16, 31, 17, 62, −52, −8, −5, 5, −10, −8, −3, 23, 1, −4,
1, 19, 2, 23, −37, −44, 30, 4, 4, 31, −5, −17, 7, −12, 2, 2, −4, 2, 3,
−15, 2, 5, 2, 2, 0, −3, −1, 0, 0, −1, 0, 0 },
}
},
```

TABLE 22

```
const int8_t g_lfnst8x8[ 36 ][ 3 ][ 16 ][ 48 ] = {
{ //1
{
{123, −20, −15, −5, −4, −2, −2, −1, −17, 5, 1, 1, 1, 0, 0, 0,
−15, 1, 2, 0, 1, 0, 0, 0, −4, 0, 0, 0, 0, 0, 0, 0, −5, 1, 1, 0, −2, 0, 0, 0,
−2, 0, 0, 0, −1, 0, 0, 0 },
{−11, 8, 4, 0, 0, 0, 0, 0, −121, −3, 19, 6, 6, 2, 3, 1, 22, −8,
−3, 0, 0, 0, 0, 0, 21, 3, −3, −1, −1, −1, −1, 0, 8, 0, −1, 0, 4, 0, −1, 0,
2, 0, 0, 0, 2, 0, 0, 0 },
{14, 117, −7, −17, −9, −6, −3, −2, 4, 7, 5, −2, 0, −1, 0, 0,
−26, −33, 3, 5, 4, 2, 1, 1, 0, −6, 5, 0, 1, 0, −2, 0, 0, 0, −2, 0, 0, 0,
−1, 0, 0 },
{16, 21, 14, −4, −3, −2, −1, −1, 11, −103, −11, 17, 6, 5, 1,
2, 53, 9, −23, −4, −3, 0, −1, 0, −4, 25, 5, −3, −1, −1, 0, 0, −7, 2, 0,
0, −2, 5, 1, −1, −2, 0, 0, 0, −2, 2, 1, 0 },
{−12, −23, 6, 8, 2, 1, 0, 0, −7, −58, 4, 13, 5, 3, 1, 1, −96,
−34, 10, 10, 8, 4, 3, 1, 23, 16, −3, −5, −2, −1, −1, −1, 15, 14, 0, −3,
3, 4, 0, −1, 2, 2, 0, 0, 2, 2, 0, −1 },
{−14, 7, −106, −5, 8, 5, 3, 3, −11, −18, −36, −3, 6, 2, 2, 1,
−7, 37, 35, −5, −3, −4, −1, −2, 3, 5, 14, 1, −1, −1, −1, 0, −1, −5, 6,
1, 2, 0, 3, 0, 0, −1, 2, 0, 1, 0, 1, 0 },
{1, 18, 53, 9, −3, −4, −3, −2, −22, −5, −37, −3, 4, 2, 2, 1,
−41, 78, 10, −21, −3, −4, 0, −2, −38, −15, 28, 7, 3, 1, 1, 0, 3, −17,
−7, 1, 6, 0, 1, 0, 4, −3, −3, 0, 2, −1, 0, 0 },
{7, 9, 15, 13, 0, −2, −2, −1, 6, 26, −57, −12, 4, 1, 2, 1, −1,
12, −31, −19, 0, 0, 2, 0, 86, 46, 8, −11, −10, −5, −3, −2, 5, 3, 9, 3,
−13, −10, 3, 3, −6, −3, 1, 1, −2, −2, 2, 1 },
{3, 9, 7, −21, −8, 0, 1, 0, 16, −7, 75, 6, −9, −3, −3, −1, −5,
64, 36, 4, −6, −6, −3, −2, 53, 13, −29, −5, −3, −1, −1, 0, −5, −13,
−11, 1, −6, −3, −5, 0, −4, −3, −2, 1, −1, −2, −2, 0 },
{1, −12, 23, −69, −16, 5, 5, 2, −3, −14, −35, −56, −15, 6,
6, 3, 12, −15, 41, 34, −3, −4, −4, −1, 20, −18, 6, 33, 5, 0, −2, −1,
12, 4, −16, 3, −2, 5, 1, 3, −2, 2, −2, 1, −1, 1, 0, 1 },
{8, 7, −3, 42, 8, −3, −3, −1, 7, −13, −23, 13, 8, 0, 0, 0, 10,
4, 0, −5, 0, 0, 0, 0, 34, −80, −49, 11, 8, 7, 2, 3, 37, 1, −32, −12, −2,
20, 10, −5, −6, 5, 5, −2, −2, 2, 3, −1 },
{8, 8, 14, 75, 25, −5, −6, −3, 2, −7, 8, −33, −9, 3, 2, 1, 15,
−26, 67, −10, −25, −2, −2, 0, 7, 18, 24, 22, −1, −3, −3, −1, −25,
−10, −10, 2, 0, −3, −8, 1, 0, 1, −4, −2, 0, 0, −2, 0 },
{5, 10, 1, 10, 0, −3, 0, −1, 4, 9, 10, 3, −5, −3, 0, 0, 13, 11,
21, 8, −4, −4, −3, −1, −21, 29, 15, −7, −1, −2, 0, −1, 85, 69, −7,
−23, −15, −13, 0, 3, −13, −16, −3, 3, −1, −1, −1, 0 },
{−1, 1, −15, −4, 15, 3, 0, 0, −1, −17, 32, −69, −24, 9, 5, 2,
−13, 5, −43, −62, −23, 5, 6, 3, −3, −14, −7, 25, 5, −2, −2, 0, 19,
17, 23, 23, 0, 4, 2, 5, −1, −2, 0, 3, 0, 1, 0, 2 },
{−1, 9, 0, 22, 9, 2, −2, −1, −11, −2, −15, −38, −26, 4, 4, 2,
−8, 19, −13, 44, 9, −11, −2, −1, −19, 27, −66, −7, 37, 1, 2, 0, −32,
20, 13, −39, 1, −5, 21, 3, 5, −3, 4, 0, 2, −1, 2, 1 },
```

TABLE 22-continued

```
        {−3, −2, −15, 35, −86, 1, 2, 2, 0, −2, 7, 9, −54, −1, 5, 0, 0,
3, −17, 11, 26, −7, 0, −1, 8, 3, 24, 34, 28, −7, −5, −2, 8, −10, −3, 9,
7, 3, −11, −11, −3, 2, 1, −5, −1, 0, 0, −2 },
},
```

TABLE 23

```
{
    {115, −35, −12, −4, −3, −1, −1, 0, −38, −6, 6, 3, 2, 1, 1, 0,
−13, 7, 4, 0, 0, 0, 0, 0, −4, 3, 0, −1, 0, 0, 0, 0, −3, 2, 0, 0, −1, 1, 0,
0, −1, 1, 0, 0, 0, 0, 0, 0 },
        (42, 66, −23, −11, −6, −3, −2, −1, 75, −16, −37, −3, 0, 1,
−1, 0, −21, −34, 2, 12, 4, 2, 1, 1, −15, −4, 13, 4, 0, 0, 0, 0, −8,
−1, 5, 0, −3, 1, 2, 0, −2, 0, 1, 0, −1, 0, 1, 0 },
        {12, 79, 29, −25, −10, −6, −2, −2, −58, 57, 3, −24, 0, −1,
1, −1, −2, −1, −22, −1, 6, 2, 1, 0, 10, −13, −9, 8, 3, 0, 0, 0, 5,
−10, −2, 5, 2, −5, 1, 2, 1, −3, 0, 1, 1, −2, 0, 1 },
        {17, −41, 15, 2, 1, 1, 0, 0, 59, 76, 6, −24, −12, −5, −3, −2,
30, 8, −37, −15, 1, 2, 1, 0, −21, −27, −9, 11, 8, 2, 1, 1, −10, −4,
5, 6, −5, −2, 2, 1, −1, 1, 1, 0, −2, −1, 0, 1 },
        {7, 1, 85, 16, −17, −6, −4, −2, 23, −19, 53, −9, −19, −1,
−1, 0, −53, −17, 8, −16, 4, 6, 3, 1, −13, 15, −6, −7, 7, 1, 0, 0, 3,
9, −13, −3, 2, 2, −7, 1, 1, 0, −4, 0, 1, 0, −2, 0 },
        {16, 41, −14, 2, −7, −2, −2, −1, 25, −17, 45, 16, −10, −3,
−2, −1, 44, 64, 27, −34, −20, −5, −2, −1, 8, 1, −35, −24, 3, 4, 2,
1, −11, −16, −11, 6, −5, −4, −1, 3, −3, −2, 0, 2, −1, −1, −1, 0 },
        {−16, −1, −54, −8, 10, 4, 3, 1, 2, 55, 24, 2, −1, −6, −2,
−2, −75, 23, 40, −7, −7, −3, 1, −1, −32, 8, 7, −10, −1, 2, 1, 0, 6,
3, −5, −2, 8, −6, −6, 1, 6, −3, −1, 1, 2, −3, −1, 1 },
        {7, 18, −6, 79, 15, −15, −7, −3, −13, 23, 17, 64, −9, −19,
−5, −3, 10, −40, −4, 3, −21, 1, 3, 2, −7, −30, 8, −8, −6, 8, 3, 1, 0,
1, 9, −11, 0, 2, 0, −8, 0, 2, 0, −4, 0, 1, 0, −2 },
        {−12, 2, −40, −9, −2, 6, 2, 1, −16, −41, 34, −9, −9, 6, 2,
1, −16, −22, −39, −35, 12, 11, 4, 2, −29, −47, −32, 29, 32, 6, 1,
1, −3, 1, 22, 27, 6, 10, 7, 0, 4, 5, 3, −1, 2, 2, 0, 0 },
        {−3, −5, 5, −56, −24, 10, 6, 2, −5, 3, 44, 8, −3, 7, −2, −1,
40, −38, 48, 33, −11, −5, −6, −1, −29, −34, 29, −1, −11, 1, 1, 1,
−13, 8, 7, −9, 0, 9, −9, −6, 3, 5, −6, 0, 0, 1, −3, 0 },
        {4, −11, −30, −18, −9, 6, 4, 2, 20, 15, 36, 6, −9, −1, −2,
−1, −5, −45, −5, 12, 4, 4, 0, 1, 81, 7, −30, −2, 0, −1, −2, 0, 46, 0,
−22, 0, −10, −12, −1, 5, −10, 0, 6, 1, −4, 1, 1, 0 },
        {0, −5, 27, −21, 22, 1, −4, −1, 13, 4, 3, 43, 56, −8, −10,
−3, −27, 22, −7, 49, 13, −26, −6, −1, −4, −36, −45, 10, −13, −6,
5, 3, −1, −26, −6, 13, 3, 3, 10, −1, 1, 4, 4, −4, 1, 2, 1, −3 },
        {4, 13, −3, −21, 49, 7, −9, −2, 3, 1, 28, 9, 53, −5, −14,
−2, 22, −18, −34, −24, 8, −11, −2, 3, −23, 44, 3, −16, −2, −6, 4,
1, 7, 55, −2, −11, −4, −5, −18, 0, −2, −8, −2, 7, 0, −2, 1, 2 },
        {6, −1, 11, 9, 73, 7, −12, −2, 0, −7, 1, −51, 24, 0, −7, 2, 1,
−23, 44, −32, −18, 3, 1, 2, 23, −33, 15, 0, −10, 6, 2, 0, 0, −32,
−6, 14, −1, 3, 4, 10, −1, 7, −1, 0, −1, 3, −2, 1 },
        {−4, −14, 14, −31, −11, −1, 4, 1, −9, 6, −50, 22, −1, −5,
3, 1, −2, −32, 7, −32, −38, 10, 7, 3, −21, −7, −42, −62, 12, 27, 8,
2, 7, 3, −22, 12, 4, −1, 7, 14, 2, 0, 5, 7, 1, 1, 3, 1 },
```

TABLE 23-continued

```
        {−6, −3, −16, 8, 1, −2, 1, 1, −9, 6, 15, −2, 2, 2, −2, 1, 6,
−32, −7, 9, 33, 5, −4, 0, −13, 35, −8, −13, 10, −13, −4, −2, −70,
−50, −45, −7, −20, −7, 13, 24, 16, 17, 14, 3, 2, 1, 0, −2 },
  },
```

TABLE 24

```
{
        {−122, 25, 18, 4, 4, 2, 2, 1, 15, −9, −2, 1, 0, 0, 0, 0, 13,
−1, −3, −1, 0, 0, 0, 0, 5, 0, 0, 0, 0, 0, 0, 0, 4, −1, −1, 0, 2, 0, 0, 0,
2, 0, 0, 0, 1, 0, 0, 0 },
        {15, 113, −30, −33, −5, −3, −1, −2, −18, −8, 23, 0, −4,
0, 0, 0, −2, −16, 3, 8, 1, −1, 0, 0, 0, −5, −1, 1, 1, 0, 0, 0, 0, −5, 0,
2, 0, −2, 0, 0, 0, −2, 0, 1, 0, 0, 0, 0 },
        {−15, −9, −97, 10, 25, 3, 2, 2, 38, 46, −9, −34, −4, 1,
−1, −1, −5, 4, 28, 0, −9, −1, 0, 0, −2, −4, 4, 5, 0, −1, 0, 0, −2, −2,
5, 1, −1, −2, 1, 1, −1, −1, 2, 0, 0, −1, 0, 0 },
        {20, 27, 37, −23, −17, 0, −1, −1, 100, 9, −49, 0, −1,
−4, −2, 0, −10, 8, 2, −4, 2, 1, 0, 0, −12, −4, 7, 3, −1, 1, 0, 0, −7,
−2, 0, 2, −5, −1, 2, 1, −2, 0, 0, 1, −2, 0, 1, 0 },
        {7, 20, −32, 52, 15, −10, −4, −1, −7, −59, −62, 24, 39,
6, −1, 2, 6, 12, −11, −36, −1, 9, 2, 0, 1, 9, 14, −8, −1]1, −1, 1, 0,
1, 3, 5, −3, 0, 3, 5, −1, 0, 1, 2, −1, 0, 1, 2, 0 },
        {−1, −28, −37, −43, 19, 11, 4, 3, 42, −79, 36, 32, −20,
2, −1, 1, 1, −2, −14, 23, 5, −5, −1, 0, −2, 13, −6, −7, 4, 1, −1,
0, −1, 5, 1, 1, −2, 5, −1, −2, −1, 2, 1, 1, −1, 2, 0, −1 },
        {−1, 8, 9, 63, 1, −17, −5, −1, 23, −11, 34, 20, 5, −3,
−5, −1, −78, −36, 31, 18, 5, 6, 2, 1, −4, −16, −20, 2, 8, 3, 1, 0, 2,
2, −7, −9, 2, 1, −3, −3, 1, 2, −1, −3, 1, 1, −1, −1 },
        {6, 8, −16, 44, −23, −11, 1, 0, 26, 37, 34, 44, −7, −27,
−6, −2, 47, 1, −50, −2, 40, 3, −8, −1, −1, 6, −5, −26, 1, 13, 1, −1,
−5, −3, 4, −4, −4, −2, −1, 4, −2, −2, 1, −1, −1, −1, 0, −1 },
        {17, 15, 23, 46, 27, −22, −9, −3, 26, −25, 40, −59, −19,
30, 1, 0, 45, 16, −8, −1, −36, −3, 5, 1, −2, 10, −5, 15, 5, −11, −1,
0, −5, −2, −2, 0, −3, 1, −3, 3, −2, −1, −1, 0, −2, 0, −1, 1 },
        {4, −5, 4, −7, 40, 1, −8, −1, 2, 10, −31, −21, 22, 15, 1,
−1, 15, −89, −45, 34, 6, 6, 5, 4, 2, −2, −24, −11, 5, 2, 0, 1, −1, 7,
3, −7, 0, 4, 3, 0, 0, 3, 3, −1, 0, 2, 2, 0 },
        {−1, −2, 10, −26, 40, −7, −8, 1, 12, 20, 43, 0, 35, 14,
−15, −4, −31, 3, −28, −57, −3, 39, 12, −1, 4, 8, 14, −17, −45, −5,
12, 3, −1, −2, 6, 16, 1, −3, −3, 3, 0, −1, 0, 3, 0, −1, −1, 1 },
        {6, 10, 21, −2, 87, 1, −23, −3, −5, 25, −6, 59, −3, −9,
−1, −4, 19, 26, 29, 22, −15, −16, 0, −1, −10, −12, 2, −3, 11, 5,
−2, 0, −1, −6, −8, −7, −2, −3, −1, −5, 0, −2, −2, −2, 0, −1, 0,
−1 },
        {3, −10, 0, −10, −23, −8, 6, 2, 11, −7, 18, 17, 54, −24,
−20, 1, 56, −34, 58, 0, −24, 32, −8, −5, 0, −5, −8, 29, −18, −2, 9,
−1, −1, 1, −11, 2, −4, 1, −4, −1, −2, 1, −2, −2, −1, 1, −1, −1 },
        {−7, −7, −3, 3, 0, −4, 1, 1, −9, −9, 5, −5, 5, 3, −1, 0, 1,
−8, −16, 8, 17, 4, −2, −1, −89, −42, 45, 27, 1, 2, 1, 1, −32, −36,
4, 22, 1, 0, −7, −3, 6, 3, −2, −3, 3, 3, −1, −1 },
        {4, 2, 1, 20, −9, 68, −4, −9, 5, 7, 3, 32, −42, 16, 28, −6,
10, −47, 6, −38, −32, −15, 14, 9, 2, −1, 22, 10, −22, −19, −6, 3,
−2, 3, 1, 16, −1, 1, −2, −1, 0, 1, −1, 1, −1, 1, −1, 0 },
        {4, 5, −2, 5, −1, 74, 6, −13, 7, −3, 14, −10, 47, 23, 0,
−3, 3, 32, −14, −5, 19, −7, −1, 0, 2, −45, −44, 9, 13, 1, 2, 4, 5,
−12, −31, −19, 1, 3, 1, −5, 1, 2, 2, −1, −1, 0, 3, 1 },
      }
  },
```

TABLE 25

```
const int8_t g_lfnst8x8[ 36 ][ 3 ][ 16 ][ 48 ] = {
  {   //2
    {
      {118, −35, −14, −4, −3, −1, −1, 0, −25, −6, 2, 3, 1, 1, 1, 0, −14, 5, 4, 1, 0, 0, 0, 0, −7, 3, 1, −1, 0, 0, 0, 0,
−4, 2, 1, 0, −2, 1, 0, 0, −1, 1, 0, 0, −1, 0, 0, 0 },
      {−27, −26, 19, 2, 3, 1, 1, 0, −106, 22, 30, 2, 3, 0, 2, 0, 0, 33, 2, −7, −2, −2, 0, 0, 16, 7, −11, −5,
−1, 0, 0, 0, 12, −1, −7, 0, 7, −3, −3, 1, 4, −1, −1, 0, 2, −1, −1, 0 },
      {13, 97, −19, −16, −7, −4, −2, −1, −35, 23, −16, −8, 1, 1, 1, 0, −59, −9, 5, 7, 7, 2, 2, 0, −10, 5, 7, 4, 1,
−1, 0, 0, 4, −2, 1, 0, 6, −3, 0, 0, 3, −3, 0, 0, 2, −1, 0, 0 },
      {−21, −18, 0, 11, 1, 2, 0, 1, −6, −81, 15, 19, 4, 4, 1, 1, −59, −13, 46, 11, 1, 0, 1, 0, −7, 33, 22, −10, −6, −3,
−1, −1, 2, 18, −2, −12, 4, 8, −6, −4, 2, 2, −3, −1, 2, 2, −2, −1 },
      {−2, −25, 52, −8, −2, −1, 1, 0, 35, 49, 31, −27, −10, −5, −1, −1, −60, 20, −3, −20, 1, 1, 2, 0, −49, 13, −2,
−1, 8, 2, 2, 0, −11, 15, −5, 1, 1, 1, −8, 1, 4, −1, −5, 1, 2, −2, −2, 1 },
```

TABLE 25-continued

{−15, −36, 4, 5, 6, 2, 2, 0, −31, 21, −32, 3, 4, 1, 0, 0, −8, −70, −22, 25, 8, 5, 1, 1, −38, −30, 40, 26, 4, 1, 0, 0, −3, 16, 30, 1, 1, 11, 7, −8, 4, 6, 0, −4, 1, 2, 0, −2 },

{−21, −29, −77, 18, 14, 6, 2, 1, 8, 29, −45, 21, 10, −1, −1, 0, −20, 59, 6, 4, −3, −7, −2, −1, −27, 13, 3, −5, −3, −2, 1, 0, −10, 1, 6, −1, 3, −2, 5, −1, 4, −3, 3, 0, 2, −3, 2, 0 },

{5, −17, 18, −6, 3, −1, 1, −1, 12, 41, −42, −5, 2, 0, 0, 0, −4, −18, 6, 25, 3, 1, 0, 0, 53, 55, 25, −13, −17, −7, −3, −1, 39, 16, −29, −28, 1, −16, −17, −1, −2, −9, −2, 5, −3, −3, 1, 2 },

{7, 25, 0, 11, −6, −2, −1, 0, −5, 29, 26, 18, −11, −3, −2, 0, 54, −3, 54, 1, −22, −6, −3, −1, −40, 10, 44, −31, −17, −2, 1, 0, −24, 16, 2, −30, −5, 8, −12, −12, 1, 1, −9, −3, 0, −1, −4, 0 },

{−1, −13, −33, 23, −1, 3, 0, 1, 19, 38, 51, 25, −15, −9, −4, −1, −35, −28, 32, 2, −16, −2, 0, 1, 41, −51, −4, −3, −6, 6, 1, 2, 32, −20, 6, −1, 4, −7, 3, −4, −3, 2, 2, −4, −2, 2, −1, −2 },

{10, 20, 6, 79, −4, −12, −5, −2, 0, −6, 7, 37, −18, −12, −2, 0, −2, 2, −59, −27, −10, 4, 6, 3, 0, 21, −2, 2, 8, 8, 4, 0, 20, 36, 14, −11, 6, −1, −13, −15, −1, −8, −4, −4, 0, −3, 0, 1 },

{7, 6, 63, 33, −1, −11, −3, −2, 0, 3, −39, 45, −1, −7, −1, 0, −18, 18, 11, 32, −16, −7, −1, 0, 7, −16, −5, −10, −20, −1, 1, 1, −33, −50, 1, 4, −10, −2, 26, 4, 0, 4, 8, −5, 2, 3, 2, −4 },

{−3, −6, −8, 9, 2, −3, 0, 0, −10, 6, −17, 22, −10, −4, −1, 1, 8, −53, 18, −24, −9, 5, 2, 2, −39, 21, −46, −31, 23, 5, 5, 1, 7, −11, −50, 30, 8, −20, 2, 32, 6, −8, 15, 13, 2, −1, 8, 0 },

{−6, −6, −18, 15, 1, 5, 0, 0, −8, 13, 7, −22, −12, 4, 2, 0, −12, −26, −4, −32, 2, 12, 4, 1, 36, 39, 6, −14, 10, 3, 0, −2, −59, −7, 19, 2, −64, 1, 28, 2, −16, 20, 11, −4, −2, 6, −1, −2 },

{1, 8, −10, −8, 36, −6, 0, 0, 7, 12, 52, 33, 42, −19, −5, −3, 4, −12, −26, 54, 18, −22, −5, −1, −10, 30, −21, 26, −19, −16, 1, 1, −19, 9, −15, 4, −20, −8, 1, 10, −2, 1, 11, 2, 1, −1, 2, −3 },

{2, 3, 15, −42, 16, −4, 1, −1, 4, 13, −18, 42, 15, −6, −3, −2, 1, −5, 24, −16, −19, −6, −1, 1, 14, 15, −40, −7, 17, 5, 6, 1, 14, 38, 45, 29, −6, 35, 12, −36, −4, 5, −19, −15, −2, 1, −8, −3 },

},

TABLE 26

{

{81, −59, 6, −1, 1, −1, 0, 0, −66, 38, 7, −3, 1, 0, 1, 0, 9, 8, −13, 2, −1, 0, 0, 0, 1, −7, 3, 2, −1, 0, 0, 0, 0, 2, 1, −2, −1, −1, 0, 0, 0, 1, 0, 0, 0, 0, 0, 0 },

{55, 8, −30, 2, −3, 1, −2, 0, 20, −64, 33, 2, 1, 0, 1, 0, −56, 51, 5, −14, 4, −2, 1, −1, 15, −1, −21, 9, −1, 0, −1, 0, −4, −5, 9, 1, 1, 2 −2, −2, −3, 0, 1, 0, 0, 1, −1, 0 },

{29, −53, 48, −12, 3, −2, 1, −1, 70, 1, −42, 1, 0, 0, −1, 0, −34, −18, 19, 11, −2, 1, 0, 0, −21, 31, 2, −11, 1, −1, 0, 0, 1, −2, −10, 5, −3, 1, 5, 0, 0, 0, −2, 0, −2, 1, 1, 0 },

{−52, −38, 38, 4, 4, 1, 1, 0, 4, 26, 4, −17, 2, −2, 1, −1, −41, 58, −41, 9, 2, −1, 0, 0, 37, −32, −1, 15, −8, 3, −1, 1, 2, −7, 13, −8, 1, 2, −3, 0, 0, 0, 0, 0, 1, −1, 0, 0 },

{13, −20, −20, 21, −1, 2, −1, 1, 51, −11, 41, −33, −2, −3, 0, −1, 33, −11, −55, 14, 8, 0, 0, 0, −31, −19, 40, 13, −9, 1, 0, 0, −13, 30, −4, −21, 0, −6, −8, 10, −2, 3, 3, −2, −1, −1, −1, 1 },

{29, 28, −34, 20, −10, 1, −3, 0, 24, 40, −38, −7, −2, 0, −1, 0, −30, −30, 13, 14, 1, 2, 0, 1, 58, −46, 27, −7, −5, 1, −1, 0, −25, 5, 7, −9, −2, 6, −3, 2, −4, 0, 0, 0, 0, 0, 1, 0 },

{23, 31, 39, −60, 6, −4, 2, −2, 1, −32, −34, 39, 8, −2, 0, 0, 29, 24, −27, 15, −20, 3, −2, 1, −3, −42, 24, −4, 3, 5, −1, 1, −11, 15, 11, −9, −3, 4, −10, 0, −1, −1, 2, 4, 0, 0, 0, −2 },

{19, 10, −10, −8, 7, −2, 1, −1, 43, 42, −10, 9, −17, 0, −3, 0, 36, 8, −17, −41, 11, −1, 1, −1, −11, −14, −49, 42, 6, −1, 1, 0, 14, −37, 40, 7, −15, 10, 2, −15, −1, −2, −2, 5, −3, 0, 1, −1 },

{16, 48, −12, −9, −1, −2, −1, −1, −6, 25, −12, −17, 6, −2, 1, −1, −34, 12, −41, 38, −2, 0, 1, 0, −33, 24, 23, −5, −12, 3, −2, 0, 57, −40, −13, −1, −10, −10, 17, 2, 2, 3, −2, −4, −1, −2, 0, 1 },

{−17, −33, −23, 10, 11, 0, 2, 0, −13, −23, −12, 46, −25, 7, −3, 1, −21, −18, 14, −20, 15, 5, 0, 1, −18, −20, 49, 18, −6, −3, −1, 0, 46, −10, 23, −32, −29, 24, −13, −4, 6, 6, −3, 3, 0, 0, 0, −1 },

{1, 10, 16, −34, 25, −10, 3, −1, −17, −11, 21, −12, −8, 2, 1, 0, −22, −55, −17, 32, 14, 1, 1, 0, 18, 35, −18, 36, −24, −1, −2, 0, −27, −7, 42, −31, 7, 19, −17, −4, 4, −7, −1, 6, 1, 2, 1, −1 },

{−3, 17, −10, −30, 30, −6, 2, −1, 1, 43, 8, 26, −32, −2, −1, −1, −40, 7, −5, −37, 11, 10, 0, 0, −24, 8, 5, 16, 13, −10, 1, −1, −13, 49, −25, −8, 28, −35, −13, 18, 1, −5, 15, −4, 0, 0, −4, −1 },

{−4, −19, −25, −28, 53, −9, 2, −1, 19, 5, 38, 22, −39, −3, 2, −1, 14, −4, −13, 17, −24, 18, −5, 1, 39, 7, 6, −45, 18, −4, −3, 1, −1, −31, −19, 19, −15, 11, 16, 3, −1, 2, −5, −5, −1, −1, 1, 2 },

{15, 28, 41, −5, −13, −4, −1, −1, 13, 24, 37, −15, −11, 3, −3, −1, 18, 24, 33, −25, 10, −10, −1, −1, 22, 21, 21, −21, −19, −3, 0, −1, 17, 0, −19, −44, −31, 22, −40, 9, 4, −7, −8, 9, −1, −4, −1, −1 },

{−3, −11, −31, 26, 3, −2, 0, −1, 6, 5, −35, 31, −18, 8, −5, 1, 29, 47, 2, 27, −7, −8, −3, 0, 3, 47, 2, −11, −34, 3, −1, 0, −23, −12, 19, −40, 33, −17, −13, 3, −4, −11, 8, 0, 0, 2, −1, −2 },

{6, −3, 15, −4, −4, −2, 2, 0, 0, −26, −14, 9, −14, 10, 0, 1, 21, −14, −11, −13, 43, −11, 0, 0, 47, 1, −2, 31, −34, −5, 1, −1, 17, −15, −43, −5, −4, −38, 37, 29, −12, 16, 21, −25, −5, 6, −9, 0 },

},

TABLE 27

{−98, 66, −1, −1, 0, 0, 0, 0, 42, −10, −16, 4, −1, 0, −1, 0, 5, −15, 6, 3, −1, 1, 0, 0, 4, −1, 2, −2, 0, 0, 0, 0, 1, −3, 1, 0, 1, 0, 0, 0, 1, −1, 0, 0, 0, 0, 0, 0 },

{46, 38, −51, 4, −6, 1, −2, 0, 35, −78, 13, 20, −3, 3, 0, 1, −25, 8, 34, −12, −2, 0, 1, 0, −4, 9, −7, −7, 4, 0, 0, 0, −6, 2, 2, 1, −1, 2, −1, −1, −2, 0, 1, 0, 0, 1, 0, 0 },

{44, 18, 4, −16, −1, −3, 0, −1, 20, 24, −78, 18, 4, 0, −1, 0, 11, −58, 17, 36, −12, 4, −1, 1, −7, 1, 29, −14, −6, 2, 0, 0, −3, −1, 0, −4, −3, 1, 5, −2, −1, −1, 0, 0, −1, 0, 1, −1 },

{−4, −64, 47, 2, 1, 1, 1, 0, 90, −24, 2, −21, −1, 0, −1, 0, −15, −11, −2, 0, 8, −1, 1, 0, −13, 15, 2, 2, 0, −2, 1, 0, −6, 6, −5, 0, −4, 4, −1, 1, −2, 2, −1, 0, −1, 1, 0, 0 },

TABLE 27-continued

```
{26, 31, −31, 13, −4, −1, −2, 0, 35, 20, 3, −41, 2, −1, 0, −1, −20, 11, −71, 23, 24, −6, 2, 0, 6, −25, 13, 42,
−21, 0, 0, 0, −1, −5, 15, −12, −1, −5, 2, 2, −2, 0, 2, −2, 0, −1, 1, 1 },
{−11, −35, −60, 59, −6, 7, −1, 1, 19, 16, 19, 17, −28, 5, −4, 1, 56, −35, 2, −17, −4, 7, −2, 1, −6, −18, 20,
−3, 7, −1, 0, 0, −1, 6, 6, −9, −4, 0, 1, −2, −1, 3, 1, −2, −2, 0, 0, 0 },
{−27, −28, −8, 37, −6, 1, 0, 1, −28, −30, −1, 5, 11, 2, 3, 0, −37, 11, 12, 61, −8, −9, 0, −1, 17, 7, 48, −14,
−45, 6, −1, 0, 2, 4, 0, −35, 4, 3, −1, −2, 1, 2, −1, −4, 2, 0, 0, 0 },
{8, 11, 28, −36, 5, −3, 1, 0, −15, −58, 36, −16, 18, 0, 1, 1, 72, −29, −16, 19, 3, −6, 0, 0, 2, −26, 22, 8,
−14, 2, 0, 0, −6, 12, 6, −12, −5, 4, −5, 1, −3, 5, −1, −1, −2, 2, −2, 1 },
{−5, −25, −9, −20, 16, 0, 3, 0, 25, −9, −28, 54, 10, −14, 1, −1, 24, 57, −25, 13, −46, 1, 1, −1, 22, −40,
−19, 0, −6, 19, −3, 2, −1, −13, 23, 3, −2, −1, 4, −7, −3, 0, 4, 0, −1, 0, 1, −2 },
{−22, −32, −26, −22, 37, −3, 4, 0, −25, −30, −32, 27, 2, 5, 0, 1, −18, −29, −11, −6, 39, 2, 1, 0, −17, 14,
−5, 64, 8, −16, 1, −1, 11, 4, 29, 9, 2, 6, 4, −6, 4, 1, 4, −1, 0, 1, 0, −1 },
{3, −2, 12, 47, −41, 3, −4, 0, −9, −26, −47, −14, 12, 23, −4, 2, 43, 19, 2, 11, 35, −23, −5, −1, 14, 13, −45, 6,
−14, −14, 9, 0, 0, −23, −4, 25, 2, 0, 15, 0, −3, −4, 2, −1, 0, 1, 3, 0 },
{8, 4, 41, 12, −23, 2, −1, 0, −7, −11, 0, 12, −41, 15, −1, 1, −29, −23, 11, −21, 10, 22, −6, 2, 65,
−51, 9, 13, 16, −5, −7, 1, 9, −23, 29, −8, −5, 8, 2, −11, −4, 3, −1, −2, −1, 3, −1, −1 },
{4, 20, 40, 21, −41, 8, −1, 0, −10, −10, −5, 44, −33, 11, −3, 1, −2, 19, −37, −3, −5, 6, 0, 0,
−70, 8, 16, 6, 8, 2, 1, 0, −12, 27, 20, −14, 5, −1, −6, −12, 5, −2, 0, −4, 2, −1, 0, −2 },
{−10, −11, −12, 13, −27, 19, −5, 3, −14, −23, −13, −23, 41, −14, 6, −1, −22, −16, −26, 13, −21, 22, 0, 2, −3,
−31, 11, −17, 60, 3, −5, 1, −8, 28, −7, 51, 9, −2, 16, −2, −1, 5, −2, 2, 2, −1, 2, −1 },
{−1, −4, −10, −18, 16, 6, −3, 0, 1, −10, −35, −1, −17, 19, 0, 0, 15, 40, −20, −17, 38, 17, −15, 1, 32, 8, 39,
−26, 28, −34, −7, 2, −21, 28, −34, −25, 0, −6, −20, 21, 0, −2, 2, 7, 0, −2, 0, 3 },
{−5, −4, −4, −7, −5, 8, −3, 0, 2, 16, −17, −24, 35, 10, −7, 2, −3, 28, 50, −33, 23, −29, 0, 1, −32, −52, 26, −5,
−8, −3, 12, −1, −26, 11, 43, −7, −3, 19, −7, −12, −1, 4, −9, 0, 1, 1, −3, 1 },
}
},
```

TABLE 28

```
const int8_t g_lfnst8x8[ 36 ][ 3 ][ 16 ][ 48 ] = {
{ //18
{
{119, −20, −9, −5, −4, −2, −2, −1, 13, −2, −2, 0, −1, 0, 0, 0, −35, 5, 3, 1, 1, 1, 0, 0, −11, 2, 1, 0, 0, 0, 0, 0,
−5, 1, 0, 0, −3, 1, 0, 0, −2, 0, 0, 0, −1, 0, 0, 0 },
{12, −2, 0, −1, 0, 0, 0, 0, −117, 14, 9, 4, 4, 2, 2, 1, −19, 2, 2, 1, 1, 0, 0, 0, 39, −4, −3, −1, −1, 0, −1, 0, 15, −2,
−1, 0, 4, 0, 0, 0, 0, 0, 0, 0, 1, 0, 0, 0 },
{−34, 7, 2, 2, 1, 1, 0, 0, 18, −3, −1, −1, 0, 0, 0, 0, −115, 12, 9, 3, 4, 2, 2, 1, −6, 1, 1, 0, 0, 0, 0, 0, 34, −3, −3,
−1, 8, −1, −1, 0, 2, −1, 0, 0, 1, 0, 0, 0 },
{5, 0, −1, 0, 0, 0, 0, 0, 39, −3, −3, −2, −1, −1, −1, 0, −1, 0, −1, 0, 0, 0, 0, 0, 115, −11, −10, −3, −4, −1, −2, 0, 10,
−1, −1, 0, −32, 3, 3, 1, −11, 1, 1, 0, −3, 0, 0, 0 },
{−14, −107, 18, 2, 10, 4, 4, 2, −3, −47, 7, 2, 4, 2, 1, 1, 8, 29, −3, −1, −3, −1, −1, 0, 0, 23, −3, −1, −2, −1,
−1, 0, 21, 6, −4, −1, 1, 3, −1, 0, −4, 3, 0, 0, −2, 1, 0, 0 },
{−14, −16, 4, 1, 2, 1, 1, 0, −6, −8, 2, 0, 1, 0, 0, 0, −31, 11, 2, 1, 0, 0, 0, 0, 17, 2, −1, −1, −1, 0, 0, 0,
−116, 10, 9, 2, 5, 1, 0, 0, 26, −1, −2, 0, 6, 0, 0, 0 },
{7, 5, −1, 0, −1, 0, 0, 0, 12, −11, 1, 0, 0, 0, 0, 0, 7, −7, 0, 0, 0, 0, 0, 0, 28, 1, −2, −1, −1, 0, 0, 0, 4, 1, −2, 0, 120,
−10, −10, −2, −2, 0, 0, 0, −24, 2, 2, 0 },
{3, 27, −5, 0, −3, 0, −1, 0, −11, −91, 12, 5, 6, 4, 2, 2, −7, −71, 8, 4, 5, 3, 2, 1, 0, 26, −2, 0, −1, −1, −1, 0, 0, 30,
−2, −1, −12, 9, 0, 0, −2, 0, 0, 0, 2, 3, −1, 0 },
{−9, −10, −101, 15, −4, 9, 2, 3, −6, −12, −61, 9, −1, 5, 2, 2, 3, 13, 21, −1, 1, −2, 0, −1, 3, 8, 27, −3, 1, −2, −1,
−1, 1, −2, 12, −2, 1, −1, 5, −1, −1, 0, 3, −1, 0, 0, 1, 0 },
{−5, 3, 2, 1, 1, 0, 0, 0, −5, 1, 1, 0, 0, 0, 0, 0, −8, 5, −1, 0, 0, 0, 0, 0, −8, 2, 0, 0, 0, 0, 0, 0, −26, 1, 2, 1, 1, 0, 2, 0,
−124, 8, 10, 2, −5, 0, 1, 0 },
{8, 52, 1, −4, −4, −2, −2, −1, −4, −45, 15, 0, 3, 1, 1, 0, 9, 83, −11, −5, −5, −3, −2, −1, 4, 53, −10, −3, −4, −2, −1,
−1, 0, −32, 0, 1, −4, −14, 1, 1, 4, −7, 0, 1, 1, −1, 0, 0 },
{−1, −3, 3, −1, 1, −1, 1, 0, 4, 49, −12, −4, −2, −2, −1, −1, −2, −12, −2, −2, 1, 0, 0, 0, 7, 89, −10, −9, −4, −4, −1,
−2, 3, 61, −3, −5, −2, −34, 4, 2, −1, −22, 2, 2, −1, −5, 1, 1 },
{2, 4, 28, −8, 1, −4, −1, −1, −6, −11, −62, 4, 0, 4, 3, 1, −8, −6, −92, 10, 0, 7, 3, 2, 1, −2, 21, 2, 2, 0,
−1, 0, 4, 1, 47, −3, 0, 1, 6, −1, 1, 0, −5, 0, −3, 0, 2, 0 },
{3, −1, 1, 1, 0, 0, 0, 0, 5, −1, −2, 1, 1, 1, 0, 0, 4, −1, −3, 0, 0, 0, −1, 0, 7, 0, 0, −1, 0, 0, 0, 0, 5, 1, −1, −1, 22, 0,
−2, 0, −7, −1, −1, 0, 125, −8, −9, −2 },
{6, 5, 12, 94, 11, 2, −9, −4, 3, 3, 7, 71, 7, −1, −7, −3, −1, 0, −8, −12, −5, −2, 0, 0, −1, −3, −2, −35, −5,
−1, 3, 1, 0, 2, 1, −19, −1, 0, 0, −5, 1, 0, 0, −1, −2, 0, 1, −1 },
{−5, −7, −56, 4, −2, 4, 1, 2, 3, 4, 39, −6, 5, −3, −1, −1, −5, −3, −55, 4, 1, 3, 2, 1, −8, −11, −85, 6,
−1, 7, 3, 1, 2, 10, 14, 0, 4, 4, 25, −2, 1, 0, 10, −2, 1, 1, 1, 0 },
},
```

TABLE 29

```
{
{78, −58, 7, −1, 1, −1, 0, 0, −67, 45, 0, −2, 1, 0, 0, 0, 13, −2, −8, 3, −1, 0, 0, 0, 0, −5, 4, 0, 0, 0, 0, 0, 1, 1, −1, −1,
−1, 0, 0, 0, 0, 1, 0, 0, 0, 0, 0, 0 },
```

TABLE 29-continued

{57, 31, −60, 14, −7, 2, −3, 0, −8, −51, 51, −7, 2, 0, 1, 0, −34, 34, −6, −8, 4, −2, 1, −1, 18, −9, −10, 8, −2, 1, 0, 0, −7, 0, 7, −2, 2, 1, −3, 0, −3, 1, 2, 0, 1, 0, −1, 0 },

{20, −46, 41, −11, 3, −1, 1, 0, 52, −2, −28, 4, 0, −1, −1, 0, −75, 41, 1, 2, 0, 0, 1, 0, 30, −16, −2, 1, −1, 1, −1, 0, −7, 0, 3, 0, 1, 1, 0, −1, −3, 1, 0, 0, 0, 0, 0, 0 },

{66, 13, 0, −23, 3, −4, 0, −1, 44, −22, −27, 23, −5, 2, −2, 1, 5, −39, 36, −8, −1, 1, 0, 0, −47, 43, −10, −7, 6, −2, 1, −1, 12, −9, −6, 8, −7, 2, 4, −3, 1, −1, −1, 1, −2, 1, 1, −1 },

{4, −3, 39, −47, 16, −6, 4, −2, −8, −50, 14, 25, −3, 1, 0, 1, 36, 52, −52, 7, −7, 1, −2, 0, −37, −8, 20, −1, 1, 1, 0, 0, 15, −1, −1, −2, −3, 1, −1, 0, 2, 1, −1, 1, −1, 0, 0, 0 },

{−3, 49, 15, −46, 10, −5, 2, −2, −58, −6, −34, 52, −7, 3, −1, 1, −18, 0, 33, −18, −4, 3, 0, 0, 44, −13, −13, −3, 6, −2, 0, 0, −10, 0, 4, 4, 4, 2, −1, −3, 0, −2, 1, 2, 2, 0, 0, −1 },

{31, 18, −1, −8, −4, 0, −1, 0, 37, 1, −16, 0, 2, −1, 0, 0, 43, −20, −15, 15, −6, 2, −1, 1, 28, −40, 28, −9, 0, 1, 0, 0, −67, 46, −5, −7, 21, −12, −6, 7, −8, 1, 4, −1, 0, 0, 0, 0 },

{15, 53, 2, 12, −37, 10, −6, 1, −11, 21, −36, −12, 26, −6, 2, 0, −34, 5, −17, 25, −5, −2, 1, 0, −26, −26, 53, −17, −4, 5, −1, 1, 40, 1, −24, −1, −12, −2, 7, 4, 3, 1, −1, −2, 1, −2, 1, 1 },

{0, −14, 2, 36, −43, 19, −5, 2, 2, −15, −33, 15, 21, −6, 0, 1, 38, 40, 35, −62, 11, −8, 2, −2, −18, −32, −9, 29, −3, 2, 1, 0, 2, 10, −1, −1, −5, 1, 1, −3, 1, 1, 0, 0, −1, 0, 0, −1 },

{4, 3, 49, 7, −43, 11, −2, 0, −24, −43, −2, −36, 56, −12, 4, 0, 5, −9, 5, 31, −20, −1, 1, −1, 17, 39, −27, −6, −5, 5, −2, 0, −23, −8, 8, 2, 14, 1, −1, −1, −3, −1, −1, 1, 0, 1, 0, 0 },

{19, 15, 0, −2, −5, −1, 0, 0, 28, 11, −11, −6, 2, 0, −1, 0, 45, 1, −19, 9, −2, −2, 0, 0, 61, −10, −13, 4, −5, 2, −1, 0, 33, −48, 24, −3, −56, 32, 1, −6, 3, −3, −5, 4, −2, −1, 2, 0 },

{6, 32, −3, −3, −8, 3, −2, 0, 5, 43, −19, 2, −4, −1, −1, 0, −6, 23, −27, 1, 6, −2, 1, −1, −38, 9, −20, 22, −5, 1, 0, 0, −33, −39, 62, −19, 40, 6, −24, −1, −7, −3, 3, 4, 1, 0, 1, −1 },

{−10, −20, −44, 6, 3, 14, −2, 2, 4, 6, −14, 21, 12, −14, 1, 0, 14, 38, 16, 17, −50, 14, −2, −1, −1, 6, 10, −57, 37, −3, −2, 1, −17, −33, −4, 34, 14, 9, 4, −9, −7, 1, −1, 0, 1, −1, 1, 0 },

{5, 13, 1, 3, 36, −39, 9, −3, 0, 5, −11, −38, 11, 12, 0, −1, 6, 18, 33, 24, −56, 19, −6, 1, −20, −33, −36, 25, 22, −7, 1, 2, 17, 24, 9, −24, −11, −10, 3, 7, 4, 1, −2, −1, −1, 0, 1, 0 },

{−6, −9, −16, −51, −17, 45, −3, 2, 16, 26, 35, 24, 37, −55, 3, −2, −9, −19, −7, −7, −27, 21, 5, −1, −4, −12, −18, 23, 3, 5, −6, 2, 16, 21, 7, −13, −11, −10, −1, 1, 2, 2, 1, 1, 0, −1, −1, −1 },

{−8, −8, −2, 3, −2, 2, −1, 0, −12, −10, 2, 4, 2, 0, −1, 1, −20, −10, 4, 6, −2, 1, 2, 0, −29, −11, 12, −4, 3, 0, 0, 0, −54, 4, 16, −5, −58, 43, −6, −3, 70, −24, −12, 7, −5, 0, 5, −3 },

},

TABLE 30

{

{89, −42, −15, 3, −1, 0, −1, 0, 68, −30, −15, 4, −1, 0, −1, 0, 1, 2, −3, 0, 0, 0, 0, 0, −20, 10, 4, −1, 0, 0, 0, 0, −12, 5, 3, −1, −5, 2, 1, 0, −3, 1, 0, 0, −2, 1, 0, 0 },

{−15, −72, 61, 2, 2, 0, 1, 0, −23, −57, 50, 5, 1, 1, 1, 0, −6, 0, 0, 3, 0, 0, 0, 0, 6, 17, −16, −1, 0, 0, 0, 0, 6, 10, −10, −1, 2, 4, −3, −1, 0, 2, −2, 0, 0, 1, −1, 0 },

{66, −8, 1, −11, −2, −2, 0, −1, −70, 37, 12, −8, 1, −1, 1, 0, −65, 27, 11, −3, 2, 0, 1, 0, −7, 0, 3, 1, 0, 0, 0, 0, 8, −6, −2, 2, 6, −4, −2, 1, 2, −1, −1, 0, 1, −1, 0, 0 },

{−27, −27, −50, 64, 1, 2, −2, 2, −26, −27, −39, 55, 3, 1, −1, 1, −33, 3, 6 3, 4, −1, 1, 0, −14, 13, 17, −17, 1, 0, 1, 0, 3, 6, 8, −11, 6, 1, 2, −4, 3, 0, 1, −2, 1, 0, 1, −1 },

{41, −18, −17, 12, 1, −1, −1, 0, −52, 1, −12, 17, 4, 0, 0, 1, 68, −36, −15, 8, −1, 1, −1, 1, 60, −24, −10, 1, −2, 1, −1, 0, 8, 1, −1, −3, −8, 6, 3, −3, −5, 3, 2, −1, −1, 1, 1, 0 },

{−17, −40, 10, −11, 18, −2, 3, 0, 6, 32, −44, −6, 12, −2, 1, 0, 13, 73, −62, −2, 2, −2, 0, −1, 20, 20, −18, −4, −1, −1, 0, 0, 10, −9, 8, −1, −1, −8, 8, 1, −2, −2, 3, 1, −1, −1, 2, 0 },

{8, 16, 26, 39, −55, 6, −3, 0, 35, 19, 16, 36, −51, 4, −2, −1, −23, 17, −6, 7, −4, −1, 0, 0, 46, −15, −20, −7, 13, −2, 0, 0, 28, −13, −12, −6, −2, −2, −1, −3, −6, 1, 1, −2, −2, 0, 1, −1 },

{9, 3, 21, 23, −33, 4, −2, 0, −25, 31, 16, 18, −30, 2, −1, 0, 58, 19, −5, −9, −5, −3, 0, −1, −59, 29, 7, −15, 9, −2, 2, −1, −48, 12, 8, −7, −4, −5, 1, 0, 7, −5, −2, 1, 2, −2, −1, 0 },

{−4, −16, 40, −6, 10, −11, 1, −2, 4, 22, −20, 32, 0, −8, −2, −1, −17, −30, −31, 59, −4, 1, −2, 1, −34, −57, 14, 27, 0, 3, 0, 1, −19, −18, 17, −3, −1, 7, 3, −9, 5, 7, −3, −5, 2, 2, −1, −2 },

{−17, −56, 5, 5, −2, 9, 2, 1, 13, 34, −5, −18, −13, 7, 0, 0, 14, 11, 54, −34, −14, 3, 0, 0, 13, −42, 58, −12, −10, 3, −1, 1, 2, −19, 12, 7, −3, 3, −10, 7, −1, 6, −7, 2, 0, 1, −2, 0 },

{9, 17, 19, 34, 45, −56, −6, −1, 17, 20, 30, 27, 39, −53, −7, −1, 4, 18, 22, −4, 2, −9, −3, −1, 20, 4, 4, −15, −12, 12, 0, −1, −17, 2, −1, −9, −14, −1, −2, −2, −3, −2, −2, 0, 1, −1, −1, 0 },

{7, −2, 1, 13, 10, −12, −2, 0, 3, 9, 6, 8, 8, −12, −2, 0, 34, −3, 5, −1, 1, −3, −1, 0, −50, 0, −6, 7, 1, 3, 1, 0, 86, −29, −24, 8, 49, −15, −13, 3, 0, 1, 0, −2, −7, 2, 2, −1 },

{9, 29, −4, −24, 4, −8, 7, −3, −10, −44, 13, 16, −21, 4, 5, 0, 14, 38, −1, 34, −53, 9, −1, 0, 12, 15, 45, 0, −31, 4, −1, 0, 14, −27, 40, −10, 5, −9, 2, −1, −1, 1, −7, 0, −2, 2, −3, −1 },

{−11, −25, −27, −3, 12, −2, 5, 0, 8, 36, 2, 4, −22, −1, 3, −1, 2, 2, 35, 43, −50, 4, 1, −1, 4, 27, −25, 46, −26, −2, 1, −1, 3, 38, −36, 11, −3, 4, −4, −10, −1, −6, 6, −6, 0, −3, 2, −1 },

{−5, −3, −36, 31, −6, 8, −4, 2, −5, −21, 34, −12, 9, −2, −1, 0, 8, 36, 0, −3, 9, −10, 0, −1, −9, −30, −29, 53, −2, −4, 0, 0, −29, −55, 3, 38, −15, −8, 12, 0, −2, 8, 4, −8, 2, 3, −1, −3 },

{−2, 1, 0, −1, 0, 2, 0, 0, −6, 2, 4, −2, 0, 1, 1, −1, 3, 2, 1, 0, 2, −2, 1, 0, −31, 2, 4, −1, 1, 1, 0, 0, 48, 5, 6, −9, −94, 26, 21, −9, −51, 11, 12, −3, 2, −1, 0, 1 },

}

},

TABLE 31

```
const int8_t g_lfnst8x8[ 36 ][ 3 ][ 16 ][ 48 ] = {
  {  //34
    {
      {111, −12, −26, −3, −4, −1, −2, 0, −41, 32, 12, −5, −1, −1, 0, 0, −11, −12, 10, 5, 0, 0, 0, 0, −1, −1,
−4, 2, 1, 0, 0, 0, −3, −1, 1, −1, 0, 0, 0, 0, −1, 0, 0, 0, 0, 0, 0, 0 },
      {5, −83, 10, 17, 3, 4, 1, 1, 47, 38, −50, −14, 0, −1, −1, 0, −14, 33, 29, −13, −6, −3, −1, −1, −3,
−11, 6, 12, 0, 0, 0, 0, −4, 4, −2, −2, −1, −2, 2, 1, −1, 2, 0, −1, 0, −1, 0, 0 },
      {−2, 59, −14, −10, −3, −2, −1, −1, 62, 41, 15, −19, −9, −5, −2, −2, −45, −19, 43, 24, 0, −1, 0, 0, 1, −25,
−20, 13, 10, 3, 1, 1, −5, 0, −3, −7, 1, −4, −1, 1, −2, 0, 0, 0, 0, −1, 0, 0 },
      {49, 27, 31, −24, −7, −3, −1, −1, 47, −50, −26, 41, 0, 1, −1, 1, −40, 31, −27, −21, 14, 2, 1, 0, 0, −4, 19, −9,
−10, 1, 1, 0, −5, 2, −3, 6, −1, 0, 3, −2, −2, 0, −2, 1, 0, 0, 1, 0 },
      {−2, 53, −1, −4, −11, −1, −1, −1, −33, 13, −39, −12, 18, 0, 3, 0, 27, 29, 43, −51, −19, 0, −1−1, 1
−18, 38, 37, −17, −5, −2, 0, −1, −7, −14, 12, 0, −3, 2, 0, 0, −1, −2, 1, 0, −1, 1, 0 },
      {12, 1, −68, −4, 16, 1, 1, 1, 39, −24, 34, −26, −21, 4, 0, 1, 39, 54, −9, 11, −11, −12, −3, −1, −27, 7, 29, 4, 9,
−1, −2, −1, −1, −12, −3, 10, −6, 1, −1, −3, 1, −2, 0, 2, −2, 0, 0, 0 },
      {22, 6, 60, 10, −13, −7, −2, −2, 3, −24, 4, −1, 7, 4, 0, 1, 44, 17, 18, 37, −20, −6, −3, −1, −38, −13,
−33, 30, 41, 1, 2, 0, −2, −5, −17, −36, −2, 1, 3, 1, 1, 0, −2, −3, −1, 1, 1, 0 },
      {0, 8, 38, −12, −6, 1, −2, −1, 15, 73, 21, 27, −13, −13, −4, −3, 41, −1, −31, −3, 34, 5, −1, 0, −38, −9, 29, −17,
−13, 11, 4, 2, 0, −20, −8, 19, −3, −1, −6, −7, 1, −2, −1, 1, −1, 0, −1, −1 },
      {−21, −16, −9, −34, 21, 6, 1, 1, −44, −1, 18, 36, −34, −2, 3, 0, −28, 44, 18, 10, 29, −16, −4, −2, 5, −58,
−5, 4, 14, 17, 0, 0, 5, 5, −27, −14, 5, −1, 7, −8, 2, 2, −2, 2, 1, 0, 1, −1 },
      {−4, 33, −30, 43, −1, −5, −2, 0, −15, 22, −56, 6, 14, 3, 1, 0, −7, 29, −26, 12, 18, −11, 3, −3, −19, −5, −8,
−47, 37, 5, 4, 1, 11, −10, 25, −35, 1, −4, 7, 5, 2, −1, 3, −4, 0, −1, 1, 2 },
      {−2, 10, 37, −37, 3, −3, 0, 0, −18, 18, −17, −23, −40, 12, 5, 2, −9, 25, 0, 39, −17, −32, −3, −1, 38, 44, 25,
−5, 26, −10, −11, −4, −8, −12, 29, 19, −3, −15, −14, 7, −1, −2, −4, −5, 0, −1, −1, 0 },
      {2, 7, 34, 73, 27, −23, −6, −3, −10, 5, 42, −30, 0, 27, 0, 0, −40, 20, −26, −9, −15, −3, 12, 2, 9, −24, 23, 4, 0,
−8, −5, 1, 1, −10, −16, 16, 1, 2, −6, −8, 1, 1, 0, −1, 0, −1, 0, −1 },
      {4, 6, −1, 29, 0, −2, −2, 1, 12, 15, 36, 47, 15, −13, −8, −3, 25, 43, 18, −17, 5, 11, −2 −3, 62, 19,
−31, 1, 3, 3, 4, 1, −41, −3, 25, −7, 0, −16, −7, 8, −7, 0, −3, −3, −1, −2, −1, −2 },
      {15, 12, 20, 13, 33, −6, −9, −2, 4, −19, −12, −35, −27, 7, 10, 2, 35, 0, 26, −2, 32, −8, −10, 0, 5, −26, −23,
−38, −34, 31, 3, 1, 5, 44, 25, 25, −9, −11, 2, 14, 1, 3, −5, −1, −2, −1, 0, 0 },
      {6, 3, −7, 29, 21, −2, −8, −2, 8, −15, −26, 6, −22, 0, 13, 0, 15, −40, 12, 2, 37, −27,
−12, 2, 24, 20, 21, 9, 17, 29, −9, −3, −42, −30, −45, −9, 14, 16, −1, −30, −4, 2, 9, 10, 1, 2, −1, −2 },
      {−5, −7, 8, 16, −46, 4, 5, 0, −13, −23, 17, −21, 27, −31, −8, 2, −25, 22, 44, 27, 41, 19, −19, −7,
−11, 24, 22, −21, −10, 24, 13, −3, 15, −28, −5, 15, −8, −7, −21, −5, 6, −1, 0, −4, 0, 0, −2, 2},
},
```

TABLE 32

```
{
    {109, −39, −11, −2, −2, −1, −1, 0, −15, 33, −10, −1, −1, 0, −1, 0, −32, 13, 10, −3, 1, −1, 1, 0, −3,
−6, 6, 1, 0, 0, 0, 0, −3, −1, 1, 2, −1, −1, 0, 1, −2, 0, 0, 0, 0, −1, 0, 0 },
    {1, 17, −3, −1, −1, 0, 0, 0, −96, 24, 27, −1, 4, 0, 2, 0, 17, −57, 13, 8, 1, 2, 0, 0, 28, −9, −24, 5, −1, 1,
−1, 0, 3, 10, −7, −5, 4, 1, 1, −2, 1, 0, 0, 0, 1, 0, 0, 0 },
    {−33, 25, −3, 0, 0, 0, 0, 0, 6, 51, −11, −10, −2, −3, 0, −1, −52, 16, 52, −13, 2, −3, 1, −1, 14, −60, 25, 20,
−4, 3, −1, 1, 11, −11, −23, 14, 2, 2, −8, −3, 2, 0, −1, −2, 1, −1, 0, 0 },
    {35, 90, −51, −7, −8, −2, −2, −1, 29, 5, 25, −20, 1, −4, 1, −1, 11, −19, 13, 6, −4, 1, −1, 1, −28, 16, 4, 3, 1,
−1, 0, 0, −4, −15, 13, 3, −2, −5, −3, 6, −1, −3, −1, 1, −1, 0, −1, 0 },
    {4, −20, −2, 8, 1, 1, 0, 0, 56, −1, 1, −8, 0, −2, −1, 0, −17, −50, 30, 26, −3, 3, 0, 1, 4, −11, −63, 24, 9, 3, 0, 0,
−14, 39, −22, −29, 0, 3, 15, −13, −1, 2, 5, 0, −1, 0, 1, 1 },
    {−12, −18, −4, 4, −1, 2, 0, 1, 15, 70, −43, −17, 0, −4, 0, −1, 70, −7, 25, −24, −5, −2, −1, −1, 1, 23, 7, 5, −10,
−1, −1, 0, −24, 12, 22, 2, −1, −17, 9, 10, −2, −2, −3, 4, −1, −2, −1, 1 },
    {28, 5, 15, −8, −2, −2, 0, 0, 6, −34, 5, 14, −2, 1, 1, 0, 63, 2, 13, −14, −4, −2, −2, −1, 2, −32, 25, 39, −11, 4,
−2, 1, −16, 9, −60, 29, −14, 20, −10, −25, 0, −2, 6, −7, −1, 3, 1, −2 },
    {8, 32, −40, 3, 2, 0, −1, 0, 2, −14, −37, 13, 6, 2, 0, 0, −10, 13, −24, −34, 14, −1, 3, 0, 66, −4, −1, −25, −14, 2,
−2, 0, −3, 48, −5, −8, −14, 6, 36, −12, −2, −11, 12, 10, −2, −2, 0, 4 },
    {−15, −35, −68, 47, 3, 7, −1, 1, −21, −39, −18, −13, 26, −1, 4, 0, −8, −13, 33, −36, −3, 7, −1, 0,
−31, 14, 3, 12, −17, 2, 1, 0, 15, −13, −6, 3, 6, 6, −6, −6, 2, 5, 2, −3, 1, 2, 1, 0 },
    {0, 28, 4, 5, −4, −2, −1, 0, −33, 2, −43, 22, 4, 4, 1, 1, 10, 40, −2, 7, −2, −7, −2, −1, −55, −15,
−19, 17, 34, 0, 4, 1, −7, 0, −18, −55, 14, −9, 32, −17, 7, −5, 3, 5, 0, 1, 3, 2 },
    {−2, −10, −25, 26, −8, 3, −1, 0, 6, 26, 25, −29, −1, −2, −1, −1, 32, 46, −13, 19, −16, −1, −2, −1, 29, −3,
−29, 4, 21, −6, 3, 0, 47, −24, −9, −18, −28, 42, −6, −9, −13, 2, 22, −9, 0, −7, 6, 5 },
    {−4, −4, −27, 1, 8, 5, 0, 0, 11, 25, −46, 29, −8, 0, 0, 0, 5, −52, −44, 23, 25, −2, 4, 0, −19, −27, 11,
−33, 15, 4, 1, 1, 4, −22, −13, 9, −4, 26, −30, −16, 1, 9, 15, −21, 3, 0, 7, −1 },
    {21, 24, 43, −8, −10, −4, −3, 0, 4, −28, −58, −1, 14, 8, 2, 1, 6, −23, 25, −17, −14, 3, 1, 1, 17, 0, −15, 6, 3,
−6, 0, 0, 57, −16, 20, −12, −5, 16, −17, 32, −17, 20, −11, −9, −1, −3, 8, −3 },
    {−3, 3, 21, −35, 8, −1, 3, −1, 1, 25, 4, −7, −10, −1, 1, −1, −14, −13, −2, −24, 3, 6, 2, 1, −37, 48, −1, −9,
−28, 1, 1, 1, 56, 13, −35, 13, 3, 20, 28, −33, −1, −10, 30, 15, 0, −5, −2, 13 },
    {−1, 19, 11, 35, −17, −4, −2, 0, 1, 17, −10, 51, 3, −5, −3, 0, −22, 8, 2, 3, 4, 4, 1, 0, 29, 66, −16, 34, 4, −8, −1,
−4, −16, −22, −19, 18, −3, −20, −26, −29, −7, 3, 3, −22, 2, −4, 4, −5 },
    {11, 4, 21, 56, −5, −8, −5, 0, 16, 7, 34, 45, 9, −18, −6, −4, 21, −1, 29, −12, 53, −1, −7, −1, −8, −13, 3,
−40, 3, 29, −2, 1, 28, 2, 1, −8, 4, −6, 13, 12, −5, −5, −6, 16, −5, −1, −7, 2 },
  },
```

TABLE 33

```
{
        {-93, 70, -9, 0, 0, 0, 0, 0, -23, 7, 15, -9, 3, -1, 1, 0, 25, -27, 11, -1, -2, 1, 0, 0, 13, -9, -3, 4, -2, 0, 0, 0, 6,
-2, -2, 1, 2, -1, -1, 0, 2, -1, 0, 0, 1, 0, 0, 0 },
        {1, 25, -56, 32, -10, 5, -3, 1, 82, -43, -19, 5, 3, -2, 0, 0, 25, -13, 4, -11, 6, -2, 0, 0, -25, 23, -1,
-5, 1, 0, 0, 0, -13, 8, 6, -4, -4, 0, 4, -1, -1, -1, 2, 0, -1, 0, 1, 0 },
        {-50, -35, 61, -16, 7, -2, 3, -1, 33, -62, 31, 4, -6, 3, -1, 1, 3, 12, -32, 23, -9, 2, -1, 0, -9, 19, -18, 2, 5,
-3, 1, 0, 1, 4, -3, -4, 0, 3, -1, -1, 1, 2, -1, 0, 0, 1, -1, 0 },
        {51, 12, 4, -20, 0, -2, 0, 0, -12, -24, 62, -28, 4, 0, 1, 0, 30, -58, 31, 11, -14, 7, -3, 2, -5, 10, -26, 26,
-9, 1, 0, 0, -12, 14, -14, 5, -4, 4, -4, 0, -1, 0, -1, 0, -1, 1, -1, 0 },
        {3, 39, -15, -16, 1, 0, 0, -1, 14, -6, 42, -47, 12, -3, 2, -1, -65, 53, 9, -6, -11, 6, -1, 1, -32, 15, 6, 11,
-9, 1, 2, -1, 16, -25, 11, 6, 6, -8, -3, 7, 2, -2, -2, 2, 1, -1, -1, 1 },
        {10, 9, -25, 56, -31, 8, -5, 1, -60, -40, 31, 40, -8, -1, 1, 0, -24, 1, -23, 17, 15, -10, 3, -1, -8, 19, -18,
-14, 21, -6, 1, 0, 12, -7, 3, -14, 5, 1, 0, -5, 3, -1, 1, -3, 2, 1, 0, -1 },
        {-31, -49, 10, 43, -23, 11, -3, 1, 5, -8, 16, -4, -1, -4, 1, -1, -31, -12, 71, -41, 15, -5, 1, 0, -3,
-15, 15, 11, -12, 6, -3, 1, -2, 11, -21, 17, 3, 4, -10, 1, 2, 2, -3, -2, 2, 1, -2, -1 },
        {-17, -14, 6, -9, 11, -1, 2, 0, -32, 27, -18, -7, 10, -1, 1, 0, 8, -1, 5, -25, 11, 0, 0, 0, -63, 70, -24, -5,
-3, 3, 0, -1, -30, 27, 4, -9, 18, -25, 18, -3, 10, -10, 2, 4, 2, -2, -1, 2 },
        {7, -3, -9, -11, 28, -8, 1, -1, -38, -61, -9, -16, 47, -7, 2, 0, 27, 15, -18, -55, 20, 6, -4, 2, 14, -1, 31, -15,
-24, 16, -6, 1, 8, -4, -1, 15, -3, 9, -2, 4, -1, 2, -1, 2, 0, 1, 1, 0 },
        {-16, -44, -38, 27, 16, 1, -1, 1, 7, 22, 3, -43, 38, -16, 2, -2, 2, -1, -21, 13, 8, 7, -6, 3, 33, 7, -62, 22,
-6, 8, -3, 0, 29, -12, -2, -8, 2, 2, 5, -7, -6, 4, 8, -5, -2, 2, 2, -1 },
        {-13, -14, -25, 0, 63, -34, 7, -2, -4, -9, 0, 20, 28, -12, -6, 1, -46, -39, 12, 42, -10, 19 -9, 2, -19,
-17, 21, -19, 3, 7, -1, -1, -22, 11, 14, -11, -4, 7, -7, -1, 6, -1, -3, 1, 4, 0, -3, 0 },
        {4, 2, 13, -13, 1, 3, 0, 1, 24, 25, 40, -20, 3, -5, 1, -3, -9, -26, -11, -24, 57, -15, 5, -1, 12, 0, -5,
-75, 36, 4, -6, 3, 1, 3, 13, -14, -6, 5, -6, 12, -3, 0, 0, 6, -1, -1, -1, 3 },
        {11, 40, 20, -10, 11, -10, -1, -2, 13, -4, -16, 28, 24, -13, -1, 0, -41, 4, -13, -9, 42, -14, 0, -2, 12, -9,
-36, 29, 4, 4, -2, 0, -15, 35, -57, 20, -1, 3, 2, -19, 1, -2, 6, -9, 2, -2, 3, -3 },
        {9, 5, 24, -3, 13, -19, 5, -1, 11, 0, -12, 32, 11, -20, 0, 2, 11, -29, 16, -1, 24, -14, -2, 3, -28, 2,
-7, 16, 3, 3, -4, 3, 53, -63, 5, 10, 39, -32, -10, 11, -7, 14, -16, 1, -6, 8, -2, -3 },
        {-5, -5, -15, -26, -10, 30, -5, 3, 3, -4, -12, 11, -31, 27, -5, 0, -45, -53, -34, -18, -3, 23, 4, 1, 16, 20, -8,
-10, -55, 7, 4, 0, 14, -3, 11, 31, 11, -6, -1, 2, -3, 5, 2, 3, 1, 1, 1, -2 },
        {-4, -10, -25, -31, 26, 31, -6, 2, -13, -31, -28, -21, -10, 54, -6, 0, -9, -3, 24, -2, -2, -10, 17, -6, -11,
-23, -21, -9, 49, -27, 12, 6, 17, -6, -33, -14, 15, -9, 10, 3, -3, 6, 1, 1, -3, 5, 2, 3 },
    }
  },
```

The following figures are made to explain a specific example of the present disclosure. Since the names of specific apparatus or names of specific signals/messages/fields described in the figures are provided as examples, the technical features of the present disclosure are not limited to the specific names used in the figures below.

Figure 13:
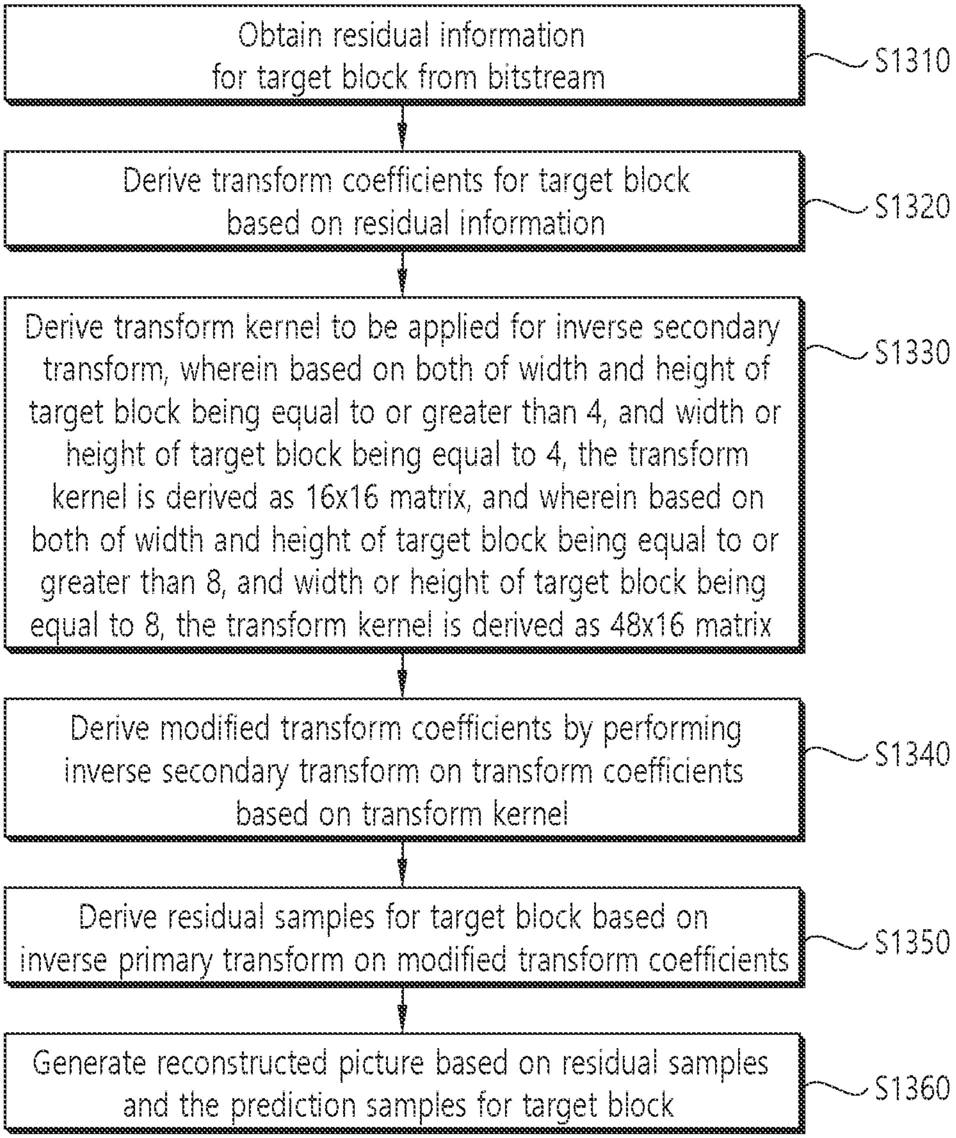
FIG. 13 is a flowchart illustrating the operation of a video decoding apparatus according to an embodiment of the present document.

FIG. 13 is a flowchart illustrating the operation of a video decoding apparatus according to an embodiment of the present document.

Each step disclosed in FIG. 13 is based on a portion of the contents described above in FIGS. 5 to 12. Accordingly, the description of specific content that overlaps with the content described above in FIG. 3, FIGS. 5 to 12 will be omitted or simplified.

The decoding apparatus 300 according to one embodiment may receive residual information for the target block from the bitstream (S1310). The target block may be a coding block or a transform block that is subject to coding or transform.

The decoding apparatus can obtain information on quantized transform coefficients from residual information and receive various information for image decoding. More specifically, the decoding apparatus 300 may decode the information on the quantized transform coefficients for the target block from the bitstream, derive quantized transform coefficients for the target block based on information on the quantized transform coefficients for the target block.

In addition, information on LFNST applied to the target block may also be received, and information on LFNST may be included in a Sequence Parameter Set (SPS) or slice header. This information may include at least one of information on whether LFNST is applied, information on the minimum transform size to which LFNST is applied, information on the maximum transform size to which LFNST is applied, and information on a transform index indicating one of the transform kernels included in the transform set.

The decoding apparatus 300 according to one embodiment may derive transform coefficients for the target block based on residual information (S1320). The decoding apparatus may derive transform coefficients by performing inverse quantization on the quantized transform coefficients for the target block.

The derived transform coefficients may be arranged in a reverse diagonal scan order in units of 4×4 subblocks, and transform coefficients in the 4×4 subblocks may also be arranged according to a reverse diagonal scan order. That is, the transform coefficients subjected to inverse quantization may be arranged according to an inverse scan order applied in a video codec such as VVC or HEVC.

The decoding apparatus 300 according to an embodiment may derive a transform kernel to be applied for the inverse secondary transform (S1330), based on the derived transform kernel, inverse secondary transform can be performed on the transform coefficients to derive modified transform coefficients (S1340).

In this case, based on both of the horizontal and vertical lengths of the target block being greater than or equal to 4, and the horizontal or vertical length being equal to 4, the transform kernel is derived as a 16×16 matrix, and based on both of the horizontal and vertical lengths of the target block being greater than or equal to 8, and the horizontal or vertical length being equal to 8, the transform kernel can be derived as a 48×16 matrix.

In addition, according to one example, based on both of the horizontal and vertical lengths of the target block being equal to or greater than 8, and the horizontal or vertical length being equal to 8, the transform kernel is derived as a 64×32 matrix, and based on both of the horizontal and vertical lengths of the target block being equal to 8, a 64×16 matrix sampled from a 64×32 matrix can be applied for the inverse secondary transform of the target block.

According to this document, the inverse secondary transform may include LFNST, that is, a non-separable secondary transform reflecting RST, the inverse secondary transform may be performed based on the LFNST kernel, and the LFNST kernel may be a non-square matrix of which the number of the columns is less than the number of the rows.

According to the preset document, unlike the existing VVC standard, LFNST can be applied to the upper left 16×16 region of a transform block larger than or equal to 16×16. In this document, a P×Q block being greater than or equal to an M×N block means that P and Q are greater than or equal to M and N, respectively. As an example, LFNST can be applied to the region for 96 samples consisting of 6 4×4 sub-blocks in the top left 16×16. In other words, modified transform coefficients of which number being greater than a portion of transform coefficients included in the top left 16×16 region of target block, that is, transform coefficient based on the input array may be derived. According to one example, the decoding apparatus may derive L ($48<L\leq96$) modified transform coefficients based on R transform coefficients of the upper left region of the target block, and the derived L ($48<L\leq96$) modified transform coefficients may be arranged in a predetermined output region. R is smaller than L. Meanwhile, in this document, an M×N block being larger than a K×L block may represent that M and N are larger than or equal to K and L, respectively, and M is larger than K or N is larger than L.

R, the number of input transform coefficients configuring the input array, and L, the number of output transform coefficients arranged in the output region, may change depending on the dimension of the transform kernel. According to one example, R can be 16, 32, 48, 80, etc., and L can be 64 or 96.

According to one example, the input array may be arranged in units of 4×4 sub-blocks, which can be arranged in a forward diagonal scanning order from the DC position of the target block, and may be arranged according to a forward diagonal scanning order within the 4×4 sub-block. Accordingly, R, the number of transform coefficients configuring the input array, may be set to a multiple of 16, which is the number of transform coefficients in a 4×4 sub-block.

Since the output region refers to the region of the input transform coefficients input to perform secondary transform in the encoding apparatus, it may refer to the region in which the output transform coefficients are arranged when performing inverse secondary transform in the decoding apparatus. The output region may correspond to the ROT described with reference to the above-described figures.

Meanwhile, the step of deriving the modified transform coefficient may include deriving a transform kernel for transform, and the transform kernel may be derived based on a transform set derived based on the intra prediction mode applied to the target block.

A 16×16 matrix may be configured based on Tables 9 to 18, and a 48×16 dimensional matrix may be configured based on Tables 19 to 33.

Meanwhile, the size of the inverse second transform may be set based on the size of the target block, and based on the size of the inverse secondary transform, at least one of the number of transform sets, the number of transform kernels configuring the transform set, and the dimension of the transform kernel may be derived.

Based on both of the horizontal and vertical lengths of the target block being equal to or greater than 4, and the horizontal or vertical length being 4, the size of the inverse secondary transform may be set to a first value. For example, the first value may be set to 2. The size of the inverse secondary transform being equal to 2, which means that LFNST is applied to the upper left 4×4 region of the target block, may correspond to the LFNST_4×4 described above.

Alternatively, based on both of the horizontal and vertical lengths of the target block being equal to or greater than 8, and the horizontal or vertical length being 8, the size of the inverse secondary transform may be set to a second value. For example, the second value may be set to 3. The size of the inverse secondary transform being equal to 3, which means that LFNST is applied to the upper left 8×8 region of the target block, may correspond to the LFNST_8×8 described above.

Alternatively, based on both of the horizontal and vertical lengths of the target block being equal to or greater than 16, the size of the inverse secondary transform may be set to a third value. For example, the third value may be set to 4. The size of the inverse secondary transform being equal to 4, which means that LFNST is applied to the upper left 16×16 region of the target block, may correspond to the LFNST_16×16 described above.

Based on the size of the inverse secondary transform, that is, grouping according to the size to which LFNST is applied, at least one of the number of transform sets applied to the target block, the number of transform kernels configuring the transform set, and the dimension of the transform kernel may be derived. In other words, the number of transform sets, the number of transform kernels configuring the transform set, and the dimensions of the transform kernel, etc. can be set and configured in various ways according to the size of the inverse secondary transform or the size of the target block.

For example, based on the size of the inverse secondary transform being equal to 2, the dimension of the transform kernel can be set to 16×16. Additionally, based on the size of the inverse secondary transform being equal to 3, the dimension of the transform kernel can be set to 48×R or 64×S, where R may be set to one of 16, 32, or 48, and S may be set to one of 16, 32, 48, or 64. Additionally, based on the size of the inverse secondary transform being equal to 4, the dimension of the transform kernel may be set to one of 96×R, 64×S, or 48×T, where R may be set to one of 16, 32, 48, 64, 80, or 96, and S may be set to one of 16, 32, 48, or 64, and T may be set to one of 16, 32, or 48.

Or, according to one example, based on the size of the inverse secondary transform being equal to 1, that is, if both the horizontal and vertical lengths of the target block are equal to or greater than 4, and the horizontal or vertical length is equal to 4, the dimension of the transform kernel to which LFNST4×4 is applied may be 16×16.

Alternatively, according to one example, based on both of the horizontal and vertical lengths of the target block being equal to or greater than 8, and the horizontal or vertical length being equal to 8, that is, LFNST_8×8 being applied, the transform kernel can be set to a 48×16 matrix.

The decoding apparatus 300 according to an embodiment may derive residual samples for the target block based on the inverse primary transform on the modified transform coefficients (S1350).

The decoding apparatus 300 may perform an inverse primary transform on the modified transform coefficients for the target block, and in this case, for the inverse primary transform, a reduced inverse transform may be applied or a normal separable transform may be used.

According to one embodiment, LFNST may also be applied to a target block to which DST-7, DCT-8, or Karhunen Loeve Transform (KLT), etc. is as inverse primary transform.

Alternatively, according to one example, LFNST may also be applied to a target block to which a transform skip is applied for horizontal transform or vertical transform.

Based on the transform kernel (DCT-2, DST-7, DCT-8, etc.) applied to the inverse primary transform or a combination of transform kernels, various combination designs about the number of transform sets, the number of transform kernels configuring the transform set, and the dimension of the transform kernel, etc. are possible.

The decoding apparatus 300 according to an embodiment may generate a reconstructed picture based on residual samples for the target block and prediction samples for the target block (S1360).

According to an example in the present document, LFNST can be applied to a target block in which prediction samples are derived based on not only intra prediction but also inter prediction. Transform sets, transform kernels, etc. can be designed in various ways based on motion information, features of motion vectors, etc.

The following figures are made to explain a specific example of the present specification. Since the names of specific devices or specific signals/messages/fields described in the figures are provided as examples, the technical features of this specification are not limited to the specific names used in the figures below.

Figure 14:
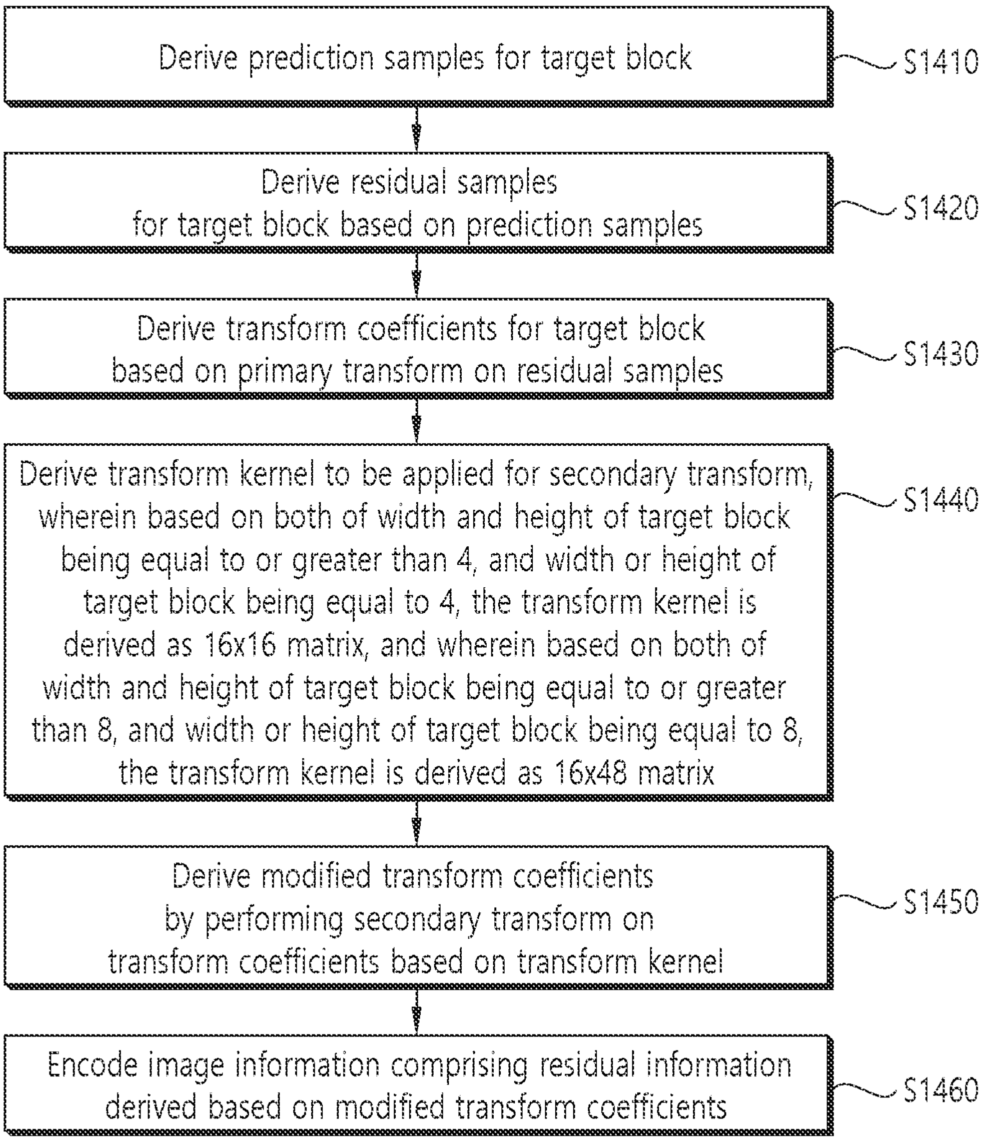
FIG. 14 is a flowchart illustrating the operation of a video encoding apparatus according to an embodiment of the present document.

FIG. 14 is a flowchart illustrating the operation of a video encoding apparatus according to an embodiment of this document.

Each step disclosed in FIG. 14 is based on a portion of the contents described above in FIGS. 5 to 12. Accordingly, the description of specific content that overlaps with the content described above in FIG. 2 and FIGS. 5 to 12 will be omitted or simplified.

The encoding apparatus 200 according to one embodiment may derive prediction samples based on the prediction mode applied to the target block (S1410).

According to an example in the preset document, LFNST can be applied to a target block in which prediction samples are derived based on not only intra prediction but also inter prediction. Transform sets, transform kernels, etc., which will be described later, can be designed in various ways based on motion information, features of motion vectors, etc.

The encoding apparatus 200 according to an embodiment may derive residual samples for the target block based on the prediction samples (S1420).

The encoding apparatus 200 according to an embodiment may derive transform coefficients for the target block based on a primary transform on the residual samples (S1430).

Primary transform may be performed through a plurality of transform kernels, and in this case, a transform kernel may be selected based on the intra prediction mode.

As for the primary transform, a reduced inverse transformation may be applied, or a normal separable transform may be used.

DCT-2, DST-7, DCT-8, or KLT (Karhunen Loeve Transform) may be applied as the primary transform, and according to an embodiment of this document, LFNST can also be applied to target blocks to which DST-7, DCT-8 or KLT etc., other than DCT-2, is applied as the primary transform.

Alternatively, according to one example, LFNST may also be applied to a target block to which a transform skip has been applied to horizontal transform or vertical transform.

Based on transform kernel (DCT-2, DST-7, DCT-8, etc.) applied to the primary transform or combinations of the transform kernels, various combination designs for the number of transform sets applied to LFNST, the number of transform kernels configuring the transform set, and the dimension of transform kernel, etc. are possible.

The encoding apparatus 200 according to one embodiment derives a transform kernel to be applied to the secondary transform (S1440), and by performing the secondary transform on the transform coefficients based on the derived transform kernel, the modified transform coefficients for the target block may be derived (S1450).

In this case, based on both of the horizontal and vertical lengths of the target block being greater than or equal to 4, and the horizontal or vertical length being equal to 4, the transform kernel can be derived as a 16×16 matrix, and based on both of the horizontal and vertical lengths of the target block being greater than or equal to 8, and the horizontal or vertical length being equal to 8, the transform kernel can be derived as a 16×48 matrix.

Or, according to one example, based on both of the horizontal and vertical lengths of the target block being greater than or equal to 8, and the horizontal or vertical length being equal to 8, the transform kernel may be derived as a 32×64 matrix, and based on both of the horizontal and vertical lengths of the target block being equal to 8, a 16×64 matrix sampled from a 32×64 matrix can be applied to the secondary transform of the target block.

According to this document, the secondary transform may include LFNST, that is, a non-separable secondary transform reflecting RST, and the secondary transform may be performed based on the LFNST kernel, and the LFNST kernel may be a non-square matrix of which the number of rows is less than the number of columns.

According to this disclosure, unlike the existing VVC standard, LFNST can be applied to the top left 16×16 region of a transform block equal to or larger than 16×16. In this document, a P×Q block is greater than or equal to an M×N block means that each of P and Q are greater than or equal to each of M and N, respectively. For example, LFNST may be applied to a region of 96 samples composed of 6 4×4 sub-blocks in the top left 16×16. That is, fewer modified transform coefficients than the transform coefficients may be derived based on some transform coefficients belonging to the top left 16×16 region of the target block. According to an example, the encoding apparatus is based on L ($48<L\leq96$) transform coefficients of the top left region of the target block based on the size of the target block being M×N ($M\geq16$, $N\geq16$). The derived R modified transform coefficients may be derived as an output array according to a predetermined scanning order. R is smaller than L.

An input region, which means a region of input transform coefficients subject to secondary transform in the encoding apparatus, may correspond to an ROI described with reference to the output region described in the decoding method and the figures described above. Therefore, redundant description of the ROI is omitted.

The number L of input transform coefficients arranged in the input region and the number R of modified transform coefficients derived through the matrix operation may be changed according to the dimension of the transform kernel. According to one example, R can be 16, 32, 48, 80, etc., and L can be 64 or 96.

As described above, deriving the modified transform coefficients may include deriving a transform kernel for transform, and the transform kernel may be derived based on a transform set derived based on the intra prediction mode applied to the target block.

A 16×16 matrix may be configured based on Tables 9 to 18, and a 16×48 dimensional matrix may be configured based on Tables 19 to 33.

Meanwhile, the size of the secondary transform can be set based on the size of the target block, and based on the size of the secondary transform, at least one of the number of transform sets, the number of transform kernels configuring the transform set, and the dimension of the transform kernel may be derived.

Based on both of the horizontal and vertical lengths of the current block being greater than or equal to 4, and the horizontal or vertical length is 4, the size of the secondary transform may be set to a first value. For example, the first value may be set to 2. The size of the secondary transform being equal to 2, which means that LFNST is applied to the upper left 4×4 region of the target block, may correspond to the LFNST_4×4 described above.

Alternatively, based on both of the horizontal and vertical lengths of the target block being greater than or equal to 8, and the horizontal or vertical length is 8, the size of the secondary transform may be set to a second value. For example, the second value may be set to 3. The size of the secondary transform being equal to 3, which means that LFNST is applied to the upper left 8×8 region of the target block, may correspond to the LFNST_8×8 described above.

Alternatively, based on both of the horizontal and vertical lengths of the target block being greater than or equal to 16, the size of the secondary transform may be set to a third value. For example, the third value may be set to 4. The size of the secondary transform being equal to 4, which means that LFNST is applied to the upper left 16×16 region of the target block, may correspond to the LFNST_16×16 described above.

Based on the size of the secondary transform, that is, grouping according to the size to which LFNST is applied, at least one of the number of transform sets applied to the target block, the number of transform kernels configuring the transform set, and the dimension of the transform kernel can be derived. In other words, the number of transform sets, the number of transform kernels configuring the transform set, and the dimensions of the transform kernel, etc. can be set and configured in various ways according to the size of the secondary transform or the size of the target block.

For example, based on the size of the secondary transform being 2, the dimension of the transform kernel can be set to 16×16. Additionally, based on the size of the secondary transform being 3, the dimension of the transform kernel can be set to R×48 or S×64, where R may be set as one of 16, 32, or 48, and S may be set as one of 16, 32, 48, or 64. Additionally, based on the size of the secondary transform being 4, the dimension of the transform kernel can be set to one of Rx %, S×64, or T×48, where R may be set as one of 16, 32, 48, 64, 80, and 96, S may be set as one of 16, 32, 48, or 64, and T may be set as one of 16, 32, or 48.

Or, according to one example, based on the size of the secondary transform being 1, that is, if both the horizontal and vertical lengths of the target block are greater than or equal to 4, and the horizontal or vertical length is 4, the dimension of the transform kernel applied to LFNST4×4 may be 16×16.

Or, according to one example, based on both of the horizontal and vertical lengths of the target block being greater than or equal to 8, and the horizontal or vertical length being equal to 8, that is, LFNST_8×8 being applied, the transform kernel may be set to a 16×48 matrix.

The encoding apparatus 200 according to an embodiment may encode image information including residual information for the target block (S1460).

The encoding apparatus may perform quantization based on the modified transform coefficients to derive quantized transform coefficients, and generate and encode residual information related to the quantized transform coefficients. The residual information may include the above-described transform related information/syntax elements. The encoding apparatus may encode image/video information including residual information and output it in a bitstream format.

Additionally, the encoding apparatus can also encode information on the LFNST applied to the target block, the information on the LFNST may be included in a Sequence Parameter Set (SPS) or a slice header (SH). This information includes at least one of information on whether LFNST is applied, information on the minimum transform size to which LFNST is applied, information on the maximum transform size to which LFNST is applied, and a transform index indicating one of the transform kernels included in the transform set.

In this document, at least one of quantization/dequantization and/or transform/inverse transform may be omitted. If the quantization/dequantization is omitted, the quantized transform coefficient may be referred to as a transform coefficient. If the transform/inverse transform is omitted, the transform coefficients may be referred to as coefficients or residual samples, or may still be referred to as transform coefficients for unity of expression.

Further, in the present document, the quantized transform coefficient and the transform coefficient may be referred to as a transform coefficient and a scaled transform coefficient, respectively. In this case, the residual information may include information about the transform coefficient(s), and the information about the transform coefficient(s) may be signaled through a residual coding syntax. The transform coefficients may be derived based on the residual information (or the information about the transform coefficient(s)), and the scaled transform coefficients may be derived through the inverse transform (scaling) for the transform coefficients. The residual samples may be derived based on the inverse transform (transform) for the scaled transform coefficients. This may be likewise applied to/expressed in other parts of the present disclosure.

In the above-described embodiment, the methods are described based on the flowchart having a series of steps or blocks, but this embodiment is not limited to the order of the above steps or blocks and some steps may occur simultaneously or in a different order from other steps as described above. Further, those skilled in the art will understand that the steps shown in the above flowchart are not exclusive, that further steps may be included, or that one or more steps in the flowchart may be deleted without affecting the scope of the embodiments of the present disclosure.

The method according to the embodiments of the present disclosure described above may be implemented in software. The encoding apparatus and/or decoding apparatus according to the present disclosure may be included in a device that performs image processing, for example, a TV, a computer, a smartphone, a set-top box, or a display device.

When the embodiments of the present disclosure are implemented in software, the above-described method may be implemented by modules (processes, functions, and so on) that perform the functions described above. Such modules may be stored in memory and executed by a processor. The memory may be internal or external to the processor, and the memory may be coupled to the processor using various well-known means. The processor may include an application-specific integrated circuit (ASIC), other chipsets, a logic circuit and/or a data processing device. The memory may include a ROM (read-only memory), a RAM (random access memory), a flash memory, a memory card, a storage medium, and/or other storage device. That is, the embodiments described in the present disclosure may be implemented and performed on a processor, a microprocessor, a controller, or a chip. For example, the functional units shown in each drawing may be implemented and executed on a computer, a processor, a microprocessor, a controller, or a chip.

In addition, the decoding apparatus and the encoding apparatus to which the present disclosure are applied may be comprised in multimedia communication devices such as a multimedia broadcasting transmitting and receiving device, a mobile communication terminal, a home cinema video device, a digital cinema video device, a surveillance camera, a video chatting device, (3D) video devices, video telephony video devices, and medical video devices, and the like, which may be included in, for example, a storage medium, a camcorder, a video on demand (VoD) service provision device, an OTT video (Over the top video), an Internet streamlining service providing device, a 3D video device, a video call device, medical video device, and may be used to process video signals or data signals. For example, the OTT video (over the top video) device may include a game console, a Blu-ray player, an Internet access TV, a home theater system, a smartphone, a tablet PC, a digital video recorder (DVR).

Further, the processing method to which the present disclosure are applied may be produced in the form of a computer-executed program, and may be stored in a computer-readable recording medium. The multimedia data having the data structure according to the present disclosure may also be stored in a computer-readable recording medium. The computer-readable recording medium includes all kinds of storage devices and distributed storage devices in which computer-readable data is stored. The computer-readable recording medium may be, for example, a Blu-ray Disc (BD), a Universal Serial Bus (USB), a ROM, a PROM, an EPROM, an EEPROM, a RAM, a CD-ROM, magnetic tape, floppy disk, and optical data storage devices. In addition, the computer-readable recording medium includes media implemented in the form of a carrier wave (for example, transmission over the Internet). In addition, the bit stream generated by the encoding method may be stored in a computer-readable recording medium or transmitted over a wired or wireless communication network. Additionally, the embodiments of the present disclosure can be implemented as a computer program product using program code, and the program code can be executed on a computer by the embodiments of the present disclosure. The program code may be stored on a computer readable carrier.

Claims described in the present specification may be combined in various methods. For example, the technical features of method claims of the present specification may be combined and implemented as a device, and the technical features of device claims of the present specification may be combined and implemented as a method. Further, the technical features of the method claims of the present specification and the technical features of the device claims thereof may be combined and implemented as a device, and the technical features of the method claims of the present specification and the technical features of the device claims thereof may be combined and implemented as a method.

What is claimed is:

1. An image decoding method performed by a decoding apparatus, the method comprising:

deriving transform coefficients for a target block based on residual information obtained from a bitstream;

deriving modified transform coefficients based on an inverse secondary transform on the transform coefficients; and deriving residual samples for the target block based on an inverse primary transform on the modified transform coefficients, wherein the deriving the modified transform coefficients comprises deriving a transform kernel to be applied for the inverse secondary transform, wherein based on both of horizontal and vertical lengths of the target block being greater than or equal to 4, and the horizontal or the vertical length being equal to 4, the transform kernel is derived as a 16×16 dimensional matrix, wherein based on both of the horizontal and the vertical lengths of the target block being greater than or equal to 8, and the horizontal or the vertical length being equal to 8, the transform kernel is derived as a 48×16 dimensional matrix, and wherein the 48×16 dimensional matrix is derived based on the following matrix:

```
const int8_t g_lfnst8x8[ 36 ][ 3 ][ 16 ][ 48 ] = {
  { //0
    {
      {111, −23, −25, −1, −4, 0, −2, 0, −38, 24, 4, −2, 1, 0, 0, 0, −28,
−1,
11, 0, 1, 0, 1, 0, 3, −3, −1, 1, 0, 0, 0, 0, −3, 1, 1, 0, 0, 0, 0, 0, −1, 0, 0, 0,
0, 0,
0, 0 },
      {−16, 44, −4, −8, −2, −2, 0, −1, −95, 1, 35, 1, 4, 0, 2, 0, 39, −39,
−7,
8, −1, 1, 0, 1, 22, 7, −12, −1, −1, 0, 0, 0, 2, 1, 1, −1, 3, 0, −1, 0, 1, −1, 0,
0, 1,
0, −1, 0 },
      {−18, −98, 37, 18, 5, 3, 2, 1, −42, 17, −10, 4, 2, 0, 0, 0, 37, 26,
−15,
−10, −2, −1, −1, 0, 6, 2, 1, −2, −1, 0, 0, 0, 0, 3, 0, −1, 0, 0, 0, 0, 1, 1, −1,
0, 0,
0, 0, 0 },
      {−44, −10, −3, 8, 4, 1, 1, 0, −14, 62, −1, −17, −1, −3, 0, −1, −66,
−16, 47, 1, 0, 1, 1, 0, 35, −36, −14, 12, −1, 2, 0, 1, 14, 7, −11, −2, 2, −2,
1, 0,
1, 1, 0, 0, 1, −1, 0, 0 },
      {11, 20, 14, −16, −2, −2, 0, −1, 22, 87, −21, −19, −5, −4, −1, −1,
59,
−23, −1, 5, −3, 0, −1, 0, −41, −18, 11, 9, 3, 1, 1, 0, −10, −6, 1, 2, −1, −4,
0, 1,
1, −1, −1, 0, −1, −1, 0, 0 },
      {18, 10, 102, −35, −10, −5, −1, −2, 1, −1, −3, 21, −5, 1, −1, 0,
−38,
−26, −31, 18, 10, 2, 2, 1, 8, −1, −6, −6, 2, 0, 0, 0, 5, 5, −4, −1, 0, 1, 0,
−1, 0,
0, −2, 0, 0, 0, 0, 0 },
      {3, −41, −18, 8, 6, 3, 1, 1, 39, −2, 23, −8, −7, −1, −1, 0, 12, −75,
−3,
36, −1, 3, −1, 1, 14, 32, −48, −7, 7, −1, 0, 0, −11, 29, 13, −16, −4, −4, 4,
3,
−2, 2, 1, 0, −1, 0, 0, 0 },
      {−10, −11, −15, −13, 9, 1, 2, 0, −26, −20, −83, 20, 14, 3, 2, 1,
−12,
−54, 23, −1, 1, 3, 0, 1, −34, 24, 32, −7, −5, −1, 0, −1, 24, 7, −4, 1, 3, 3,
4, −1,
2, 1, 0, 0, 1, 1, 1, 0 },
      {11, 23, 0, 14, −7, −1, −2, 0, 12, 12, −60, 5, 12, −1, 1, 0, 17, 3,
−14,
−27, 4, 1, 1, 0, 88, 14, −1, −8, −13, −1, −2, 0, −35, 15, 17, 1, −8, −10, 7,
3,
−5, −2, 1, 1, −1, −1, 1, 0 },
      {5, 15, 17, 102, −26, −6, −8, −2, 1, 5, 8, 1, 19, −6, 0, −1, −13,
−30,
−24, −36, 14, 8, 3, 2, −28, −5, 2, −3, −5, 3, 1, 0, 12, 1, 0, −3, 4, 3, −2,
−1, 1,
1, 0, −2, 0, 0, 0, 0 },
      {22, 9, 36, 14, −5, −5, −3, −1, 12, −22, −1, 4, 3, 1, 0, 0, 38, 3, 75,
−15, −24, 1, −3, −1, 12, 8, −28, 27, 1, −3, 0, 0, 29, 7, −50, −7, −17, 5, 12,
−7, −5, −3, 1, 1, −2, 0, 0, 0 },
      {5, −8, −5, −2, −5, 3, 0, 0, −4, −41, −19, −6, 8, 3, 2, 1, 12, −18,
−12,
10, 2, 0, 0, 0, −3, −92, −6, 39, 3, 4, 0, 2, −39, 30, −9, −11, 14, 16, 6, −8,
3, 4,
1, 0, 1, 3, 1, −1 },
      {4, 3, −28, −7, 4, 2, 2, 1, 9, 14, −6, 29, −5, −5, −1, −1, 14, 9, −45,
5,
18, −3, 0, 0, 15, −30, −11, −20, 3, 6, 0, 1, 81, 29, −24, −12, −32, 14, 21,
−5,
−8, −7, 7, 4, −2, −1, 1, 0 },
      {4, −2, 7, −8, −12, 5, 1, 0, −2, −14, −6, −99, 10, 13, 5, 2, −6, −3,
−30, 1, −19, 3, 2, 1, 11, 17, 23, 36, −8, −11, −2, −1, 39, 12, 3, 4, −12, 2,
1,
5, −4, −3, 1, 1, −1, 0, 0, 2 },
      {7, 7, 7, 9, 103, −30, −6, −4, 3, 2, 6, 3, 1, 16, −4, 0, −6, −10, −19,
−26, −50, 18, 8, 2, 0, −10, −2, 0, −3, −7, 2, 1, 1, 1, 2, 8, 0, 3, 0, −1, 1, 1,
0, 0,
0, 0, 0, 0 },
      {−2, 22, 7, 20, 6, −8, −2, −1, −22, 4, −35, −14, 0, 7, 3, 1, −11, 40,
−1,
32, −16, −10, 1, −1, −27, 11, −44, −6, 43, −6, 1, 0, −3, 17, 25, −58, 5,
−14,
27, 14, 3, −6, −5, 5, 2, −1, 1, 0 },
}.
```

2. The image decoding method of claim 1, wherein the 16×16 dimensional matrix is derived based on the following matrix:

```
const int8_t g_lfnst8x8[ 36 ][ 3 ][ 16 ][ 48 ] = {
  {   //0
    {
      {   105, −38, −16, 0, −55, 20, 8, 0, −11, 4, 2, 0, 2, −1, −1, 0 },
      {   −47, −75, 45, 4, −45, 43, −1, −2, 47, 6, −18, −1, −1, −3, 1, 0 },
      {   15, −69, 15, 6, 84, 15, −29, −3, −47, 25, 8, −2, −8, −1, 3, 1 },
      {   −20, −36, −20, 16, −21, −76, 47, 5, −17, 68, −3, −15, 18, 2, −14, 1 },
      {   34, 15, 88, −32, 2, −57, −25, 20, 16, 13, −33, 4, −16, 11, 8, −3 },
      {   −21, 12, 47, −12, −37, 16, −4, 1, −87, −13, 14, 6, 60, −4, −16, −1 },
      {   −12, −17, −25, 1, −30, −32, −87, 34, 10, −4, 62, −9, 5, 16, 12, −11 },
      {   3, 39, −2, −10, −7, 38, −34, 0, 9, 86, −4, −19, 10, −62, 11, 12 },
      {   11, 18, 27, 110, −6, −9, −23, −35, −1, −7, −11, −31, 3, 2, 6, 6 },
      {   21, −5, −7, −1, 35, −3, −10, 3, 52, −7, −14, 1, 103, 7, −32, −3 },
      {   12, 14, 41, 4, 13, 17, 36, 12, 24, 13, 83, −31, −18, 10, −58, 0 },
      {   1, −4, 6, −22, −7, −22, −16, −102, 12, 11, 34, 49, 0, −1, −7, 26 },
      {   −4, 21, −8, −7, −5, 35, −9, −16, −6, 48, −17, −5, 1, 105, 3, −25 },
      {   −5, −8, −15, −38, −6, −7, −23, −26, −10, −22, −29, −86, −11, 8, −39, 51 },
      {   4, −3, 14, −20, 9, −2, 33, −16, 10, −8, 34, −49, 31, 9, 97, 11 },
      {   0, 4, 2, 18, 1, 9, 3, 40, 1, 9, 5, 36, 4, 29, 10, 109 },
    }.
```

3. An image encoding method performed by an encoding apparatus, the method comprising:

deriving residual samples for a target block based on prediction samples for the target block;

deriving transform coefficients for the target block based on a primary transform on the residual samples;

deriving modified transform coefficients based on a secondary transform on the transform coefficients; and encoding image information comprising residual information derived based on the modified transform coefficients, wherein the deriving the modified transform coefficients comprises deriving a transform kernel to be applied for the secondary transform, wherein based on both of horizontal and vertical lengths of the target block being greater than or equal to 4, and the horizontal or the vertical length being equal to 4, the transform kernel is derived as a 16×16 dimensional matrix, wherein based on both of the horizontal and the vertical lengths of the target block being greater than or equal to 8, and the horizontal or the vertical length being equal to 8, the transform kernel is derived as a 16×48 dimensional matrix, and wherein the 16×48 dimensional matrix is derived based on the following matrix:

```
const int8_t g_lfnst8x8[ 36 ][ 3 ][ 16 ][ 48 ] = {
  {   //0
    {
        {111, −23, −25, −1, −4, 0, −2, 0, −38, 24, 4, −2, 1, 0, 0, 0, −28, −1, 11, 0, 1, 0, 1, 0, 3, −3, −1, 1, 0, 0, 0, 0,
−3, 1, 1, 0, 0, 0, 0, 0, −1, 0, 0, 0, 0, 0, 0, 0 },
        {−16, 44, −4, −8, −2, −2, 0, −1, −95, 1, 35, 1, 4, 0, 2, 0, 39, −39, −7, 8, −1, 1, 0, 1, 22, 7, −12, −1,
−1, 0, 0, 0, 2, 1, 1, −1, 3, 0, −1, 0, 1, −1, 0, 0, 1, 0, −1, 0 },
        {−18, −98, 37, 18, 5, 3, 2, 1, −42, 17, −10, 4, 2, 0, 0, 0, 37, 26, −15, −10, −2, −1, −1, 0, 6, 2, 1, −2,
−1, 0, 0, 0, 0, 3, 0, −1, 0, 0, 0, 0, 1, 1, −1, 0, 0, 0, 0, 0 },
        {−44, −10, −3, 8, 4, 1, 1, 0, −14, 62, −1, −17, −1, −3, 0, −1, −66, −16, 47, 1, 0, 1, 1, 0, 35, −36, −14, 12,
−1, 2, 0, 1, 14, 7, −11, −2, 2, −2, 1, 0, 1, 1, 0, 0, 1, −1, 0, 0 },
        {11, 20, 14, −16, −2, −2, 0, −1, 22, 87, −21, −19, −5, −4, −1, −1, 59, −23, −1, 5, −3, 0, −1, 0, −41,
−18, 11, 9, 3, 1, 1, 0, −10, −6, 1, 2, −1, −4, 0, 1, 1, −1, −1, 0, −1, −1, 0, 0 },
        {18, 10, 102, −35, −10, −5, −1, −2, 1, −1, −3, 21, −5, 1, −1, 0, −38, −26, −31, 18, 10, 2, 2, 1, 8, −1, −6,
−6, 2, 0, 0, 0, 5, 5, −4, −1, 0, 1, 0, −1, 0, 0, −2, 0, 0, 0, 0, 0 },
        {3, −41, −18, 8, 6, 3, 1, 1, 39, −2, 23, −8, −7, −1, −1, 0, 12, −75, −3, 36, −1, 3, −1, 1, 14, 32, −48, −7, 7,
−1, 0, 0, −11, 29, 13, −16, −4, −4, 4, 3, −2, 2, 1, 0, −1, 0, 0, 0 },
        {−10, −11, −15, −13, 9, 1, 2, 0, −26, −20, −83, 20, 14, 3, 2, 1, −12, −54, 23, −1, 1, 3, 0, 1, −34, 24, 32, −7,
−5, −1, 0, −1, 24, 7, −4, 1, 3, 3, 4, −1, 2, 1, 0, 0, 1, 1, 1, 0 },
        {11, 23, 0, 14, −7, −1, −2, 0, 12, 12, −60, 5, 12, −1, 1, 0, 17, 3, −14, −27, 4, 1, 1, 0, 88, 14, −1, −8, −13, −1,
−2, 0, −35, 15, 17, 1, −8, −10, 7, 3, −5, −2, 1, 1, −1, −1, 1, 0 },
        {5, 15, 17, 102, −26, −6, −8, −2, 1, 5, 8, 1, 19, −6, 0, −1, −13, −30, −24, −36, 14, 8, 3, 2, −28, −5, 2, −3,
−5, 3, 1, 0, 12, 1, 0, −3, 4, 3, −2, −1, 1, 1, 0, −2, 0, 0, 0, 0 },
        {22, 9, 36, 14, −5, −5, −3, −1, 12, −22, −1, 4, 3, 1, 0, 0, 38, 3, 75, −15, −24, 1, −3, −1, 12, 8, −28, 27, 1,
−3, 0, 0, 29, 7, −50, −7, −17, 5, 12, −7, −5, −3, 1, 1, −2, 0, 0, 0 },
        {5, −8, −5, −2, −5, 3, 0, 0, −4, −41, −19, −6, 8, 3, 2, 1, 12, −18, −12, 10, 2, 0, 0, 0, −3, −92, −6, 39, 3, 4, 0, 2,
−39, 30, −9, −11, 14, 16, 6, −8, 3, 4, 1, 0, 1, 3, 1, −1 },
        {4, 3, −28, −7, 4, 2, 2, 1, 9, 14, −6, 29, −5, −5, −1, −1, 14, 9, −45, 5, 18, −3, 0, 0, 15, −30, −11,
−20, 3, 6, 0, 1, 81, 29, −24, −12, −32, 14, 21, −5, −8, −7, 7, 4, −2, −1, 1, 0 },
        {4, −2, 7, −8, −12, 5, 1, 0, −2, −14, −6, −99, 10, 13, 5, 2, −6, −3, −30, 1, −19, 3, 2, 1, 11, 17, 23, 36, −8, −11,
−2, −1, 39, 12, 3, 4, −12, 2, 1, 5, −4, −3, 1, 1, −1, 0, 0, 2 },
        {7, 7, 7, 9, 103, −30, −6, −4, 3, 2, 6, 3, 1, 16, −4, 0, −6, −10, −19, −26, −50, 18, 8, 2, 0, −10, −2, 0, −3,
−7, 2, 1, 1, 1, 2, 8, 0, 3, 0, −1, 1, 1, 0, 0, 0, 0, 0, 0 },
        {−2, 22, 7, 20, 6, −8, −2, −1, −22, 4, −35, −14, 0, 7, 3, 1, −11, 40, −1, 32, −16, −10, 1, −1, −27, 11, −44,
−6, 43, −6, 1, 0, −3, 17, 25, −58, 5, −14, 27, 14, 3, −6, −5, 5, 2, −1, 1, 0 },
}.
```

4. The image encoding method of claim 3, wherein the 16×16 dimensional matrix is derived based on the following matrix;

```
const int8_t g_lfnst4x4[ 36 ][ 3 ][ 16 ][ 16 ] = {
  {  //0
    {
      {   105, −38, −16, 0, −55, 20, 8, 0, −11, 4, 2, 0, 2, −1, −1, 0 },
      {   −47, −75, 45, 4, −45, 43, −1, −2, 47, 6, −18, −1, −1, −3, 1, 0 },
      {   15, −69, 15, 6, 84, 15, −29, −3, −47, 25, 8, −2, −8, −1, 3, 1 },
      {   −20, −36, −20, 16, −21, −76, 47, 5, −17, 68, −3, −15, 18, 2, −14, 1 },
      {   34, 15, 88, −32, 2, −57, −25, 20, 16, 13, −33, 4, −16, 11, 8, −3 },
      {   −21, 12, 47, −12, −37, 16, −4, 1, −87, −13, 14, 6, 60, −4, −16, −1 },
      {   −12, −17, −25, 1, −30, −32, −87, 34, 10, −4, 62, −9, 5, 16, 12, −11 },
      {   3, 39, −2, −10, −7, 38, −34, 0, 9, 86, −4, −19, 10, −62, 11, 12 },
      {   11, 18, 27, 110, −6, −9, −23, −35, −1, −7, −11, −31, 3, 2, 6, 6 },
      {   21, −5, −7, −1, 35, −3, −10, 3, 52, −7, −14, 1, 103, 7, −32, −3 },
      {   12, 14, 41, 4, 13, 17, 36, 12, 24, 13, 83, −31, −18, 10, −58, 0 },
      {   1, −4, 6, −22, −7, −22, −16, −102, 12, 11, 34, 49, 0, −1, −7, 26 },
      {   −4, 21, −8, −7, −5, 35, −9, −16, −6, 48, −17, −5, 1, 105, 3, −25 },
      {   −5, −8, −15, −38, −6, −7, −23, −26, −10, −22, −29, −86, −11, 8, −39, 51 },
      {   4, −3, 14, −20, 9, −2, 33, −16, 10, −8, 34, −49, 31, 9, 97, 11 },
      {   0, 4, 2, 18, 1, 9, 3, 40, 1, 9, 5, 36, 4, 29, 10, 109 },
    }.
```

5. A transmission method of data for an image, the transmission method comprising:

obtaining a bitstream for the image, wherein the bitstream is generated by performing deriving residual samples for a target block based on prediction samples for the target block, deriving transform coefficients for the target block based on a primary transform on the residual samples, deriving modified transform coefficients based on a secondary transform on the transform coefficients, and encoding image information comprising residual information derived based on the modified transform coefficients; and transmitting the data comprising the bitstream, wherein the deriving the modified transform coefficients comprises deriving a transform kernel to be applied for the secondary transform, wherein based on both of horizontal and vertical lengths of the target block being greater than or equal to 4, and the horizontal or the vertical length being equal to 4, the transform kernel is derived as a 16×16 dimensional matrix, wherein based on both of the horizontal and the vertical lengths of the target block being greater than or equal to 8, and the horizontal or the vertical length being equal to 8, the transform kernel is derived as a 16×48 dimensional matrix, and wherein the 16×48 dimensional matrix is derived based on the following matrix:

```
const int8_t g_lfnst8x8[ 36 ][ 3 ][ 16 ][ 48 ] = {
  {  //0
    {
      {111, −23, −25, −1, −4, 0, −2, 0, −38, 24, 4, −2, 1, 0, 0, 0, −28, −1, 11, 0, 1, 0, 1, 0, 3, −3, −1, 1, 0, 0, 0, 0,
−3, 1, 1, 0, 0, 0, 0, 0, −1, 0, 0, 0, 0, 0, 0, 0 },
      {−16, 44, −4, −8, −2, −2, 0, −1, −95, 1, 35, 1, 4, 0, 2, 0, 39, −39, −7, 8, −1, 1, 0, 1, 22, 7, −12, −1,
−1, 0, 0, 0, 2, 1, 1, −1, 3, 0, −1, 0, 1, −1, 0, 0, 1, 0, −1, 0 },
      {−18, −98, 37, 18, 5, 3, 2, 1, −42, 17, −10, 4, 2, 0, 0, 0, 37, 26, −15, −10, −2, −1, −1, 0, 6, 2, 1, −2,
−1, 0, 0, 0, 0, 3, 0, −1, 0, 0, 0, 0, 1, 1, −1, 0, 0, 0, 0, 0 },
      {−44, −10, −3, 8, 4, 1, 1, 0, −14, 62, −1, −17, −1, −3, 0, −1, −66, −16, 47, 1, 0, 1, 1, 0, 35, −36, −14, 12,
−1, 2, 0, 1, 14, 7, −11, −2, 2, −2, 1, 0, 1, 1, 0, 0, 1, −1, 0, 0 },
      {11, 20, 14, −16, −2, −2, 0, −1, 22, 87, −21, −19, −5, −4, −1, −1, 59, −23, −1, 5, −3, 0, −1, 0, −41,
−18, 11, 9, 3, 1, 1, 0, −10, −6, 1, 2, −1, −4, 0, 1, 1, −1, −1, 0, −1, −1, 0, 0 },
      {18, 10, 102, −35, −10, −5, −1, −2, 1, −1, −3, 21, −5, 1, −1, 0, −38, −26, −31, 18, 10, 2, 2, 1, 8, −1, −6,
−6, 2, 0, 0, 0, 5, 5, −4, −1, 0, 1, 0, −1, 0, 0, −2, 0, 0, 0, 0, 0 },
      {3, −41, −18, 8, 6, 3, 1, 1, 39, −2, 23, −8, −7, −1, −1, 0, 12, −75, −3, 36, −1, 3, −1, 1, 14, 32, −48, −7, 7,
−1, 0, 0, −11, 29, 13, −16, −4, −4, 4, 3, −2, 2, 1, 0, −1, 0, 0, 0 },
      {−10, −11, −15, −13, 9, 1, 2, 0, −26, −20, −83, 20, 14, 3, 2, 1, −12, −54, 23, −1, 1, 3, 0, 1, −34, 24, 32, −7,
−5, −1, 0, −1, 24, 7, −4, 1, 3, 3, 4, −1, 2, 1, 0, 0, 1, 1, 1, 0 },
      {11, 23, 0, 14, −7, −1, −2, 0, 12, 12, −60, 5, 12, −1, 1, 0, 17, 3, −14, −27, 4, 1, 1, 0, 88, 14, −1, −8, −13, −1,
−2, 0, −35, 15, 17, 1, −8, −10, 7, 3, −5, −2, 1, 1, −1, −1, 1, 0 },
      {5, 15, 17, 102, −26, −6, −8, −2, 1, 5, 8, 1, 19, −6, 0, −1, −13, −30, −24, −36, 14, 8, 3, 2, −28, −5, 2, −3,
−5, 3, 1, 0, 12, 1, 0, −3, 4, 3, −2, −1, 1, 1, 0, −2, 0, 0, 0, 0 },
      {22, 9, 36, 14, −5, −5, −3, −1, 12, −22, −1, 4, 3, 1, 0, 0, 38, 3, 75, −15, −24, 1, −3, −1, 12, 8, −28, 27, 1,
−3, 0, 0, 29, 7, −50, −7, −17, 5, 12, −7, −5, −3, 1, 1, −2, 0, 0, 0 },
      {5, −8, −5, −2, −5, 3, 0, 0, −4, −41, −19, −6, 8, 3, 2, 1, 12, −18, −12, 10, 2, 0, 0, 0, −3, −92, −6, 39, 3, 4, 0, 2,
−39, 30, −9, −11, 14, 16, 6, −8, 3, 4, 1, 0, 1, 3, 1, −1 },
      {4, 3, −28, −7, 4, 2, 2, 1, 9, 14, −6, 29, −5, −5, −1, −1, 14, 9, −45, 5, 18, −3, 0, 0, 15, −30, −11,
−20, 3, 6, 0, 1, 81, 29, −24, −12, −32, 14, 21, −5, −8, −7, 7, 4, −2, −1, 1, 0 },
      {4, −2, 7, −8, −12, 5, 1, 0, −2, −14, −6, −99, 10, 13, 5, 2, −6, −3, −30, 1, −19, 3, 2, 1, 11, 17, 23, 36, −8, −11,
−2, −1, 39, 12, 3, 4, −12, 2, 1, 5, −4, −3, 1, 1, −1, 0, 0, 2 },
```

-continued

```
    {7, 7, 7, 9, 103, −30, −6, −4, 3, 2, 6, 3, 1, 16, −4, 0, −6, −10, −19, −26, −50, 18, 8, 2, 0, −10, −2, 0, −3,
−7, 2, 1, 1, 1, 2, 8, 0, 3, 0, −1, 1, 1, 0, 0, 0, 0, 0, 0 },
    {−2, 22, 7, 20, 6, −8, −2, −1, −22, 4, −35, −14, 0, 7, 3, 1, −11, 40, −1, 32, −16, −10, 1, −1, −27, 11, −44,
−6, 43, −6, 1, 0, −3, 17, 25, −58, 5, −14, 27, 14, 3, −6, −5, 5, 2, −1, 1, 0 },
}.
```

6. The transmission method of claim 5, wherein the 16×16 dimensional matrix is derived based on the following matrix:

```
const int8_t g_lfnst8x8[ 36 ][ 3 ][ 16 ][ 48 ] = {
  {  //0
    {
      {   105, −38, −16, 0, −55, 20, 8, 0, −11, 4, 2, 0, 2, −1, −1, 0 },
      {   −47, −75, 45, 4, −45, 43, −1, −2, 47, 6, −18, −1, −1, −3, 1, 0 },
      {   15, −69, 15, 6, 84, 15, −29, −3, −47, 25, 8, −2, −8, −1, 3, 1 },
      {   −20, −36, −20, 16, −21, −76, 47, 5, −17, 68, −3, −15, 18, 2, −14, 1 },
      {   34, 15, 88, −32, 2, −57, −25, 20, 16, 13, −33, 4, −16, 11, 8, −3 },
      {   −21, 12, 47, −12, −37, 16, −4, 1, −87, −13, 14, 6, 60, −4, −16, −1 },
      {   −12, −17, −25, 1, −30, −32, −87, 34, 10, −4, 62, −9, 5, 16, 12, −11 },
      {   3, 39, −2, −10, −7, 38, −34, 0, 9, 86, −4, −19, 10, −62, 11, 12 },
      {   11, 18, 27, 110, −6, −9, −23, −35, −1, −7, −11, −31, 3, 2, 6, 6 },
      {   21, −5, −7, −1, 35, −3, −10, 3, 52, −7, −14, 1, 103, 7, −32, −3 },
      {   12, 14, 41, 4, 13, 17, 36, 12, 24, 13, 83, −31, −18, 10, −58, 0 },
      {   1, −4, 6, −22, −7, −22, −16, −102, 12, 11, 34, 49, 0, −1, −7, 26 },
      {   −4, 21, −8, −7, −5, 35, −9, −16, −6, 48, −17, −5, 1, 105, 3, −25 },
      {   −5, −8, −15, −38, −6, −7, −23, −26, −10, −22, −29, −86, −11, 8, −39, 51 },
      {   4, −3, 14, −20, 9, −2, 33, −16, 10, −8, 34, −49, 31, 9, 97, 11 },
      {   0, 4, 2, 18, 1, 9, 3, 40, 1, 9, 5, 36, 4, 29, 10, 109 },
    }.
```

* * * * *